(12) United States Patent
Levien et al.

(10) Patent No.: US 9,527,587 B2
(45) Date of Patent: Dec. 27, 2016

(54) UNOCCUPIED FLYING VEHICLE (UFV) COORDINATION

(71) Applicant: Elwha LLC, Bellevue, WA (US)

(72) Inventors: Royce A. Levien, Lexington, MA (US); Robert W. Lord, Seattle, WA (US); Richard T. Lord, Tacoma, WA (US); Mark A. Malamud, Seattle, WA (US); John D. Rinaldo, Jr., Bellevue, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 13/866,743

(22) Filed: Apr. 19, 2013

(65) Prior Publication Data
US 2014/0222248 A1 Aug. 7, 2014

Related U.S. Application Data

(63) Continuation-in-part of application No. 13/800,391, filed on Mar. 13, 2013, which is a continuation-in-part of application No. 13/731,721, filed on Dec. 31, 2012, which is a continuation-in-part of application No. 13/731,450, filed on Dec. 31, 2012, which is a continuation-in-part of application No. 13/731,407, filed on Dec. 31, 2012, which is a continuation-in-part of application No. 13/731,363, filed on Dec. 31, 2012, which is a continuation-in-part of application No. 13/730,202, filed on Dec. 28, 2012, which is a continuation-in-part of application No. 13/728,642, filed on Dec. 27, 2012, which is a continuation-in-part (Continued)

(51) Int. Cl.
*B64C 39/02* (2006.01)
*G05D 1/10* (2006.01)
*G08G 5/00* (2006.01)

(52) U.S. Cl.
CPC ............ *B64C 39/024* (2013.01); *G05D 1/104* (2013.01); *G08G 5/0008* (2013.01); *G08G 5/0013* (2013.01); *G08G 5/0069* (2013.01); *B64C 2201/143* (2013.01); *B64C 2201/146* (2013.01)

(58) Field of Classification Search
CPC ............ B64C 2201/00; B64C 2201/14; G05D 1/0011; G05D 1/005; G05D 1/0027
USPC .......................................................... 701/2
See application file for complete search history.

(56) References Cited

U.S. PATENT DOCUMENTS 4,964,837 A 10/1990 Collier
5,581,250 A 12/1996 Khvilivitzky
(Continued)

OTHER PUBLICATIONS

"Physics-Based Approach to Chemical Source Localization Using Mobile Robotic Swarms" by Dimitri Zarzhitsky; a dissertation submitted to the Department of Computer Science and The Graduate School of The University of Wyoming; Aug. 2008.*
(Continued)

*Primary Examiner* — Anne M Antonucci

(57) ABSTRACT

Disclosed herein are example embodiments for unoccupied flying vehicle (UFV) coordination. For certain example embodiments, at least one machine, such as a UFV, may: (i) obtain one or more theater characteristics; or (ii) coordinate at least one behavior of at least one UFV based, at least partially, on one or more theater characteristics. However, claimed subject matter is not limited to any particular described embodiments, implementations, examples, or so forth.

37 Claims, 25 Drawing Sheets

Related U.S. Application Data of application No. 13/722,874, filed on Dec. 20, 2012, which is a continuation-in-part of application No. 13/720,694, filed on Dec. 19, 2012.

(56) References Cited

U.S. PATENT DOCUMENTS

| | | | |
|---|---|---|---|
| 6,694,228 B2 | 2/2004 | Rios | |
| 6,786,213 B1 | 9/2004 | Lee | |
| 6,804,607 B1 | 10/2004 | Wood | |
| 6,896,220 B2 | 5/2005 | McKendree et al. | |
| 6,952,001 B2 | 10/2005 | McKendree et al. | |
| 6,980,151 B1 | 12/2005 | Mohan | |
| 7,024,309 B2 | 4/2006 | Doane | |
| 7,039,367 B1 | 5/2006 | Kucik | |
| 7,299,130 B2 | 11/2007 | Mulligan et al. | |
| 7,437,225 B1 | 10/2008 | Rathinam | |
| 7,542,828 B2 | 6/2009 | Steele et al. | |
| 7,693,624 B2 | 4/2010 | Duggan et al. | |
| 7,737,878 B2 | 6/2010 | van Tooren et al. | |
| 7,747,364 B2 | 6/2010 | Roy et al. | |
| 7,876,258 B2 | 1/2011 | Abraham et al. | |
| 7,953,524 B1 | 5/2011 | Roggendorf | |
| 7,969,346 B2 | 6/2011 | Franceschini et al. | |
| 7,970,506 B2 | 6/2011 | DeMarco et al. | |
| 8,060,270 B2 | 11/2011 | Vian et al. | |
| 8,068,949 B2 | 11/2011 | Duggan et al. | |
| 8,086,351 B2 | 12/2011 | Gaudiano et al. | |
| 8,103,398 B2 | 1/2012 | Duggan et al. | |
| 8,380,367 B2 | 2/2013 | Schultz et al. | |
| 8,471,186 B2 | 6/2013 | Wallis | |
| 8,700,306 B2 | 4/2014 | Duggan et al. | |
| 2001/0044444 A1 | 11/2001 | Mahe et al. | |
| 2003/0014165 A1 | 1/2003 | Baker et al. | |
| 2003/0135762 A1 | 7/2003 | Macaulay | |
| 2004/0193334 A1 | 9/2004 | Carlsson et al. | |
| 2004/0249519 A1 | 12/2004 | Frink | |
| 2005/0004723 A1 | 1/2005 | Duggan et al. | |
| 2005/0077424 A1 | 4/2005 | Schneider | |
| 2005/0090945 A1 | 4/2005 | Bodin et al. | |
| 2005/0136891 A1 | 6/2005 | Wang et al. | |
| 2005/0197749 A1 | 9/2005 | Nichols et al. | |
| 2006/0058928 A1 | 3/2006 | Beard et al. | |
| 2006/0058931 A1 | 3/2006 | Ariyur et al. | |
| 2006/0089766 A1 | 4/2006 | Allard et al. | |
| 2006/0097895 A1 | 5/2006 | Reynolds et al. | |
| 2006/0167596 A1 | 7/2006 | Bodin et al. | |
| 2006/0238414 A1 | 10/2006 | Miyamoto et al. | |
| 2006/0249622 A1 | 11/2006 | Steele | |
| 2006/0271248 A1 | 11/2006 | Cosgrove et al. | |
| 2006/0287824 A1 | 12/2006 | Lin | |
| 2007/0106473 A1 | 5/2007 | Bodin et al. | |
| 2007/0139252 A1 | 6/2007 | Barry et al. | |
| 2007/0152814 A1 | 7/2007 | Stefani | |
| 2007/0168090 A1 | 7/2007 | DeMarco et al. | |
| 2007/0210953 A1 | 9/2007 | Abraham et al. | |
| 2008/0033604 A1 | 2/2008 | Margolin | |
| 2008/0055149 A1 | 3/2008 | Rees et al. | |
| 2008/0125933 A1* | 5/2008 | Williams et al. | 701/30 |
| 2008/0190274 A1 | 8/2008 | Kirkpatrick | |
| 2008/0249669 A1 | 10/2008 | Skarman | |
| 2008/0255711 A1 | 10/2008 | Matos | |
| 2009/0027253 A1 | 1/2009 | Van Tooren et al. | |
| 2009/0102630 A1 | 4/2009 | Nordlund et al. | |
| 2009/0118896 A1 | 5/2009 | Gustafsson | |
| 2009/0125221 A1 | 5/2009 | Estkowski et al. | |
| 2009/0134981 A1 | 5/2009 | Shafaat et al. | |
| 2009/0210109 A1 | 8/2009 | Ravenscroft | |
| 2009/0222148 A1 | 9/2009 | Knotts et al. | |
| 2009/0318138 A1 | 12/2009 | Zeng et al. | |
| 2009/0319100 A1 | 12/2009 | Kale et al. | |
| 2010/0004798 A1 | 1/2010 | Bodin et al. | |
| 2010/0049376 A1 | 2/2010 | Schultz | |
| 2010/0084513 A1 | 4/2010 | Gariepy et al. | |
| 2010/0100269 A1 | 4/2010 | Ekhaguere et al. | |
| 2010/0121574 A1 | 5/2010 | Ariyur et al. | |
| 2010/0131121 A1 | 5/2010 | Gerlock | |
| 2010/0163621 A1 | 7/2010 | Ben-Asher et al. | |
| 2010/0198514 A1 | 8/2010 | Miralles | |
| 2010/0204867 A1 | 8/2010 | Longstaff | |
| 2010/0224732 A1 | 9/2010 | Olson et al. | |
| 2010/0250022 A1 | 9/2010 | Hines et al. | |
| 2010/0292871 A1 | 11/2010 | Schultz et al. | |
| 2010/0292874 A1 | 11/2010 | Duggan et al. | |
| 2010/0302359 A1 | 12/2010 | Adams et al. | |
| 2010/0332136 A1 | 12/2010 | Duggan et al. | |
| 2011/0035149 A1 | 2/2011 | McAndrew et al. | |
| 2011/0118981 A1 | 5/2011 | Chamlou | |
| 2011/0134249 A1 | 6/2011 | Wood et al. | |
| 2011/0169943 A1 | 7/2011 | Bachman, II et al. | |
| 2012/0016534 A1 | 1/2012 | Lee et al. | |
| 2012/0022719 A1 | 1/2012 | Matos | |
| 2012/0083947 A1 | 4/2012 | Anderson et al. | |
| 2012/0089274 A1 | 4/2012 | Lee et al. | |
| 2012/0092208 A1 | 4/2012 | LeMire et al. | |
| 2012/0106800 A1 | 5/2012 | Khan et al. | |
| 2012/0123628 A1 | 5/2012 | Duggan et al. | |
| 2012/0143482 A1 | 6/2012 | Gossen et al. | |
| 2012/0167207 A1 | 6/2012 | Beckley et al. | |
| 2012/0187243 A1 | 7/2012 | Goldie et al. | |
| 2012/0200404 A1 | 8/2012 | Morris | |
| 2012/0210853 A1 | 8/2012 | Abershitz et al. | |
| 2012/0221168 A1 | 8/2012 | Zeng et al. | |
| 2012/0296497 A1 | 11/2012 | Lee et al. | |
| 2013/0197739 A1 | 8/2013 | Gallagher et al. | |
| 2013/0211656 A1 | 8/2013 | An et al. | |

OTHER PUBLICATIONS

"A Swarm of Nano Quadrotors", YouTube.com, http://www.youtube.com/watch?v=YQIMGV5vtd4, Jan. 31, 2012.
"Collision Avoidance—Where We Are: Detect See and Avoid versus See and Avoid", UAV MarketSpace Developing Commercial UAV Applications, http://www.uavm.com/uavregulatory/collisionavoidance.html, Dec. 5, 2012, pp. 1-5.
"Drone Hijacking? That's Just the Start of GPS Troubles", Danger Room Wired.com, http://www.wired.com/dangerroom/2012/07/drone-hijacking/all/, Jan. 11, 2013, pp. 1-4.
"Most U.S. Drones Openly Broadcast Secret Video Feeds", Danger Room Wired.com, http://www.wired.com/dangerroom/2012/10/hack-proof-drone, Jan. 11, 2013, pp. 1-4.
"Pentagon Looks to Fix 'Pervasive Vulnerability' in Drones", Danger Room Wired.com, http://www.wired.com/dangerroom/2012/12/darpa-drones/, Jan. 11, 2013, pp. 1-5.
"Robot Quadrotors Perform James Bond Theme", YouTube.com, http://www.youtube.com/watch?vs=sUeGc-8dyk, Feb. 28, 2012.
"Unmanned aerial vehicle", Wikipedia, http://en.wikipedia.org/wiki/Unmanned_aerial_vehicle, Dec. 3, 2012, pp. 1-21.
"Vijay Kumar: Robots that fly . . . and cooperate", TED.com; http://www.ted.com/talks/vjay_kumar_robots_that_fly_and_cooperate.htm, Mar. 2012.
Albaker; Rahim; "Autonomous unmanned aircraft collision avoidance system based on geometric intersection", International Journal of the Physical Sciences, Feb. 4, 2011, vol. 6, pp. 391-401.
Anderson, Chris; "How I Accidentally Kickstarted the Domestric Drone Boom", Danger Room Wired.com, http://www.wired.com/dangerroom/2012/06/ff_drones/all/, Dec. 6, 2012, pp. 1-10.
Bai; Hsu; Kochenderfer; Lee; "Unmanned Aircraft Collision Avoidance using Continuous-State POMDPs", National University of Singapore School of Computing;, https://www1.comp.nus.edu.sg/~leews/publications/rss11.pdf, Dec. 3, 2012.
Dean, Stephen; "Drone crashes into SWAT team tank during police test near Houston", Examiner.com, http://www.examiner.com/page-one-in-houston/drone-crashes-into-swat-team-tank-during-police-test-near-houston, Mar. 20, 2012, pp. 1-4.
Federal Aviation Administration; DOT Regs 14-CFR-91 Subchapter-F Subpart-B Flight Rules; Dec. 15, 2013 pp. 711-738.
Geyer; Singh; Chamerlain; "Avoiding Collisions Between Aircraft: State of the Art and Requirements for UAVs operating in Civilian Airspace", Robotics Institute, Carnegie Mellon University, Jan. 2008, pp. 1-19 Pittsburgh, Pennsylvania.

(56) References Cited

OTHER PUBLICATIONS

Gruen, Armin; "First Civilian Photogrammetric UAV Flight Over Singapore", Sensors & Systems, http://sensorsandsystems.com/article/features/26474-first-civilain-photogrammetric-uav-flig, Mar. 26, 2012; pp. 1-7.
Leopold, George; "U.S. To begin testing future drones", EE Times, http://www.eetimes.com/General/PrintView/4237809, Mar. 9, 2012, pp. 1.
Montgomery; Johnson; Roumeliotis; Matthies; "The JPL Autonomous Helicopter Testbed: A Platform for Planetary Exploration Technology Research and Development", Journal of Field Robotics, vol. 23(3), Dec. 3, 2012, Wiley Periodicals, Inc.
Subbaraman, Nidhi; "Drones over America: How unmanned fliers are already helping cops", NBC News.com, http://www.nbcnews.com/technology/drones-over-america-how-unmanned-fliers-are-already-helping-cops-1C9135554, Mar. 30, 201, pp. 1-5.

\* cited by examiner

FIXED WING
UFV
102a

ROTARY WING
UFV
102b

ORNITHOPTER
UFV
102c

LIGHTER-
THAN-AIR
(LTA)
UFV
102d

TILT-WING
UFV
102e

HYBRID
UFV
102f

OTHER
UFV
102g

UNOCCUPIED
FLYING
VEHICLE (UFV)
102

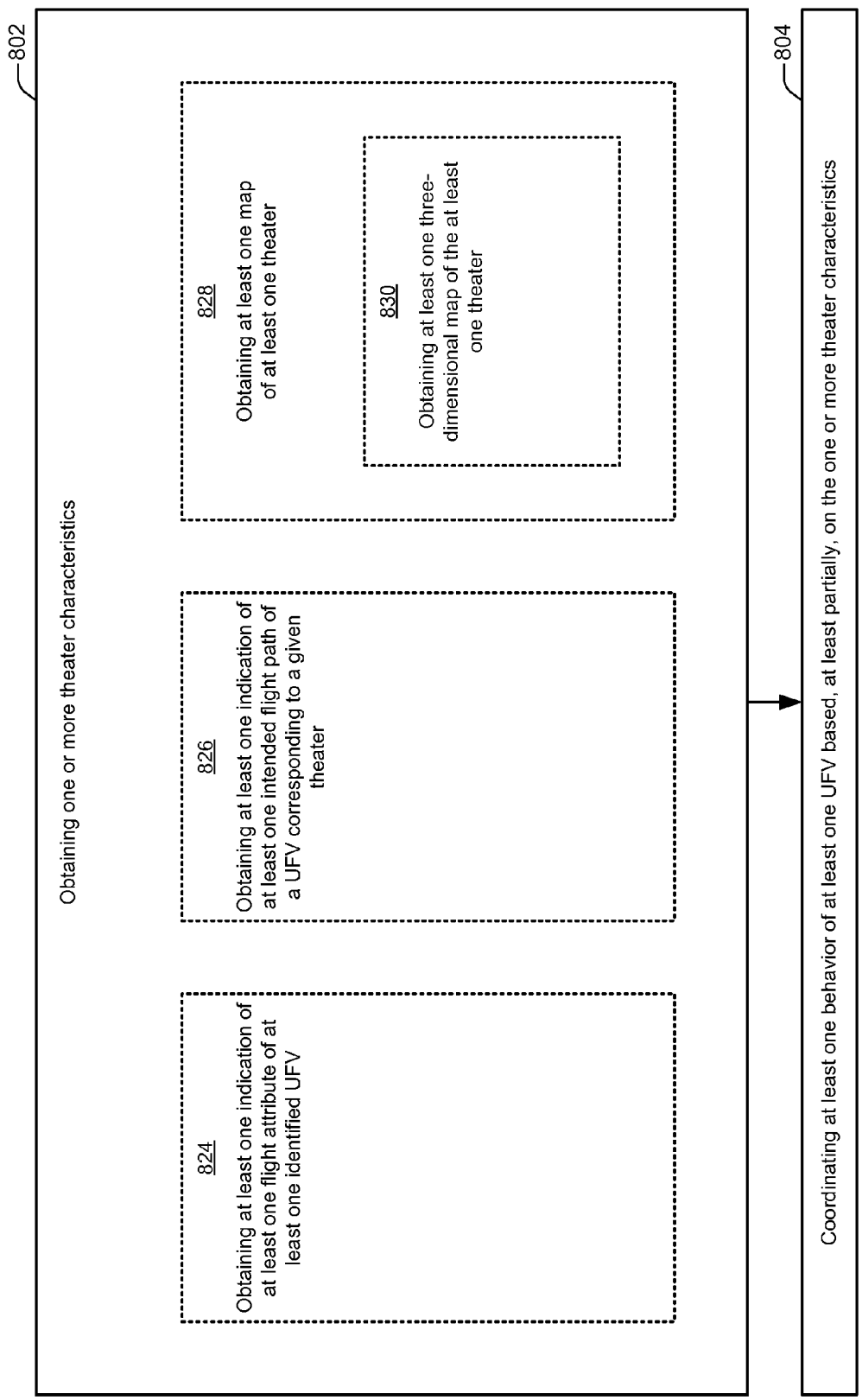

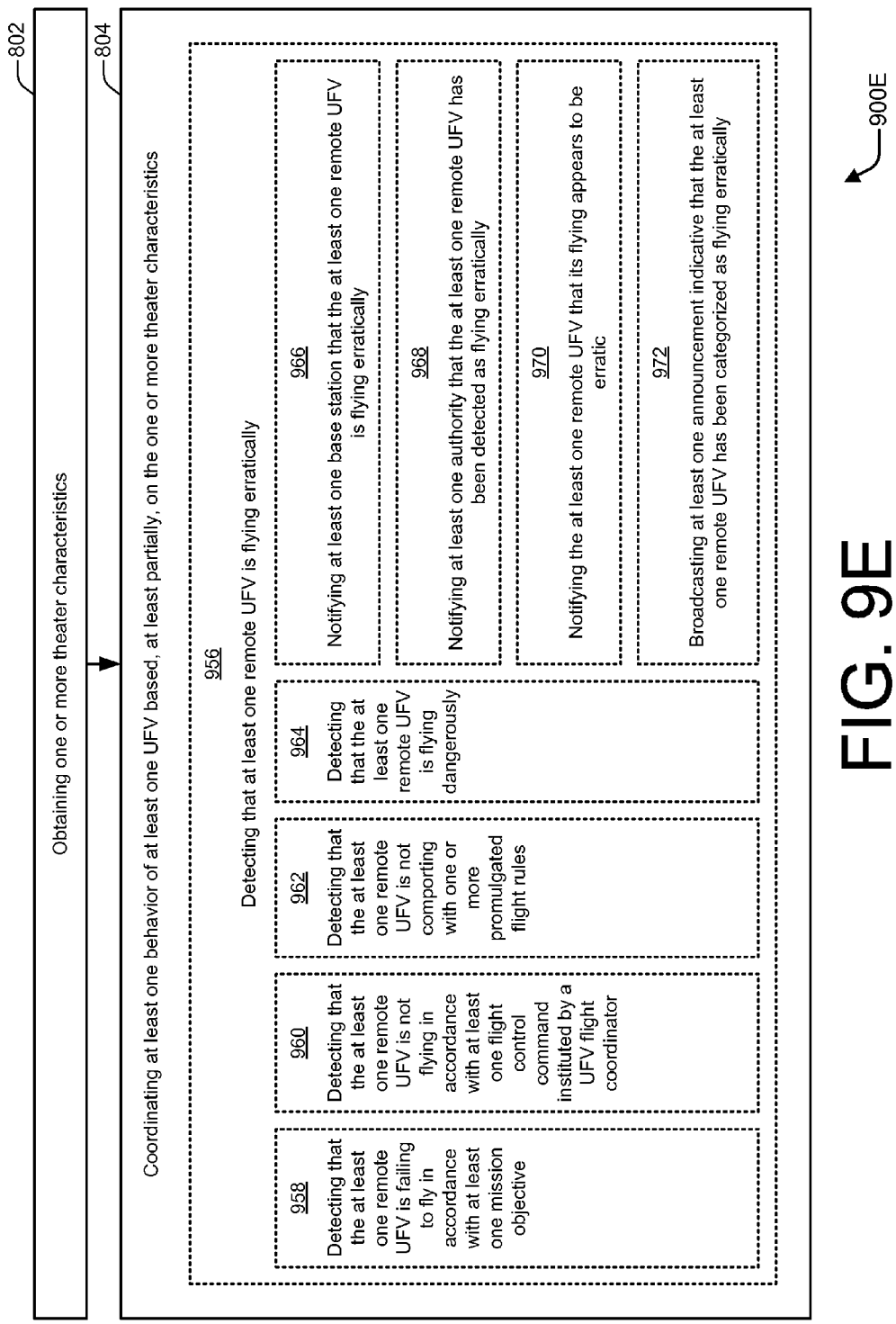

UNOCCUPIED FLYING VEHICLE (UFV) COORDINATION

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS (1) For purposes of the USPTO extra-statutory requirements, the present application constitutes a continuation-in-part of U.S. patent application Ser. No. 13/720,694, entitled "Inter-Vehicle Communication for Hazard Handling for an Unoccupied Flying Vehicle (UFV)", naming Royce A. Levien, Richard T. Lord, Robert W. Lord, Mark A. Malamud, John D. Rinaldo, Jr., and Lowell L. Wood, Jr. as inventors, filed 19 Dec. 2012, which is currently co-pending or is an application of which a currently co-pending application is entitled to the benefit of the filing date.

(2) For purposes of the USPTO extra-statutory requirements, the present application constitutes a continuation-in-part of U.S. patent application Ser. No. 13/722,874, entitled "Unoccupied Flying Vehicle (UFV) Inter-Vehicle Communication for Hazard Handling", naming Royce A. Levien, Richard T. Lord, Robert W. Lord, Mark A. Malamud, John D. Rinaldo, Jr., and Lowell L. Wood, Jr. as inventors, filed 20 Dec. 2012, which is currently co-pending or is an application of which a currently co-pending application is entitled to the benefit of the filing date.

(3) For purposes of the USPTO extra-statutory requirements, the present application constitutes a continuation-in-part of U.S. patent application Ser. No. 13/728,642, entitled "Inter-Vehicle Flight Attribute Communication for an Unoccupied Flying Vehicle (UFV)", naming Royce A. Levien, Richard T. Lord, Robert W. Lord, Mark A. Malamud, John D. Rinaldo, Jr., and Lowell L. Wood, Jr. as inventors, filed 27 Dec. 2012, which is currently co-pending or is an application of which a currently co-pending application is entitled to the benefit of the filing date.

(4) For purposes of the USPTO extra-statutory requirements, the present application constitutes a continuation-in-part of U.S. patent application Ser. No. 13/730,202, entitled "Base Station Control for an Unoccupied Flying Vehicle (UFV)", naming Royce A. Levien, Richard T. Lord, Robert W. Lord, Mark A. Malamud, John D. Rinaldo, Jr., and Lowell L. Wood, Jr. as inventors, filed 28 Dec. 2012, which is currently co-pending or is an application of which a currently co-pending application is entitled to the benefit of the filing date.

(5) For purposes of the USPTO extra-statutory requirements, the present application constitutes a continuation-in-part of U.S. patent application Ser. No. 13/731,363, entitled "Automated Hazard Handling Routine Engagement", naming Royce A. Levien, Richard T. Lord, Robert W. Lord, Mark A. Malamud, John D. Rinaldo, Jr., and Lowell L. Wood, Jr. as inventors, filed 31 Dec. 2012, which is currently co-pending or is an application of which a currently co-pending application is entitled to the benefit of the filing date.

(6) For purposes of the USPTO extra-statutory requirements, the present application constitutes a continuation-in-part of U.S. patent application Ser. No. 13/731,407, entitled "Automated Hazard Handling Routine Activation", naming Royce A. Levien, Richard T. Lord, Robert W. Lord, Mark A. Malamud, John D. Rinaldo, Jr., and Lowell L. Wood, Jr. as inventors, filed 31 Dec. 2012, which is currently co-pending or is an application of which a currently co-pending application is entitled to the benefit of the filing date.

(7) For purposes of the USPTO extra-statutory requirements, the present application constitutes a continuation-in-part of U.S. patent application Ser. No. 13/731,450, entitled "Collision Targeting for an Unoccupied Flying Vehicle (UFV)", naming Royce A. Levien, Richard T. Lord, Robert W. Lord, Mark A. Malamud, John D. Rinaldo, Jr., and Lowell L. Wood, Jr. as inventors, filed 31 Dec. 2012, which is currently co-pending or is an application of which a currently co-pending application is entitled to the benefit of the filing date.

(8) For purposes of the USPTO extra-statutory requirements, the present application constitutes a continuation-in-part of U.S. patent application Ser. No. 13/731,721, entitled "Collision Targeting for Hazard Handling", naming Royce A. Levien, Richard T. Lord, Robert W. Lord, Mark A. Malamud, John D. Rinaldo, Jr., and Lowell L. Wood, Jr. as inventors, filed 31 Dec. 2012, which is currently co-pending or is an application of which a currently co-pending application is entitled to the benefit of the filing date.

(9) For purposes of the USPTO extra-statutory requirements, the present application constitutes a continuation-in-part of U.S. patent application Ser. No. 13/800,391, entitled "Base Station Multi-Vehicle Coordination", naming Royce A. Levien, Richard T. Lord, Robert W. Lord, Mark A. Malamud, John D. Rinaldo, Jr., and Lowell L. Wood, Jr. as inventors, filed 13 Mar. 2013, which is currently co-pending or is an application of which a currently co-pending application is entitled to the benefit of the filing date.

RELATED APPLICATIONS

None

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, *Benefit of Prior-Filed Application*, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BRIEF DESCRIPTION OF THE FIGURES

FIG. 2 is a schematic diagram of example realizations for at least one UFV in accordance with certain example embodiments.

FIGS. 8B-8C depict example additions or alternatives for a flow diagram of FIG. 8A in accordance with certain example embodiments.

FIGS. 9A-9F depict example additions or alternatives for a flow diagram of FIG. 8A in accordance with certain example embodiments.

DETAILED DESCRIPTION

Figure 1:
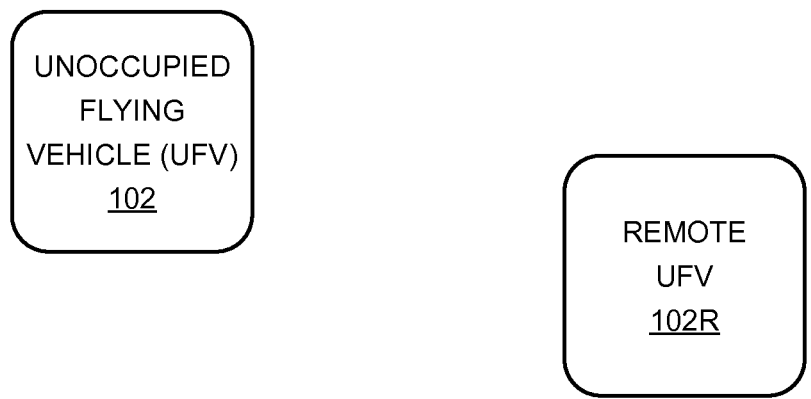
FIG. 1 is a schematic diagram of at least one unoccupied flying vehicle (UFV) in accordance with certain example embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is a schematic diagram 100 of at least one unoccupied flying vehicle (UFV) in accordance with certain example embodiments. As shown in FIG. 1, by way of example but not limitation, schematic diagram 100 may include at least one unoccupied flying vehicle (UFV) 102 or at least one remote UFV 102R. For certain example implementations, any particular UFV: may be, comprise, or include a UFV 102, such as a local UFV, or may be, comprise, or include a remote UFV 102R. A given UFV scenario may be considered, analyzed, operated, viewed, or a combination thereof, etc. from a perspective of at least one local UFV 102 with regard to one or more remote UFVs 102R. Disclosure herein or in the accompany drawings, which form a part hereof, that is directed to a UFV 102 may additionally or alternatively be applicable to a remote UFV 102R, unless context dictates otherwise. However, claimed subject matter is not limited to any particular described embodiments, implementations, examples, etc.

For certain example embodiments, a UFV 102 may comprise or include a vehicle that is not capable of being occupied by a human pilot (e.g., due to size, shape, power, atmospheric pressure, or a combination thereof, etc. constraints), a vehicle that is not designed to seat or otherwise safely support a person, a vehicle that is not controllable by an onboard human pilot, a vehicle that is being autonomously controlled at least partially by at least one onboard module, a vehicle that is being autonomously controlled at least partially by at least one off-board module, a combination thereof, or so forth. For certain example embodiments, a UFV 102 may be at least comparable to or may comprise or include at least a portion of any one or more of: an unmanned aerial vehicle (UAV), a remotely piloted vehicle (RPV), an unmanned combat air vehicle (UCAV), an unmanned aircraft (UA), a drone, an optionally-piloted vehicle (OPV) that is not currently being controlled by an on-board pilot, a remotely piloted aircraft (RPA), a remotely operated aircraft (ROA), a radio-controlled aircraft (R/C aircraft), an automated flying drone (AFD) (e.g., a drone that is locally or remotely controlled by a computer or other processing device), an unmanned-aircraft vehicle system (UAVS), an unmanned aircraft system (UAS), a small unmanned air system (sUAS), a single one of any of the above, a combination of any two or more of the above, or so forth. For certain example embodiments, a UFV 102 may fly through a fluid (e.g., the earth's atmosphere or the air), through at least a partial vacuum (e.g., space or near-earth orbit), a combination thereof, or so forth. However, claimed subject matter is not limited to any particular described embodiments, implementations, examples, etc.

FIG. 2 is a schematic diagram 200 of example realizations for at least one UFV in accordance with certain example embodiments. As shown in FIG. 2, by way of example but not limitation, schematic diagram 200 may include at least one unoccupied flying vehicle (UFV) 102, at least one fixed wing UFV 102a, at least one rotary wing UFV 102b, at least one ornithopter UFV 102c, at least one lighter-than-air (LTA) UFV 102d, at least one tilt-wing UFV 102e, at least one hybrid UFV 102f, or at least one other type of UFV 102g. However, claimed subject matter is not limited to any particular described embodiments, implementations, examples, etc.

For certain example embodiments, a UFV 102 may be realized as described by any one or more of the examples in this paragraph. First, a UFV 102 may be realized as a fixed wing UFV 102a, such as a propeller-driven biplane or a jet plane. Second, a UFV 102 may be realized as a rotary wing UFV 102b, such as a helicopter or a gyrodyne. Third, a UFV 102 may be realized as an ornithopter UFV 102c, such as small craft that has flapping wings like an animal (e.g., like a dragonfly, bee, bird, or bat, etc.). Fourth, a UFV 102 may be realized as an LTA UFV 102d, such as a blimp, a balloon, or a dirigible. Fifth, a UFV 102 may be realized as a tilt-wing UFV 102e, such as a propeller-driven airplane with wings that rotate at least during vertical takeoff or landing. Sixth, a UFV 102 may be realized as a hybrid UFV 102f that combines one or more capabilities or structural characteristics of at least one fixed wing UFV 102a, at least one rotary wing UFV 102b, at least one ornithopter UFV 102c, at least one LTA UFV 102d, at least one tilt-wing UFV 102e, or at least one other UFV 102g. Seventh, a UFV 102 may be realized as an other type of UFV 102g, such as a tilt-rotor craft, a submarine, a rocket, a spaceship, a satellite, a vertical take-off and landing (VTOL) craft, a combination thereof, or so forth. However, claimed subject matter is not limited to any particular described embodiments, implementations, examples, etc.

For certain example embodiments, a UFV 102 may additionally or alternatively be realized so as to have one or more features, capabilities, structural characteristics, or a combination thereof, etc. as described by any one or more of the examples in this paragraph. First, a UFV 102 may include one rotor, two rotors (e.g., in a tandem, transverse, coaxial, or intermeshing, etc. configuration), three rotors, four rotors (e.g., a quadcopter, or a quadrotor, etc.), a combination thereof, or so forth. Second, a UFV 102 may include a propeller engine, a jet engine, an electric engine, a rocket engine, a ramjet or scramjet engine, a combination thereof, or so forth. Third, a UFV 102 may have at least one wing (e.g., a monoplane, a biplane, or a triplane, etc. in a stacked or tandem wing configuration), which may include a straight wing, a swept wing, a delta wing, a variable sweep wing, a combination thereof, or so forth. Fourth, a UFV 102 may be realized as having a fuselage, as having a flying wing structure, as having a blended-wing body, a combination thereof, or so forth. However, claimed subject matter is not limited to any particular described embodiments, implementations, examples, etc.

Figure 3A:
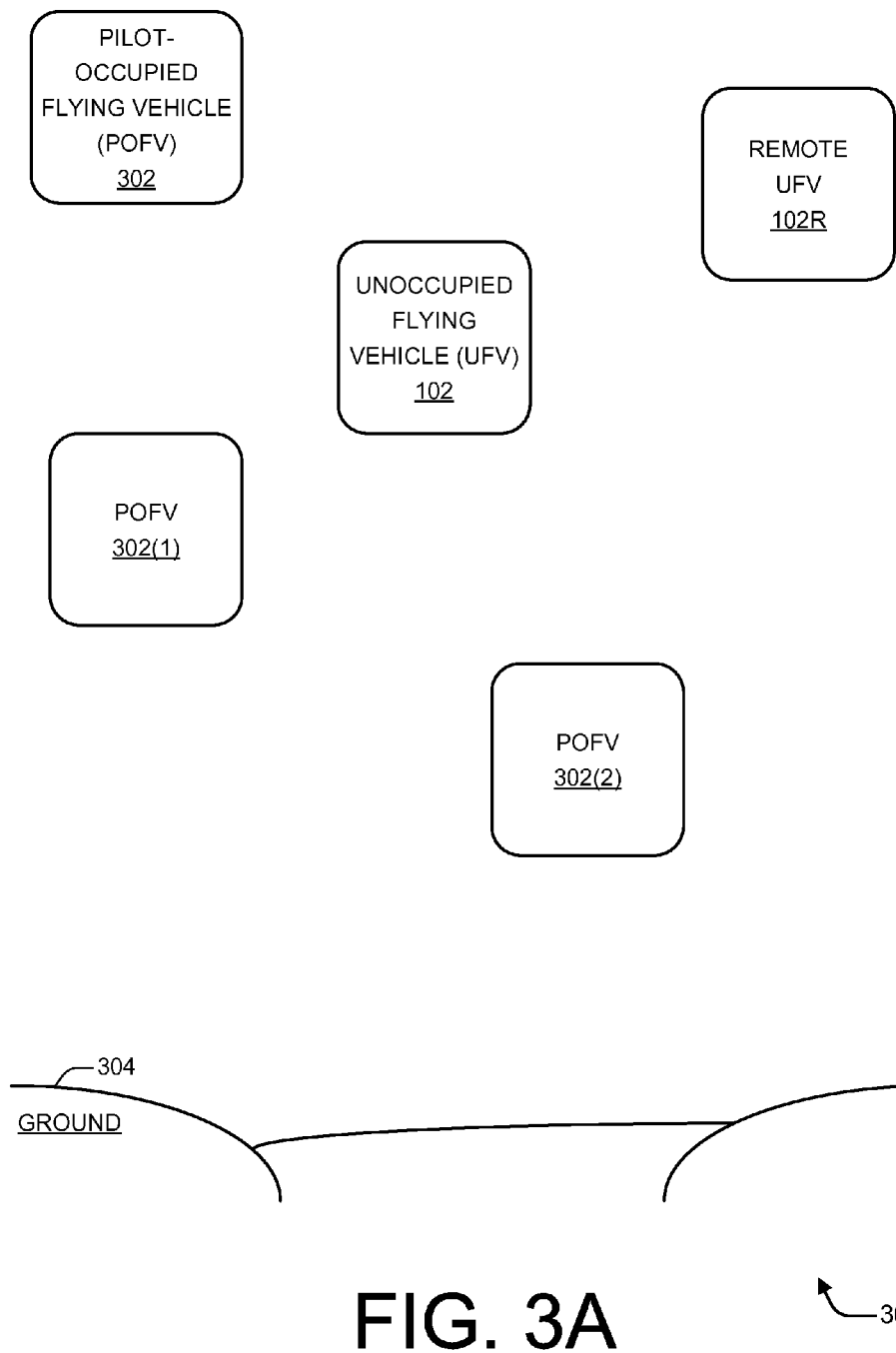
FIGS. 3A-3C are schematic diagrams of example UFV hazard handling scenarios or environments in accordance with certain example embodiments.
Figure 3B:
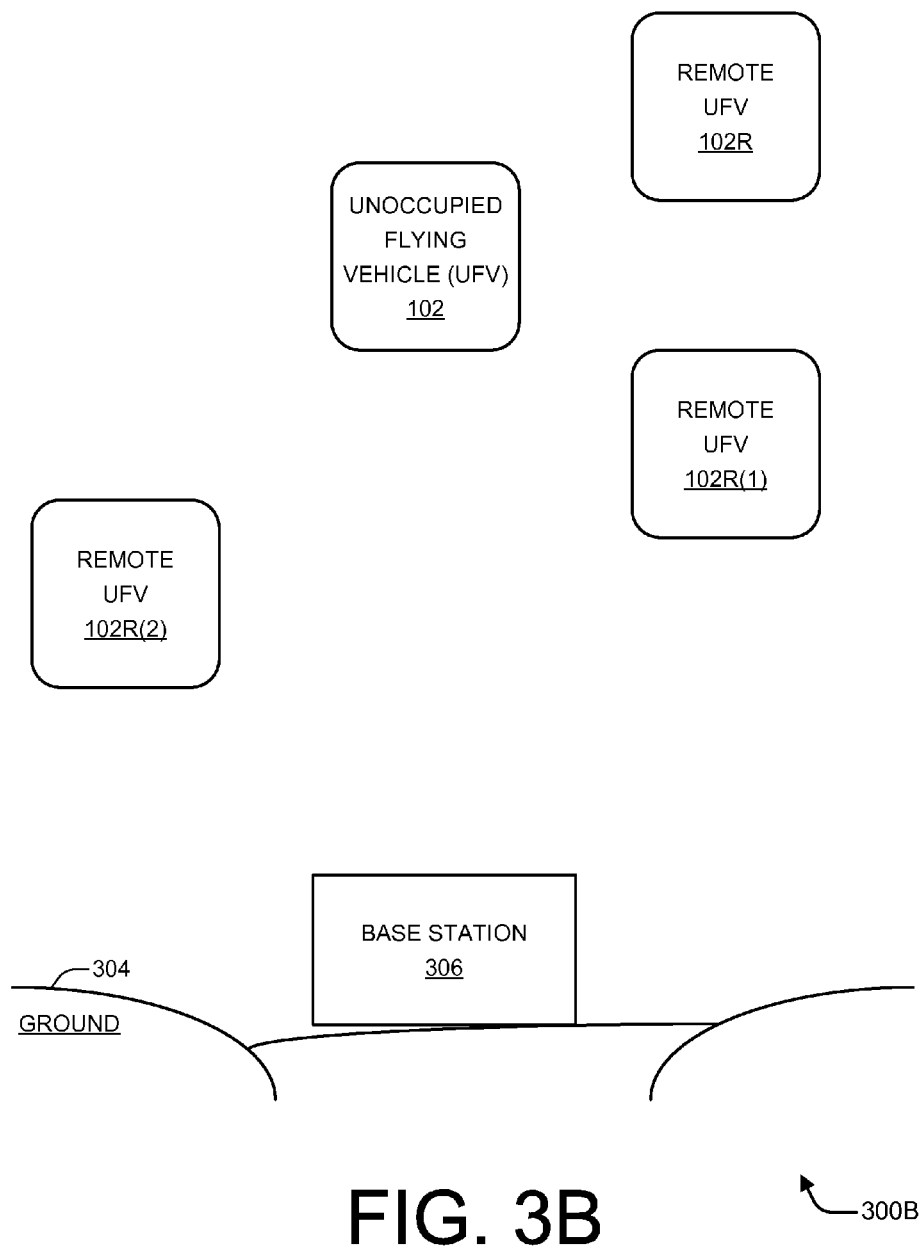
Figure 3C:
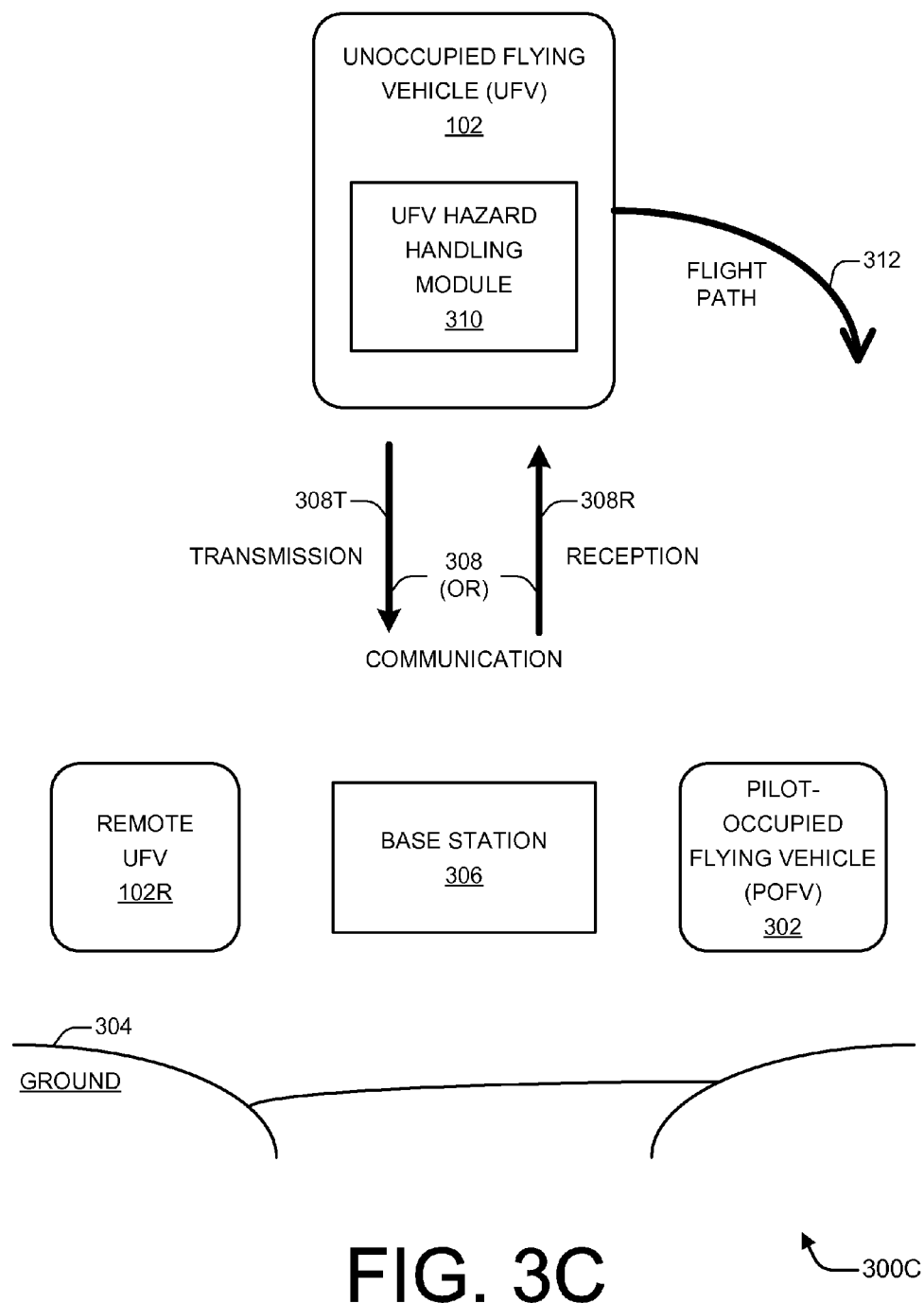

FIGS. 3A-3C are schematic diagrams 300A-300C, respectively, of example UFV hazard handling scenarios or environments in accordance with certain example embodiments. As shown in FIGS. 3A-3C, by way of example but not limitation, each of schematic diagrams 300A-300C may include at least one unoccupied flying vehicle (UFV) 102, at least one remote UFV 102R, or ground 304. In each scenario or environment of schematic diagrams 300A-300C, at least one UFV 102 may be flying above ground 304 and endeavoring to detect, sense, avoid, manage, mitigate, communicate about, coordinate over, eliminate, predict, remove, account for, remedy aftermath caused by, cooperate to address, or a combination thereof, etc. at least one hazard. For certain example embodiments, hazards may include, but are not limited to, other unoccupied flying vehicles, occupied flying vehicles, ground 304, buildings or other structures (not shown) on ground 304, moving objects, weather conditions, stationary objects, some combination thereof, or so forth. A UFV 102 may be attempting to accomplish a mission, an objective, a task, a combination thereof, or so forth. In operation, a UFV may be in communication with at least one remote UFV, at least one pilot-occupied flying vehicle (POFV), at least one base station (not shown in FIG. 3A), at least one other entity, a combination thereof, or so forth. Although scenarios or environments of schematic diagrams 300A-300C may be shown in the drawings or described herein individually or separately, at least portions or aspects of such scenarios or environments may be implemented or may otherwise occur at least partially jointly, simultaneously in time, overlapping in space, as part of a single or extended operational theater, a combination thereof, or so forth. However, claimed subject matter is not limited to any particular described embodiments, implementations, examples, etc.

FIG. 3A is a schematic diagram 300A of an example UFV hazard handling scenario or environment in accordance with certain example embodiments. As shown in FIG. 3A, by way of example but not limitation, schematic diagram 300A may include at least one UFV 102, at least one remote UFV 102R, at least one pilot-occupied flying vehicle (POFV) 302, or ground 304. More specifically, schematic diagram 300A may include a POFV 302, a first POFV 302(1), or a second POFV 302(2). For certain example embodiments, a POFV 302 may comprise or include a vehicle that is currently being controlled by an onboard human pilot. For certain example embodiments, ground 304 may include or comprise at least a portion of the earth, a landscape, a cityscape, a prairie, a hill, a mountain, a combination thereof, or so forth. However, claimed subject matter is not limited to any particular described embodiments, implementations, examples, etc.

FIG. 3B is a schematic diagram 300B of another example UFV hazard handling scenario or environment in accordance with certain example embodiments. As shown in FIG. 3B, by way of example but not limitation, schematic diagram 300B may include at least one UFV 102, at least one remote UFV 102R, ground 304, or at least one base station 306. More specifically, schematic diagram 300B may include a remote UFV 102R, a first remote UFV 102R(1), or a second remote UFV 102R(2). For certain example embodiments, a base station 306 may comprise or include a machine that is adapted to at least partially control or is capable of controlling a UFV 102 from a distance via at least one wireless communication (not explicitly shown in FIG. 3B). For certain example implementations, a base station 306 may be fixed within a building or on a mobile ground vehicle, may be capable of being hand-held, may be incorporated into or as part of another flying vehicle, a combination thereof, or so forth. For certain example implementations, a base station 306 may include or comprise a handheld controller (e.g., as may be used with an R/C model plane) for actual or near line-of-sight control, a workstation-sized or brief-case-sized controller that is mobile for operation out in the field (e.g., for police or corporate purposes), a larger apparatus that is typically stationary or may be housed in a secret or private building miles from an operational theater (e.g., for military or governmental purposes), a server-sized or distributed apparatus that provides control for a swarm of UFVs (e.g., for careful monitoring of a construction, agricultural, or warehouse site), some combination thereof, or so forth. For certain example embodiments, a base station 306 may be controlling at least one UFV, such as first remote UFV 102R(1) or second remote UFV 102R(2), while not controlling at least one other UFV, such as UFV 102 or remote UFV 102R (although it may be monitoring a UFV without controlling it). However, claimed subject matter is not limited to any particular described embodiments, implementations, examples, etc.

FIG. 3C is a schematic diagram 300C of another example UFV hazard handling scenario or environment in accordance with certain example embodiments. As shown in FIG. 3C, by way of example but not limitation, schematic diagram 300C may include at least one UFV 102, at least one remote UFV 102R, at least one POFV 302, ground 304, at least one base station 306, at least one communication 308, or at least one flight path 312. More specifically, UFV 102 may include at least one UFV hazard handling module 310, or communication 308 may include at least one transmission 308T or at least one reception 308R. For certain example embodiments, a UFV 102 may transmit at least one transmission 308T to or receive at least one reception 308R from at least one of a remote UFV 102R, a POFV 302, a base station 306, a combination thereof, or so forth. For certain example embodiments, a UFV hazard handling module 310 may affect or at least partially control a flight path of a UFV 102 at least partially based on at least one of a transmission 308T or a reception 308R. For certain example embodiments, a flight path 312 may comprise or include any one or more of: a flight trajectory, a heading, a speed, a direction, a velocity, an acceleration, a position, an altitude, a stability level, a destination, a two-dimensional course or a three-dimensional course through air or space, a course through a spherical geometrical space, a time or times at which a course is to be traversed, a time or times at which one or more positions or one or more altitudes are to be attained, a time or times at which other flight characteristic(s) are to be attained, extrapolated position-time stamp pairs based on current flight characteristic(s), extrapolated altitude-time stamp pairs based on current flight characteristic(s), a combination thereof, or so forth. However, claimed subject matter is not limited to any particular described embodiments, implementations, examples, etc.

For certain example embodiments, a remote UFV 102R, a POFV 302, or a base station 306 may participate in at least one communication 308, such as a transmission 308T or a reception 308R, with at least one UFV 102. Although not explicitly shown in schematic diagram 300C, for certain example embodiments, each of remote UFV 102R, POFV 302, or base station 306 may additionally or alternatively exchange at least one communication 308 with at least one other of remote UFV 102R, POFV 302, or base station 306. For certain example implementations, a remote UFV 102R may transmit at least one transmission 308T to or receive at least one reception 308R from at least one of a UFV 102, another remote UFV 102R, a POFV 302, a base station 306, a combination thereof, or so forth. For certain example implementations, a POFV 302 may transmit at least one transmission 308T to or receive at least one reception 308R from at least one of a UFV 102, a remote UFV 102R, another POFV 302, a base station 306, a combination thereof, or so forth. For certain example implementations, a base station 306 may transmit at least one transmission 308T to or receive at least one reception 308R from at least one of a UFV 102, a remote UFV 102R, a POFV 302, another base station 306, a combination thereof, or so forth. However, claimed subject matter is not limited to any particular described embodiments, implementations, examples, etc.

Figure 4:
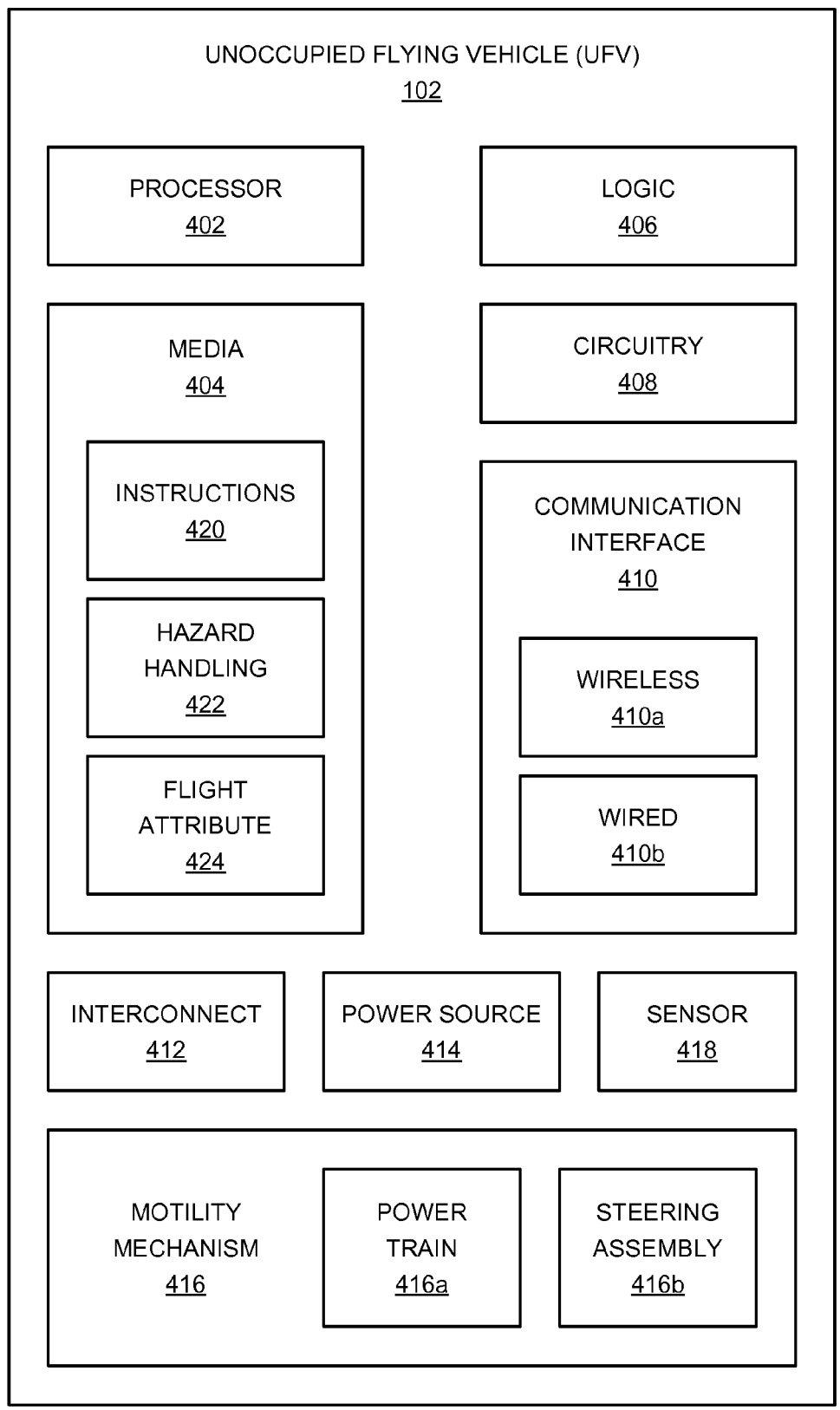
FIG. 4 is a schematic diagram of an example unoccupied flying vehicle (UFV) including one or more example components in accordance with certain example embodiments.

FIG. 4 is a schematic diagram 400 of an example unoccupied flying vehicle (UFV) including one or more example components in accordance with certain example embodiments. As shown in FIG. 4, a UFV 102 may include one or more components such as: at least one processor 402, one or more media 404, logic 406, circuitry 408, at least one communication interface 410, at least one interconnect 412, at least one power source 414, at least one motility mechanism 416, one or more sensors 418, some combination thereof, or so forth. Furthermore, as shown in schematic diagram 400, one or more media 404 may include one or more instructions 420, at least one hazard handling 422 routine, one or more flight attributes 424, some combination thereof, or so forth; a communication interface 410 may include at least one wireless communication interface 410a, at least one wired communication interface 410b, some combination thereof, or so forth; or a motility mechanism 416 may include at least one power train 416a, at least one steering assembly 416b, some combination thereof, or so forth. However, a UFV 102 may alternatively include more, fewer, or different component(s) from those that are illustrated without departing from claimed subject matter.

For certain example embodiments, a UFV 102 may include or comprise at least one machine that is capable of flight, flight control processing, (local) flight control, some combination thereof, or so forth. UFV 102 may include, for example, a computing platform or any electronic device having at least one processor or memory. Processor 402 may include, by way of example but not limitation, any one or more of a general-purpose processor, a specific-purpose processor, a digital signal processor (DSP), a processing unit, some combination thereof, or so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, processing cores, discrete/fixed logic circuitry, controllers, micro-controllers, microprocessors, some combination thereof, or so forth. Media 404 may bear, store, contain, include, provide access to, or a combination thereof, etc. instructions 420, which may be executable by a processor 402; at least one hazard handling 422 routine, which may at least partially form at least a portion of instructions 420; one or more flight attributes 424; some combination thereof; or so forth. Instructions 420 may include or comprise, by way of example but not limitation, a program, a module, an application or app (e.g., that is native, that runs in a browser, that runs within a virtual machine, or a combination thereof, etc.), an operating system, or a combination thereof, etc. or portion thereof; operational data structures; source code, object code, just-in-time (JIT) compiled code, or a combination thereof, etc.; processor-executable instructions; other code; some combination thereof; or so forth. Media 404 may include, by way of example but not limitation, processor-accessible or non-transitory media (e.g., memory, random access memory (RAM), read only memory (ROM), flash memory, hard drives, disk-based media, disc-based media, magnetic storage, optical storage, volatile memory, nonvolatile memory, or a combination thereof, etc.) that is capable of bearing instructions, one or more hazard handling routines, one or more flight attributes, some combination thereof, or so forth.

For certain example embodiments, execution of instructions 420 by one or more processors 402 may transform at least a portion of UFV 102 into a special-purpose computing device, apparatus, platform, some combination thereof, or so forth. Instructions 420 may include, for example, instructions that are capable of realizing at least a portion of one or more flow diagrams, methods, processes, procedures, operations, functionality, technology, mechanisms, or a combination thereof, etc. that are described herein or illustrated in the accompanying drawings. A hazard handling 422 routine may include, for example, instructions that are capable of realizing at least a portion of one or more flow diagrams, methods, processes, procedures, operations, functionality, technology, mechanisms, or a combination thereof, etc. that are described herein or illustrated in the accompanying drawings or that are directed toward detecting, sensing, avoiding, managing, mitigating, communicating about, coordinating over, eliminating, predicting, removing, accounting for, remedying aftermath caused by, cooperating to address, or a combination thereof, etc. at least one hazard. A flight attribute 424 may include, for example, data describing or representing at least one flight attribute of a UFV, such as one or more flight characteristics, one or more flight capabilities, a combination thereof, or so forth. Additionally or alternatively, at least a portion of flight attributes 424 may be at least partially accessible to or integrated with hazard handling 422.

For certain example embodiments, logic 406 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings. Circuitry 408 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings, wherein circuitry 408 includes at least one physical or hardware component or aspect.

For certain example embodiments, one or more communication interfaces 410 may provide one or more interfaces between UFV 102 and another machine or a person/operator. With respect to a person/operator, a communication interface 410 may include, by way of example but not limitation, a screen, a speaker, keys/buttons, a microphone, or other person-device input/output apparatuses. A wireless communication interface 410a or a wired communication interface 410b may also or alternatively include, by way of example but not limitation, a transceiver (e.g., a transmitter or a receiver), a radio, an antenna, a wired interface connector or other similar apparatus (e.g., a network connector, a universal serial bus (USB) connector, a proprietary connector, a Thunderbolt® or Light Peak® connector, or a combination thereof, etc.), a physical or logical network adapter or port, a frequency converter, a baseband processor, a photoreceptor, or a combination thereof, etc. to communicate wireless signals or wired signals via one or more wireless communication links or wired communication links, respectively. Communications with at least one communication interface 410 may enable transmitting, receiving, or initiating of transmissions, just to name a few examples.

For certain example embodiments, at least one interconnect 412 may enable signal communication between or among components of UFV 102. Interconnect 412 may include, by way of example but not limitation, one or more buses, channels, switching fabrics, some combination thereof, or so forth. Although not explicitly illustrated in FIG. 4, one or more components of UFV 102 may be coupled to interconnect 412 via a discrete or integrated interface. By way of example only, one or more interfaces may couple a communication interface 410 or a processor 402 to at least one interconnect 412. For certain example embodiments, at least one power source 414 may provide power to one or more components of UFV 102. Power source 414 may include, by way of example but not limitation, a battery, a power connector, a solar power source or charger, a mechanical power source or charger, a fuel source, a generator, an engine, some combination thereof, or so forth.

For certain example embodiments, at least one sensor 418 may sense, produce, or otherwise provide at least one sensor value. Sensors 418 may include, by way of example only, a camera, a microphone, an accelerometer, a thermometer, a satellite positioning system (SPS) sensor, a barometer, a humidity sensor, a compass, an altimeter, an airspeed detector, a gyroscope, a magnetometer, a pressure sensor, an oscillation detector, a light sensor, an inertial measurement unit (IMU), a tactile sensor, a touch sensor, a flexibility sensor, a microelectromechanical system (MEMS), some combination thereof, or so forth. Values provided by at least one sensor 418 may include, by way of example but not limitation, an image/video, a sound recording, an acceleration value, a temperature, one or more SPS coordinates, a barometric pressure, a humidity level, a compass direction, an altitude, an airspeed, a gyroscopic value, a magnetic reading, a pressure value, an oscillation value, an ambient light reading, inertial readings, touch detections, proximate object location, flex detections, some combination thereof, or so forth.

For certain example embodiments, a motility mechanism 416 may enable UFV 102 to fly, overcome gravitational forces, overcome wind resistance or drag, accelerate, avoid a hazard, some combination thereof, or so forth. For certain example embodiments, a power train 416a of a motility mechanism 416 may include one or more components that work separately or at least partially together to transform or convert stored energy into kinetic energy in order to propel UFV 102. For certain example implementations, a power train 416a may include at least one engine, at least one transmission, one or more blades or propellers, at least one motor, some combination thereof, or so forth. For certain example embodiments, a steering assembly 416b of a motility mechanism 416 may include one or more components that work separately or at least partially together to transform propulsive kinetic energy into forward, backward, up, down, right, left, a combination thereof, etc. movement or some other directionality change for a UFV. For certain example implementations, a steering assembly 416b may include at least one aileron, at least one rudder, at least one elevator, one or more blades or propellers, at least one transmission that routes power to different motors or other propulsive components, at least one rotor disk tilter, at least one blade pitch angle changer, or a combination thereof, or so forth. Although illustrated separately in schematic diagram 400, power train 416a and steering assembly 416b may be implemented at least partially jointly to realize motility mechanism 416.

However, claimed subject matter is not limited to any particular described embodiments, implementations, examples, or so forth. For instance, it should be understood that for certain example implementations components that are illustrated separately in FIG. 4 may not necessarily be separate or mutually exclusive. For example, a given component may provide multiple functionalities. By way of example only, a single component such as a photodetector may function as a wireless communication interface 410*a* or a sensor 418. Additionally or alternatively, one or more instructions 420 may function to realize or embody at least part of hazard handling 422 or flight attributes 424.

It should also be understood that for certain example implementations components that are illustrated in schematic diagram 400 or described herein may or may not be integral with or integrated into or onto a UFV 102. For example, a component may be removably connected to a UFV 102, a component may be wirelessly coupled to a UFV 102, some combination thereof, or so forth. By way of example only, instructions 420 may be stored on a removable card having at least one medium 404. Additionally or alternatively, at least a portion of a motility mechanism 416, such as an engine or a fuel source, may be detachable from or replaceable with a UFV 102. However, claimed subject matter is not limited to any particular described embodiments, implementations, examples, etc.

Figure 5:
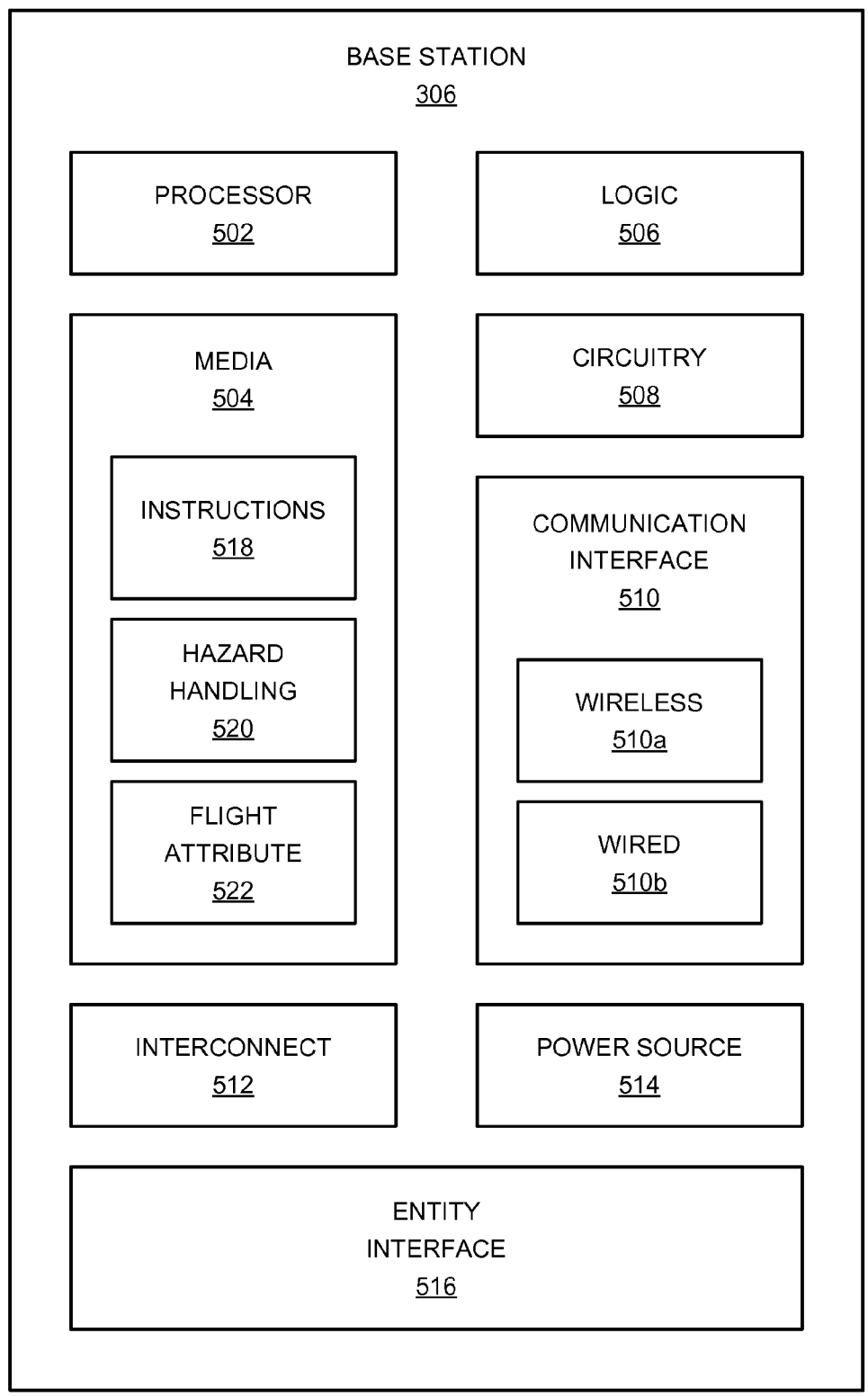
FIG. 5 is a schematic diagram of an example base station, which may be in communication with at least one UFV, including one or more example components for a base station in accordance with certain example embodiments.

FIG. 5 is a schematic diagram 500 of an example base station, which may be in communication with at least one UFV (not shown in FIG. 5), including one or more example components for a base station in accordance with certain example embodiments. As shown in FIG. 5, a base station 306 may include one or more components such as: at least one processor 502, one or more media 504, logic 506, circuitry 508, at least one communication interface 510, at least one interconnect 512, at least one power source 514, at least one entity interface 516, some combination thereof, or so forth. Furthermore, as shown in schematic diagram 500, one or more media 504 may include one or more instructions 518, at least one hazard handling 520 routine, at least one flight attribute 522, some combination thereof, or so forth; or communication interface 510 may include at least one wireless communication interface 510*a*, at least one wired communication interface 510*b*, some combination thereof, or so forth. However, a base station 306 may alternatively include more, fewer, or different component(s) from those that are illustrated without departing from claimed subject matter.

For certain example embodiments, a base station 306 may include or comprise at least one machine that is capable of flight control processing, (distant) flight control, some combination thereof, or so forth. Base station 306 may include, for example, a computing platform or any electronic device or devices having at least one processor or memory. Processor 502 may include, by way of example but not limitation, any one or more of a general-purpose processor, a specific-purpose processor, a digital signal processor (DSP), a processing unit, some combination thereof, or so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, processing cores, discrete/fixed logic circuitry, controllers, micro-controllers, microprocessors, some combination thereof, or so forth. Media 504 may bear, store, contain, include, provide access to, or a combination thereof, etc. instructions 518, which may be executable by a processor 502; at least one hazard handling 520 routine, which may at least partially form at least a portion of instructions 518; one or more flight attributes 522; some combination thereof; or so forth. Instructions 518 may include or comprise, by way of example but not limitation, a program, a module, an application or app (e.g., that is native, that runs in a browser, that runs within a virtual machine or server, or a combination thereof, etc.), an operating system, or a combination thereof, etc. or portion thereof; operational data structures; source code, object code, just-in-time (JIT) compiled code, or a combination thereof, etc.; processor-executable instructions; other code; some combination thereof; or so forth. Media 504 may include, by way of example but not limitation, processor-accessible or non-transitory media (e.g., memory, random access memory (RAM), read only memory (ROM), flash memory, hard drives, disk-based media, disc-based media, magnetic storage, optical storage, volatile memory, nonvolatile memory, or a combination thereof, etc.) that is capable of bearing instructions, one or more hazard handling routines, one or more flight attributes, some combination thereof, or so forth.

For certain example embodiments, execution of instructions 518 by one or more processors 502 may transform at least a portion of base station 306 into a special-purpose computing device, apparatus, platform, some combination thereof, or so forth. Instructions 518 may include, for example, instructions that are capable of realizing at least a portion of one or more flow diagrams methods, processes, procedures, operations, functionality, technology, mechanisms, or a combination thereof, etc. that are described herein or illustrated in the accompanying drawings. A hazard handling 520 routine may include, for example, instructions that are capable of realizing at least a portion of one or more flow diagrams, methods, processes, procedures, operations, functionality, technology, mechanisms, or a combination thereof, etc. that are described herein or illustrated in the accompanying drawings and that are directed toward interacting with at least one UFV to facilitate detecting, seeing, avoiding, managing, mitigating, communicating about, coordinating over, eliminating, predicting, removing, accounting for, remedying aftermath caused by, cooperating to address, or a combination thereof, etc. at least one hazard. A flight attribute 522 may include, for example, data describing or representing at least one flight attribute, such as one or more flight characteristics, one or more flight capabilities, a combination thereof, etc. of at least one UFV that base station 306 is communicating with, is at least partially controlling, is monitoring, some combination thereof, or so forth. Additionally or alternatively, at least a portion of flight attributes 522 may be at least partially accessible to or integrated with hazard handling 520.

For certain example embodiments, logic 506 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings. Circuitry 508 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings, wherein circuitry 508 includes at least one physical or hardware component or aspect.

For certain example embodiments, one or more communication interfaces 510 may provide one or more interfaces between base station 306 and another machine or a person/operator/entity directly or indirectly. A wireless communication interface 510a or a wired communication interface 510b may also or alternatively include, by way of example but not limitation, a transceiver (e.g., a transmitter or a receiver), a radio, an antenna, a wired interface connector or other similar apparatus (e.g., a network connector, a universal serial bus (USB) connector, a proprietary connector, a Thunderbolt® or Light Peak® connector, a gateway, or a combination thereof, etc.), a physical or logical network adapter or port, a frequency converter, a baseband processor, an internet or telecommunications backbone connector, a fiber optic connector, a storage area network (SAN) connector, or a combination thereof, etc. to communicate wireless signals or wired signals via one or more wireless communication links or wired communication links, respectively. Communications with at least one communication interface 510 may enable transmitting, receiving, or initiating of transmissions, just to name a few examples.

For certain example embodiments, at least one interconnect 512 may enable signal communication between or among components of base station 306. Interconnect 512 may include, by way of example but not limitation, one or more buses, channels, switching fabrics, local area networks (LANs), storage area networks (SANs), some combination thereof, or so forth. Although not explicitly illustrated in FIG. 5, one or more components of base station 306 may be coupled to interconnect 512 via a discrete or integrated interface. By way of example only, one or more interfaces may couple a processor 502 or a medium 504 to at least one interconnect 512. For certain example embodiments, at least one power source 514 may provide power to one or more components of base station 306. Power source 514 may include, by way of example but not limitation, a power connector for accessing an electrical grid, a fuel cell, a solar power source, one or more batteries, some combination thereof, or so forth.

For certain example embodiments, an entity interface 516 may enable one or more entities (e.g., a person, a group, an electronic agent, a robotic entity, or a combination thereof, etc.) to provide input to or receive output from base station 306. Interactions between an entity and a base station may relate, by way of example but not limitation, to inputting or outputting instructions, commands, settings, flight characteristics, flight capabilities, some combination thereof, or so forth. Certain entity interfaces 516 may enable both entity input and entity output at base station 306 or over at least one network link.

However, claimed subject matter is not limited to any particular described embodiments, implementations, examples, or so forth. For instance, it should be understood that for certain example implementations components that are illustrated separately in FIG. 5 need not necessarily be separate or mutually exclusive. For example, a given component may provide multiple functionalities. By way of example only, hard-wired logic 506 may form circuitry 508. Additionally or alternatively, a single component such as a connector may function as a communication interface 510 or as an entity interface 516. Additionally or alternatively, one or more instructions 518 may function to realize or embody at least part of hazard handling 520 or flight attributes 522.

It should also be understood that for certain example implementations components that are illustrated in schematic diagram 500 or described herein may not be integral or integrated with a base station 306. For example, a component may be removably connected to a base station 306, a component may be wirelessly coupled to a base station 306, one or more components of a base station 306 may be geographically distributed or separated from one another, some combination thereof, or so forth. By way of example only, instructions 518 may be stored on one medium 504, and flight attributes 522 (or another portion of instructions 518) may be stored on a different medium 504, which may be part or a same server or a part of a different server of, e.g., a server farm. Additionally or alternatively, respective processor-media pairs, if any, may be physically realized on different or respective server blades or server containers for a base station 306 that is implemented on server hardware. However, claimed subject matter is not limited to any particular described embodiments, implementations, examples, etc.

Figure 6A:
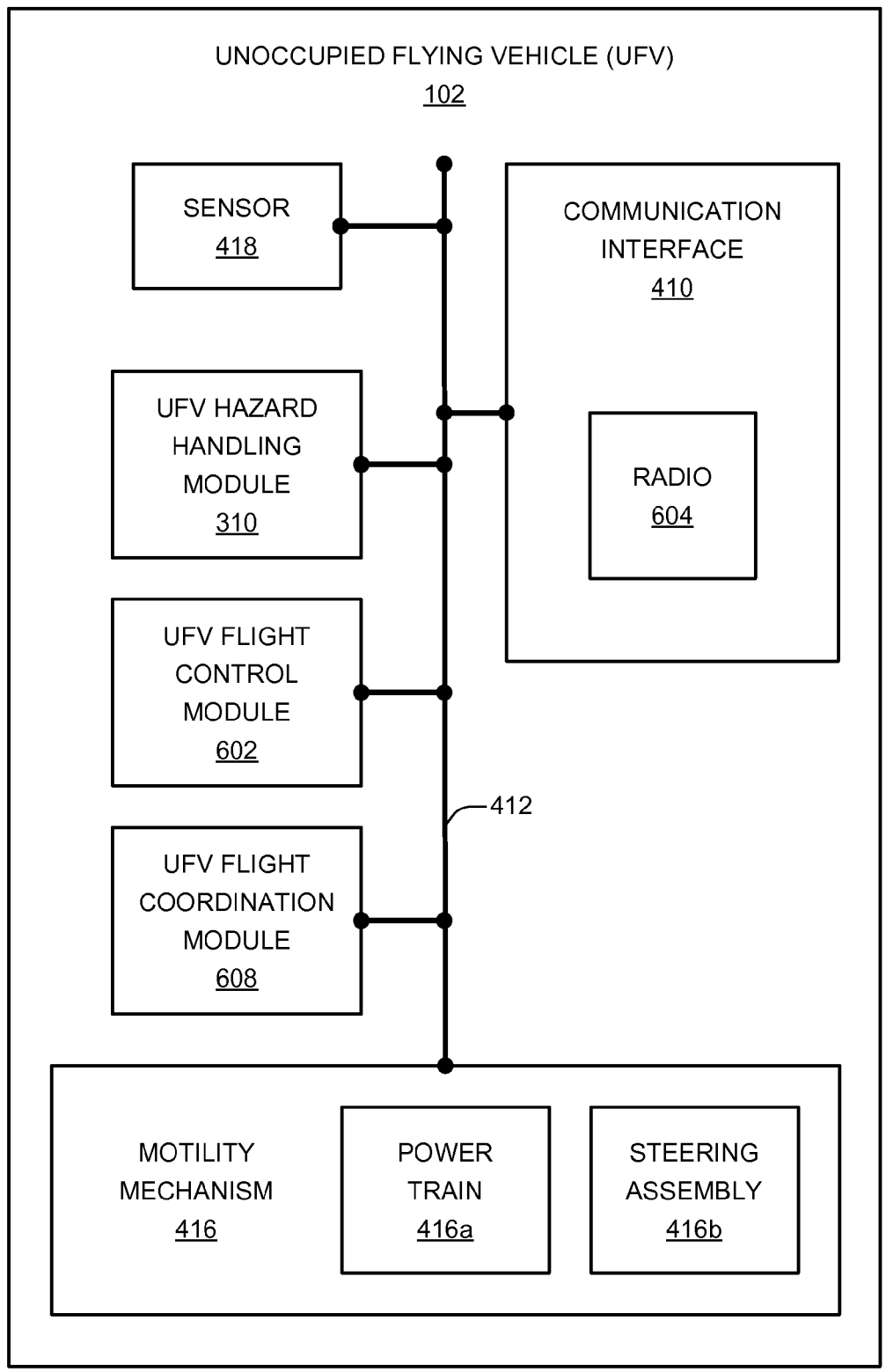
FIG. 6A is a schematic diagram of an example UFV that has one or more functional modules or one or more operational components in accordance with certain example embodiments.

FIG. 6A is a schematic diagram 600A of an example UFV that has one or more functional modules or one or more operational components in accordance with certain example embodiments. As shown in FIG. 6A, example UFV 102 of schematic diagram 600A may include, by way of example but not limitation, at least one UFV hazard handling module 310, at least one communication interface 410, at least one interconnect 412, at least one motility mechanism 416, one or more sensors 418, at least one UFV flight control module 602, or at least one UFV flight coordination module 608. More specifically, communication interface 410 may include at least one radio 604, or so forth; or motility mechanism 416 may include at least one power train 416a, at least one steering assembly 416b, some combination thereof, or so forth. However, a UFV 102 may alternatively include more, fewer, or different module(s) or component(s) from those that are illustrated without departing from claimed subject matter.

For certain example embodiments, a UFV hazard handling module 310, a UFV flight control module 602, a UFV flight coordination module 608, or some combination thereof, etc. may operate to implement, perform, facilitate performance of, or a combination thereof, etc. one or more flow diagrams, methods, processes, procedures, operations, functionality, technology, modules, mechanisms, or a combination thereof, etc. that are described herein or illustrated in the accompanying drawings or that relate to handling an actual or a potential hazard. Example aspects related to hazard handling in a UFV context are described further herein above and below. Although UFV hazard handling module 310, UFV flight control module 602, and UFV flight coordination module 608 are illustrated separately in schematic diagram 600A, they may additionally or alternatively be implemented at least partially in combination, jointly, with an overlapping functionality, some combination thereof, or so forth. For certain example embodiments, and by way of example but not limitation, at least a portion of one or more modules (e.g., module 702, module 704, or a combination thereof, etc.) that are described herein below with particular reference to FIG. 7A may be implemented as at least part of UFV hazard handling module 310, as at least part of UFV flight control module 602, as at least part of UFV flight coordination module 608, some combination thereof, or so forth. However, claimed subject matter is not limited to any particular described embodiments, implementations, examples, etc.

For certain example embodiments, a module of a UFV 102 may include or be comprised of at least one processor (e.g., a processor 402 of FIG. 4, etc.), one or more media (e.g., a medium 404 of FIG. 4, etc.), executable instructions (e.g., processor-executable instructions, instructions 420 of FIG. 4, computer-implementable instructions, etc.) incorporated into one or more media, logic (e.g., logic 406 of FIG. 4, etc.), circuitry (e.g., circuitry 408 of FIG. 4, etc.), other described or illustrated component(s), may be comprised as otherwise described herein, some combination thereof, or so forth. For certain example implementations, one or more modules (e.g., a UFV hazard handling module 310, a UFV flight control module 602, a UFV flight coordination module 608, or a combination thereof, etc.) of at least one UFV 102 may function or interoperate with one or more modules of at least one other UFV (e.g., a remote UFV 102R), at least one POFV 302, at least one base station 306 (e.g., each of FIGS. 3A-3C or FIG. 6B), or a combination thereof, etc. via at least one radio 604 of UFV 102, such as by sending one or more commands to another UFV (e.g., a remote UFV 102R) directly or indirectly (e.g., with a third UFV forming a relay, with a base station of the other UFV forwarding a command, a combination thereof, etc.). However, claimed subject matter is not limited to any particular described embodiments, implementations, examples, etc.

For certain example embodiments, UFV 102 may be in constant, infrequent, regular, irregular, intermittent, occasional, scheduled, unscheduled, a combination thereof, etc. communication with at least one remote UFV 102R, at least one POFV 302, at least one base station 306, or a combination thereof, etc. via at least one radio 604. One or more sensors 418 or at least one radio 604 may feed sensor readings, telemetry, flight attributes, weather conditions, topographical maps, coordination parameters, one or more automated hazard handling routines, a combination thereof, etc. to UFV hazard handling module 310, UFV flight control module 602, UFV flight coordination module 608, a combination thereof, or so forth. For certain example implementations, UFV hazard handling module 310 may at least make hazard-related flight control decisions or provide flight control input to UFV flight control module 602 or UFV flight coordination module 606 with regard to handling actual or potential hazards. For certain example implementations, UFV flight control module 602 may at least partially make flight control decisions or provide flight control commands to motility mechanism 416 so as to implement flight control decisions, including, by way of example but not limitation, based at least partly on flight control input provided by UFV hazard handling module 310. For certain example embodiments, UFV flight coordination module 608 may at least make multi-UFV coordination flight control decisions or make flight control decisions for at least one other UFV (e.g., at least one remote UFV 102R) or provide flight control input to UFV flight control module 602 or UFV hazard handling module 310 with regard to controlling at least one other UFV or with regard to coordinating two or more UFVs (e.g., including one or more other UFVs), with or without involvement by a base station. For certain example implementations, UFV flight coordination module 608 may at least partially make flight control decisions or formulate flight control commands for UFV 102 or another UFV (e.g., via transmission using radio 604 to another UFV and possible application to a motility mechanism 416 (e.g., of FIG. 6A) of the other UFV) so as to realize flight control decisions, including, by way of example but not limitation, based at least partly on flight control input provided by at least UFV hazard handling module 310 or a base station 306 (e.g., of FIG. 6B). Additionally or alternatively, a UFV hazard handling module 310 may supply flight control input, including by way of example but not limitation with at least one flight control command, directly (e.g., without routing it first through UFV flight control module 602 or UFV flight coordination module 608) to motility mechanism 416. To implement flight control decisions, including flight control commands, motility mechanism 416 may employ power train 416a to provide at least one propulsive force or may employ steering assembly 416b to provide at least one directional change. However, claimed subject matter is not limited to any particular described embodiments, implementations, examples, etc.

Figure 6B:
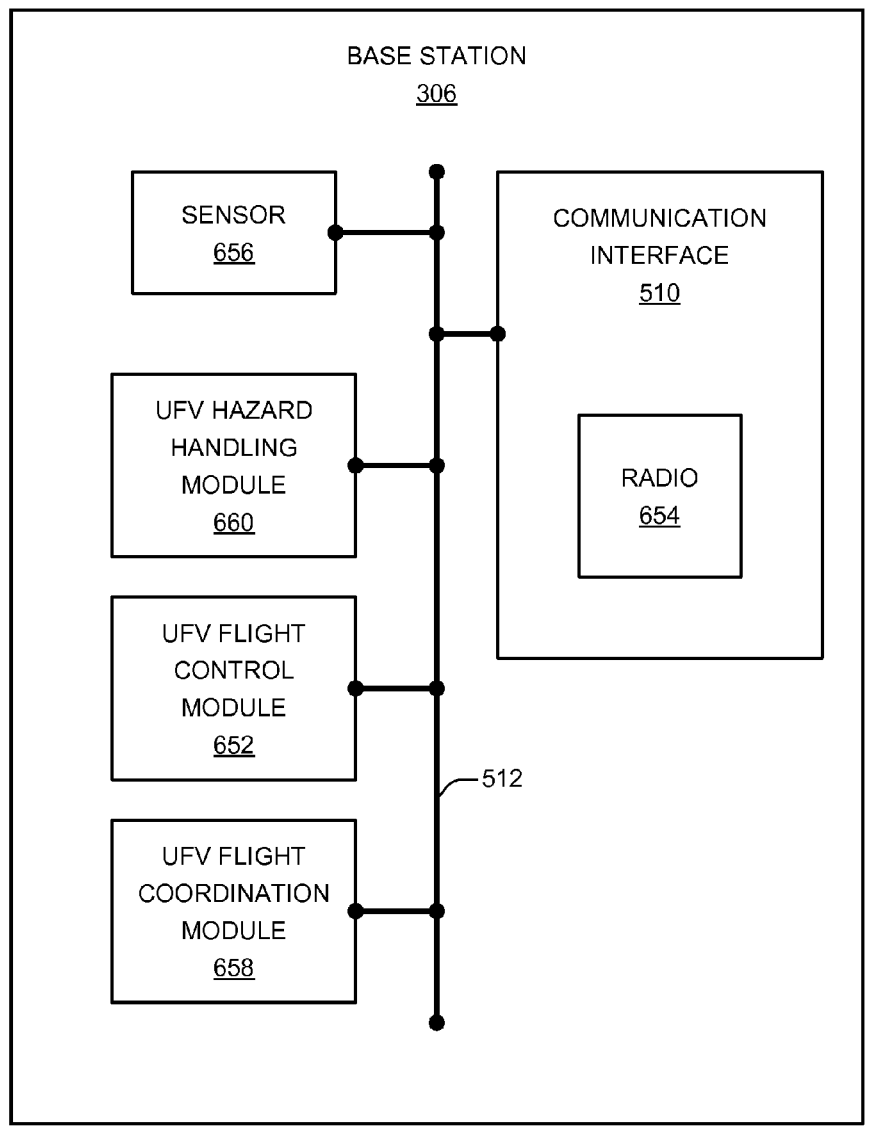
FIG. 6B is a schematic diagram of an example base station that has one or more functional modules or one or more operational components in accordance with certain example embodiments.

FIG. 6B is a schematic diagram 600B of an example base station that has one or more functional modules or one or more operational components in accordance with certain example embodiments. As shown in FIG. 6B, example base station 306 of schematic diagram 600B may include, by way of example but not limitation, at least one communication interface 510, at least one interconnect 512, at least one UFV flight control module 652, at least one sensor 656, at least one UFV flight coordination module 658, or at least one UFV hazard handling module 660. More specifically, communication interface 510 may include at least one radio 654, or so forth. However, a base station 306 may alternatively include more, fewer, or different module(s) or component(s) from those that are illustrated without departing from claimed subject matter. Moreover, module(s) or component (s) that are illustrated in schematic diagram 600B may alternatively or additionally be separate from or non-integrated with a base station 306, such as being external to a housing of or remotely-accessible to a base station 306, for certain example implementations.

For certain example embodiments, a UFV hazard handling module 660, a UFV flight coordination module 658, a UFV flight control module 652, or a combination thereof, etc. may operate to implement, perform, facilitate performance of, or a combination thereof, etc. one or more flow diagrams, methods, processes, procedures, operations, functionality, technology, modules, mechanisms, or a combination thereof, etc. that are described herein or illustrated in the accompanying drawings or that relate to handling of an actual or a potential hazard. Example aspects related to hazard handling in a UFV context with at least one base station are described further herein above and below. Although UFV hazard handling module 660, UFV flight control module 652, and UFV flight coordination module 658 are illustrated separately in schematic diagram 600B, they may additionally or alternatively be implemented at least partially in combination, jointly, with an overlapping functionality, some combination thereof, or so forth. However, claimed subject matter is not limited to any particular described embodiments, implementations, examples, etc.

For certain example embodiments, a module of a base station 306 may include or be comprised of at least one processor (e.g., a processor 502 of FIG. 5, etc.), one or more media (e.g., a medium 504 of FIG. 5, etc.), executable instructions (e.g., processor-executable instructions, instructions 518 of FIG. 5, computer-implementable instructions, etc.) incorporated into one or more media, logic (e.g., logic 506 of FIG. 5, etc.), circuitry (e.g., circuitry 508 of FIG. 5, etc.), other described or illustrated component(s), may be comprised as otherwise described herein, some combination thereof, or so forth. For certain example embodiments, one or more modules (e.g., a UFV hazard handling module 660, a UFV flight control module 652, a UFV flight coordination module 658, or a combination thereof, etc.) of at least one base station 306 may function or interoperate with one or more modules of at least one UFV 102, at least one remote UFV 102R, at least one POFV 302, at least one other base station 306 (e.g., each of FIG. 3A-3C or 6A), or a combination thereof, etc. via at least one radio 654 (or via a wired connection (not explicitly shown in FIG. 6B) of a communication interface 510) of base station 306, such as by sending one or more commands to a UFV 102. However, claimed subject matter is not limited to any particular described embodiments, implementations, examples, etc.

For certain example embodiments, a base station 306 may be in constant, infrequent, regular, irregular, intermittent, occasional, scheduled, unscheduled, a combination thereof, etc. communication with at least one UFV 102, at least one remote UFV 102R, at least one POFV 302, at least one first UFV, at least one second UFV, at least one other base station 306, or a combination thereof, etc. via at least one radio 654. For certain example implementations, one or more sensors 656 (e.g., such as one or more of example sensor types described herein above with particular reference to sensor 418 (e.g., for a UFV 102 of FIG. 4)) or at least one radio 654 may feed sensor readings, telemetry, flight attributes, weather conditions, topographical maps, coordination parameters, at least one automated hazard handling routine, a combination thereof, etc. to UFV hazard handling module 660, UFV flight control module 652, UFV flight coordination module 658, a combination thereof, or so forth. For certain example embodiments, UFV hazard handling module 660 may at least make hazard-related flight control decisions or provide flight control input to UFV flight control module 652 or UFV flight coordination module 658 with regard to handling actual or potential hazards. For certain example embodiments, UFV flight coordination module 658 may at least make multi-UFV coordination flight control decisions or provide flight control input to UFV flight control module 652 or UFV hazard handling module 660 with regard to coordinating two or more UFVs, with or without involvement by another base station. For certain example embodiments, UFV flight control module 652 may at least partially make flight control decisions or formulate flight control commands (e.g., for transmission via radio 654 to a UFV 102 and possible application to a motility mechanism 416 (e.g., of FIG. 6A) thereof) so as to realize flight control decisions, including, by way of example but not limitation, based at least partly on flight control input provided by at least UFV hazard handling module 660 or UFV flight coordination module 658. However, claimed subject matter is not limited to any particular described embodiments, implementations, examples, etc.

Figure 7A:
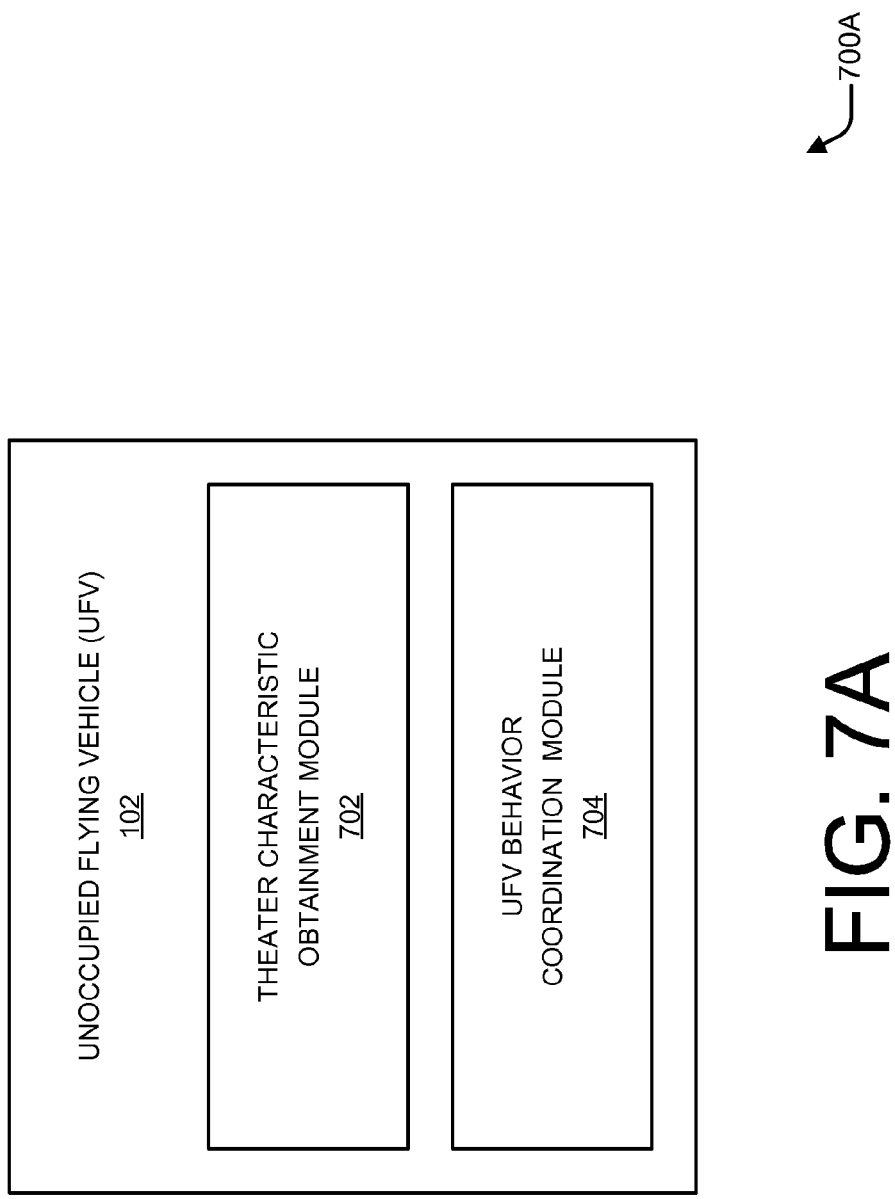
FIG. 7A is a schematic diagram that includes at least one example machine, such as an unoccupied flying vehicle (UFV), that is capable of handling scenarios for UFV coordination in accordance with certain example embodiments.

FIG. 7A is a schematic diagram 700A that includes at least one example machine, such as an unoccupied flying vehicle (UFV), that is capable of handling scenarios for UFV coordination in accordance with certain example embodiments. As shown in FIG. 7A, by way of example but not limitation, schematic diagram 700A includes at least one machine that may include at least one theater characteristic obtainment module 702 or at least one UFV behavior coordination module 704. More specifically, schematic diagram 700A may include a machine that includes or comprises at least one UFV 102. By way of example but not limitation, a theater characteristic obtainment module 702 or a UFV behavior coordination module 704 may include or comprise or be realized with at least one processor that executes instructions (e.g., sequentially, in parallel, at least partially overlapping in a time-multiplexed fashion, at least partially across multiple cores, or a combination thereof, etc.) as at least one special-purpose computing component, or otherwise as described herein. However, claimed subject matter is not limited to any particular described embodiments, implementations, examples, etc.

For certain example embodiments, a theater characteristic obtainment module 702 or a UFV behavior coordination module 704 may be implemented separately or at least partially jointly or in combination. For certain example implementations, a theater characteristic obtainment module 702 may be configured to obtain one or more theater characteristics. For certain example implementations, a UFV behavior coordination module 704 may be configured to coordinate at least one behavior of at least one UFV based, at least partially, on one or more theater characteristics. However, claimed subject matter is not limited to any particular described embodiments, implementations, examples, etc.

FIGS. 7B-7E are schematic diagrams 700B-700E that include at least one example machine and that depict example scenarios for implementing UFV coordination in accordance with certain example embodiments. As shown in FIGS. 7B-7E, by way of example but not limitation, one or more of schematic diagrams 700B-700E may include at least one UFV 102, at least one theater characteristic 710, at least one obtainment 712, at least one coordination 714, at least one behavior 716, or at least one remote UFV 102R. Each of schematic diagrams 700B-700E may include alternative or additional depictions, which may relate to UFV coordination, as described herein. In addition to or in alternative to description herein below with specific reference to FIGS. 7B-7E, illustrated aspects of schematic diagrams 700B-700E may be relevant to example description with reference to FIG. 8A-8C, 9A-9F, or 10A-10B. However, claimed subject matter is not limited to any particular described embodiments, implementations, examples, etc.

Figure 7B:
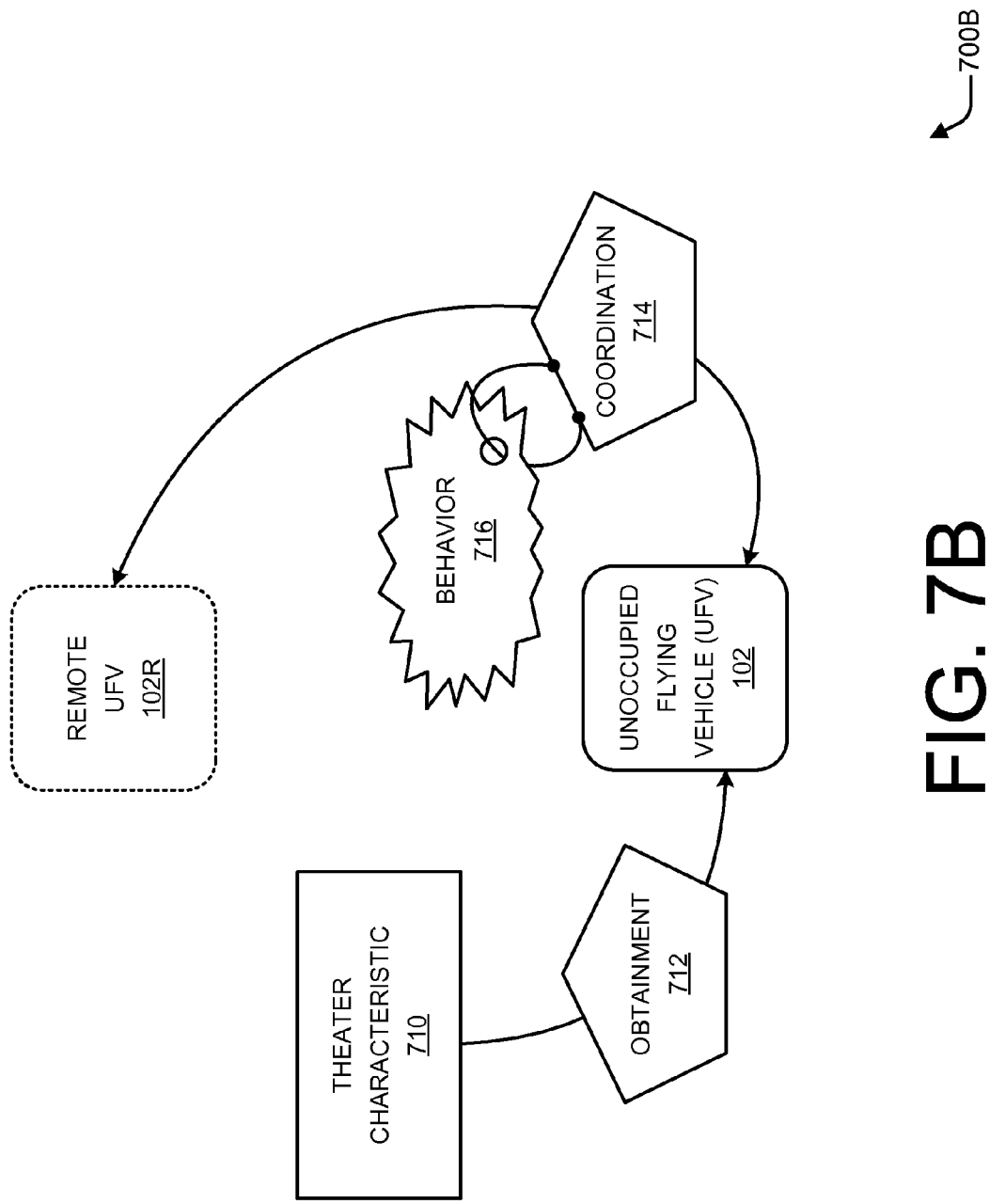
FIGS. 7B-7E are schematic diagrams that include at least one example machine and that depict example scenarios for implementing UFV coordination in accordance with certain example embodiments.

As shown in FIG. 7B, by way of example but not limitation, schematic diagram 700B may include at least one UFV 102, at least one theater characteristic 710, at least one obtainment 712, at least one coordination 714, at least one behavior 716, or at least one remote UFV 102R. For certain example embodiments, at least one theater characteristic obtainment module 702 (e.g., of FIG. 7A) of a UFV 102 may effectuate at least one obtainment 712 of one or more theater characteristics 710. For certain example embodiments, at least one UFV behavior coordination module 704 (e.g., of FIG. 7A) of a UFV 102 may effectuate at least one coordination 714 of at least one behavior 716 of at least one UFV (e.g., a UFV 102, a remote UFV 102R, or a combination thereof, etc.) based, at least partially, on one or more theater characteristics 710. However, claimed subject matter is not limited to any particular described embodiments, implementations, examples, etc. Additional or alternative description that may be relevant to schematic diagram 700B is provided herein below with particular reference to one or more of any of FIG. 8A-8C, 9A-9F, or 10A-10B, including but not limited to at least FIG. 8A.

Figure 7C:
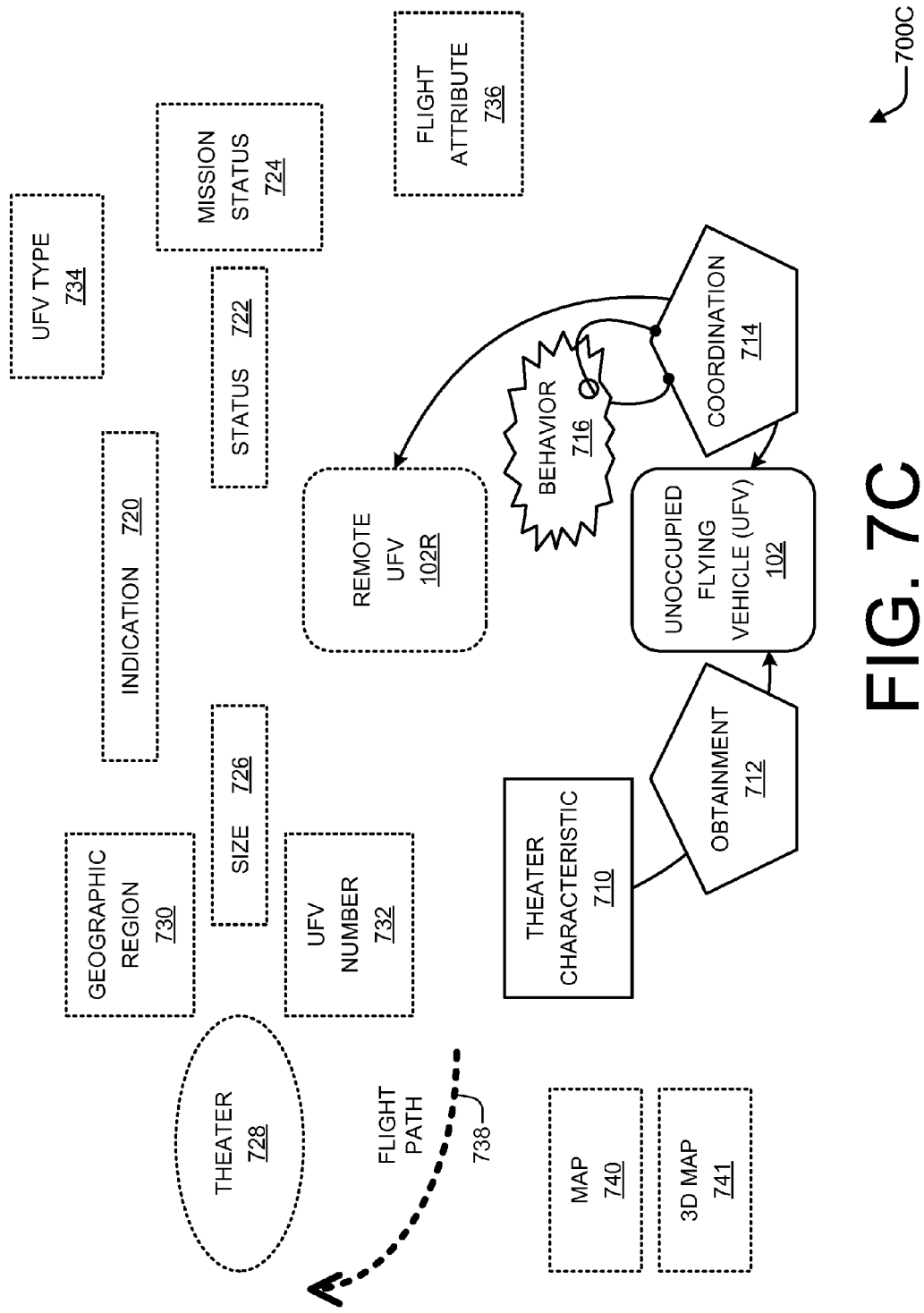

As shown in FIG. 7C, by way of example but not limitation, schematic diagram 700C may include at least one UFV 102, at least one theater characteristic 710, at least one obtainment 712, at least one coordination 714, at least one behavior 716, at least one remote UFV 102R, at least one indication 720, at least one status 722, at least one mission status 724, at least one size 726, at least one theater 728, at least one geographic region 730, at least one UFV number 732, at least one UFV type 734, at least one flight attribute 736, at least one flight path 738, at least one map 740, or at least one three-dimensional (3D) map 741. However, claimed subject matter is not limited to any particular described embodiments, implementations, examples, etc. Additional or alternative description that may be relevant to schematic diagram 700C is provided herein below with particular reference to one or more of any of FIG. 8A-8C, 9A-9F, or 10A-10B, including but not limited to one or more of any of FIGS. 8B-8C.

Figure 7D:
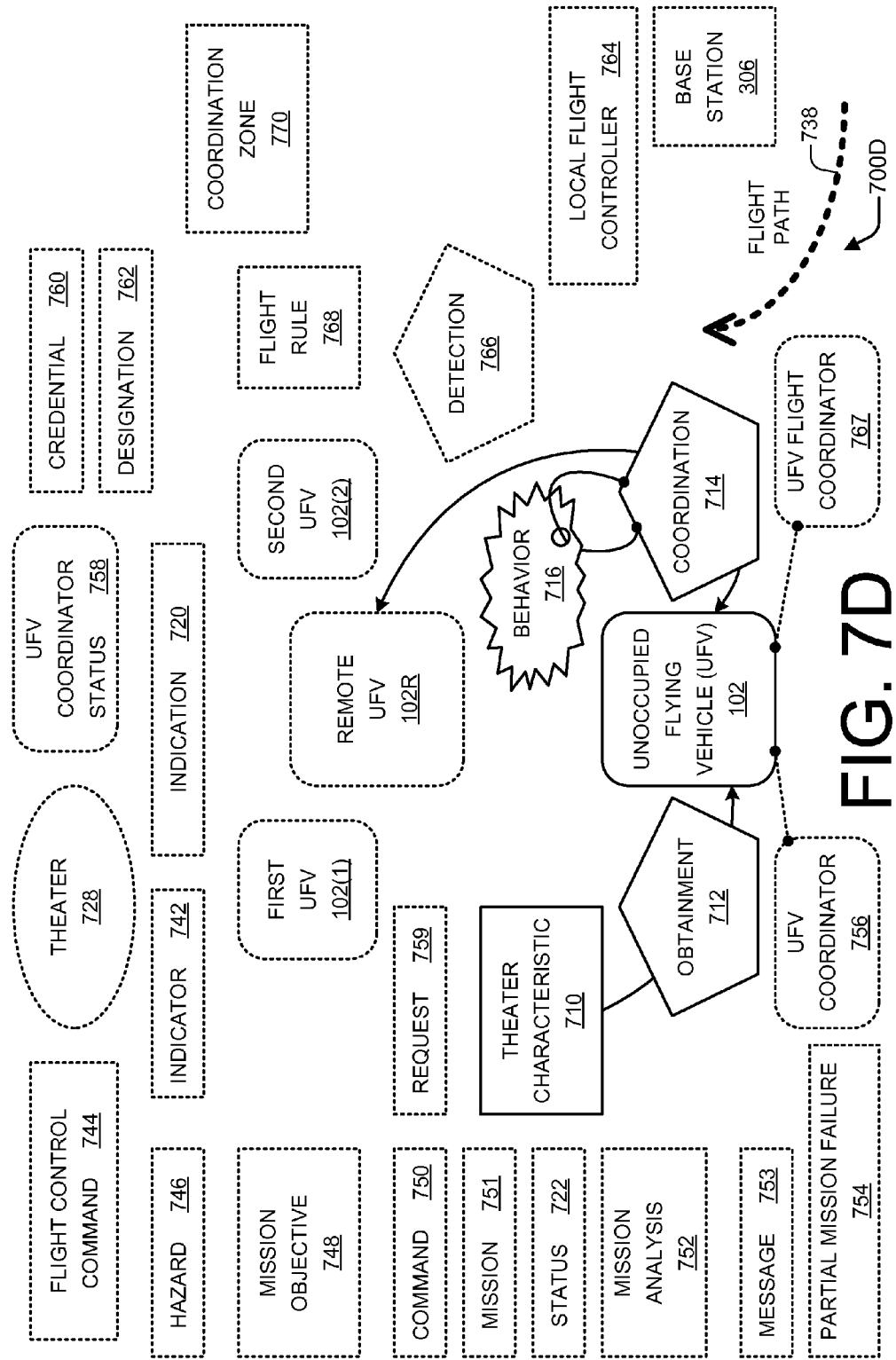

As shown in FIG. 7D, by way of example but not limitation, schematic diagram 700D may include at least one UFV 102, at least one theater characteristic 710, at least one obtainment 712, at least one coordination 714, at least one behavior 716, at least one remote UFV 102R, at least one first UFV 102(1), at least one second UFV 102(2), at least one indication 720, at least one indicator 742, at least one flight control command 744, at least one hazard 746, at least one mission objective 748, at least one command 750, at least one mission 751, at least one mission analysis 752, at least one message 753, at least a partial mission failure 754, at least one UFV coordinator 756, at least one UFV coordinator status 758, at least one request 759, at least one credential 760, at least one (UFV coordinator) designation 762, at least one local flight controller 764, at least one detection 766, at least one UFV flight coordinator 767, at least one flight rule 768, or at least one coordination zone 770. However, claimed subject matter is not limited to any particular described embodiments, implementations, examples, etc. Additional or alternative description that may be relevant to schematic diagram 700D is provided herein below with particular reference to one or more of any of FIG. 8A-8C, 9A-9F, or 10A-10B, including but not limited to one or more of any of FIGS. 9A-9F.

Figure 7E:
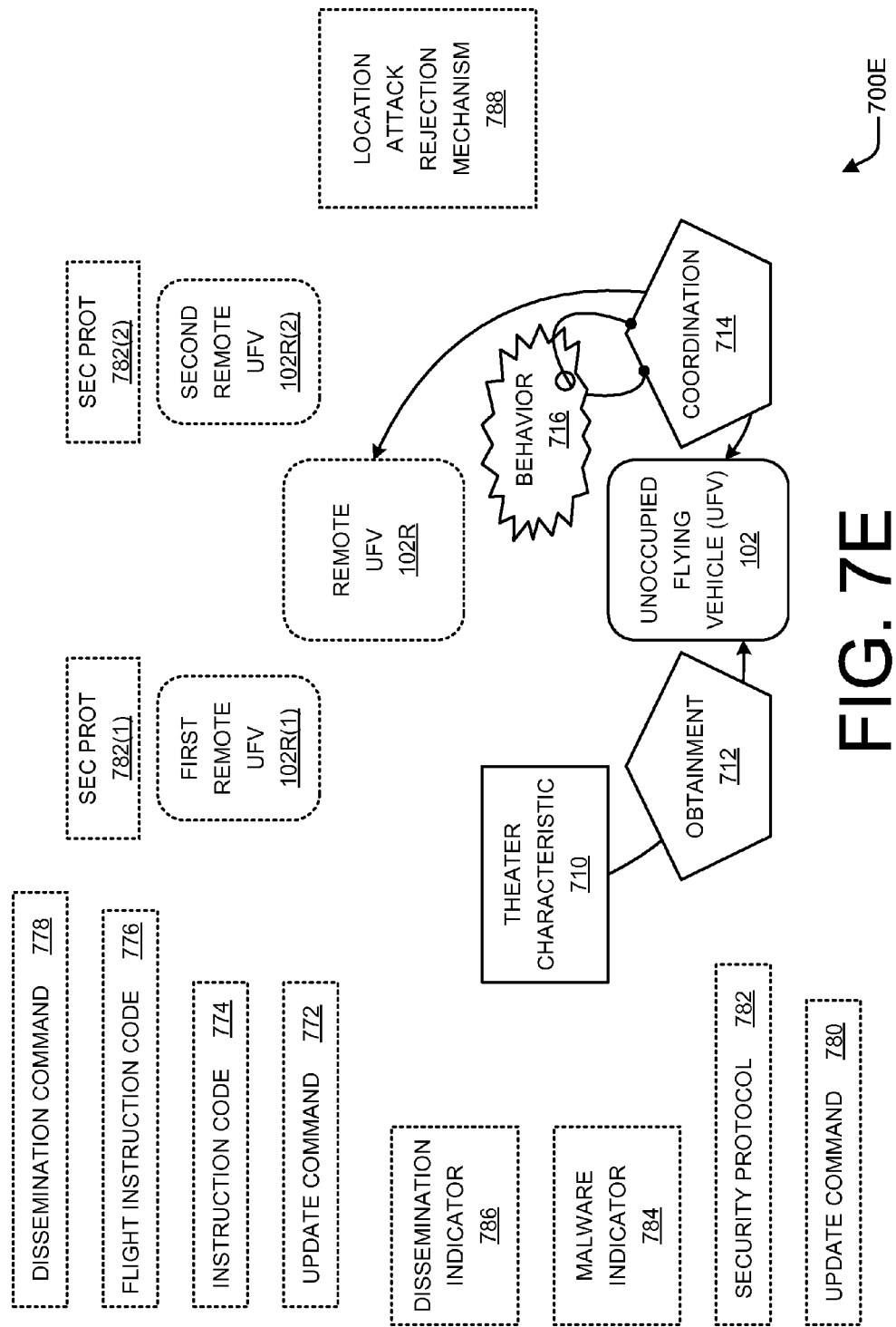

As shown in FIG. 7E, by way of example but not limitation, schematic diagram 700E may include at least one UFV 102, at least one theater characteristic 710, at least one obtainment 712, at least one coordination 714, at least one behavior 716, at least one remote UFV 102R, at least one first remote UFV 102R(1), at least one second remote UFV 102R(2), at least one update command 772, at least some instruction code 774, at least some flight instruction code 776, at least one dissemination command 778, at least one update command 780, at least one security protocol 782, at least one security protocol 782(1), at least one security protocol 782(2), at least one malware indicator 784, at least one dissemination indicator 786, or at least one location attack rejection mechanism 788. However, claimed subject matter is not limited to any particular described embodiments, implementations, examples, etc. Additional or alternative description that may be relevant to schematic diagram 700E is provided herein below with particular reference to one or more of any of FIG. 8A-8C, 9A-9F, or 10A-10B, including but not limited to one or more of any of FIGS. 10A-10B.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 8A:
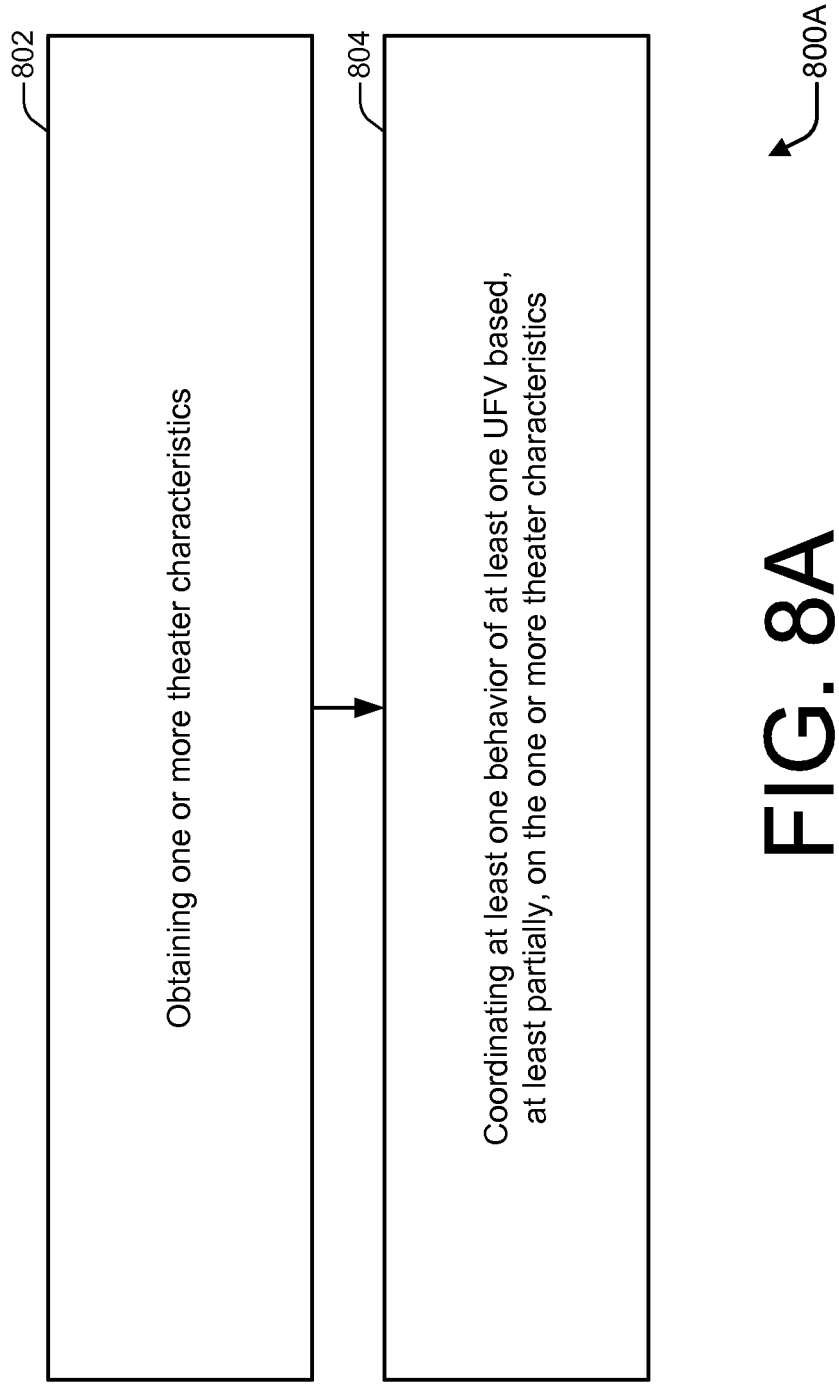
FIG. 8A is a flow diagram illustrating an example method for at least one machine with regard to unoccupied flying vehicle (UFV) coordination in accordance with certain example embodiments.

FIG. 8A is a flow diagram 800A illustrating an example method for at least one machine with regard to unoccupied flying vehicle (UFV) coordination in accordance with certain example embodiments. As illustrated, flow diagram 800A may include any of operations 802-804. Although operations 802-804 are shown or described in a particular order, it should be understood that methods may be performed in alternative manners without departing from claimed subject matter, including, but not limited to, with a different order or number of operations or with a different relationship between or among operations. Also, at least some operation(s) of flow diagram 800A may be performed so as to be fully or partially overlapping with other operation (s). For certain example embodiments, one or more operations of flow diagram 800A may be performed by at least one machine, such as a UFV 102 or at least a portion thereof. (Alternatively, although not explicitly illustrated, one or more operations of flow diagram 800A (or those of related flow diagrams) may be performed by at least one machine, such as a base station 306 or at least a portion thereof. With such embodiment(s), a theater characteristic obtainment module 702 and a UFV behavior coordination module 704 (e.g., of FIG. 7A) may be realized or implemented with one or more components of a base station 306.)

For certain example embodiments, a method for unoccupied flying vehicle (UFV) coordination (e.g., that includes, involves, addresses, reacts to, or a combination thereof, etc. or other otherwise handles at least one UFV 102, at least one first UFV 102(1), at least one second UFV 102(2), at least one remote UFV 102R, at least one first remote UFV 102R(1), at least one second remote UFV 102R(2), at least one POFV 302, at least one other object that may present a collision risk, at least one weather-related condition, at least one obstacle to a mission objective, at least one hindrance to accomplishing a task, at least one delay to achieving a goal, or a combination thereof, etc. by coordinating at least one UFV with regard to, with reference to, in consideration of, or a combination thereof, etc. one or more other UFVs or one or more hazards), which method may be at least partially implemented using hardware (e.g., circuitry, at least one processor, processor-accessible memory, at least one module, or a combination thereof, etc.) of a machine such as a UFV, may include an operation 802 or an operation 804. An operation 802 may be directed at least partially to obtaining one or more theater characteristics. For certain example implementations, at least one machine may obtain (e.g., acquire, ascertain, determine, retrieve, receive, observe via at least one sensor, calculate, discern via at least one analysis, or a combination thereof, etc., such as via at least one obtainment 712) one or more theater (e.g., a defined region, a general area, a set of UFVs, a zone defined by an authoritative source, a zone outlined by ad hoc or spontaneous or organic agreement of multiple UFVs, a spatial zone defined around at least one mission, or a combination thereof, etc.) characteristics (e.g., present or proximate UFVs, hazards, obstacles, transient features, enduring features, UFV flight paths, applicable rules or regulations, current coordinator status, UFV flight attributes, UFV types, UFV missions, or a combination thereof, etc.) 710. By way of example but not limitation, at least one UFV may obtain one or more theater characteristics (e.g., a UAV may acquire via a sensor, a radio, or a combination thereof, etc. one or more detectable, observable, reportable, or a combination thereof, etc. traits, actions, intentions, conditions, plans, objects, capabilities, or a combination thereof, etc. relating to an area or environment in which the UAV or other UAVs are flying). However, claimed subject matter is not limited to any particular described embodiments, implementations, examples, etc.

For certain example embodiments, an operation 804 may be directed at least partially to coordinating at least one behavior of at least one UFV based, at least partially, on the one or more theater characteristics. For certain example implementations, at least one machine may coordinate (e.g., negotiate, control, referee, balance, order, request adoption of, arrange, select, interrelate, or a combination thereof, etc., such as via at least one coordination 714) at least one behavior 716 (e.g., flight characteristic such as speed or position, flight plan, current or forthcoming flight path, communication engaged in, airspace possession, sharing of intended flight plans, negotiation mode, interaction with a UFV having UFV coordinator status, mission objective, or a combination thereof, etc.) of at least one UFV 102 or 102R (e.g., a UFV 102, a first UFV 102(1), a second UFV 102(2), a remote UFV 102R, a first remote UFV 102R(1), a second remote UFV 102R(2), a UAV, an RPV, a UCAV, a UA, an RPA, an ROA, an R/C aircraft, an AFD, a UAVS, a UAS, an sUAS, or a combination thereof, etc.) based, at least partially, on one or more theater characteristics 710. By way of example but not limitation, at least one UFV may coordinate at least one behavior of at least one UFV based, at least partially, on the one or more theater characteristics (e.g., a UAV may cause, inspire, order, operate, request, or a combination thereof, etc. at least one UAV to cooperatively move within or through, harmoniously work together, safely share, participate in organized flight traffic, communicate movements or plans, or a combination thereof, etc. with regard to an area or environment having multiple UAVs based at least partly on at least one obtained characteristic of an area or environment in which the at least one UAV is flying or otherwise impacting). However, claimed subject matter is not limited to any particular described embodiments, implementations, examples, etc.

Figure 8B:
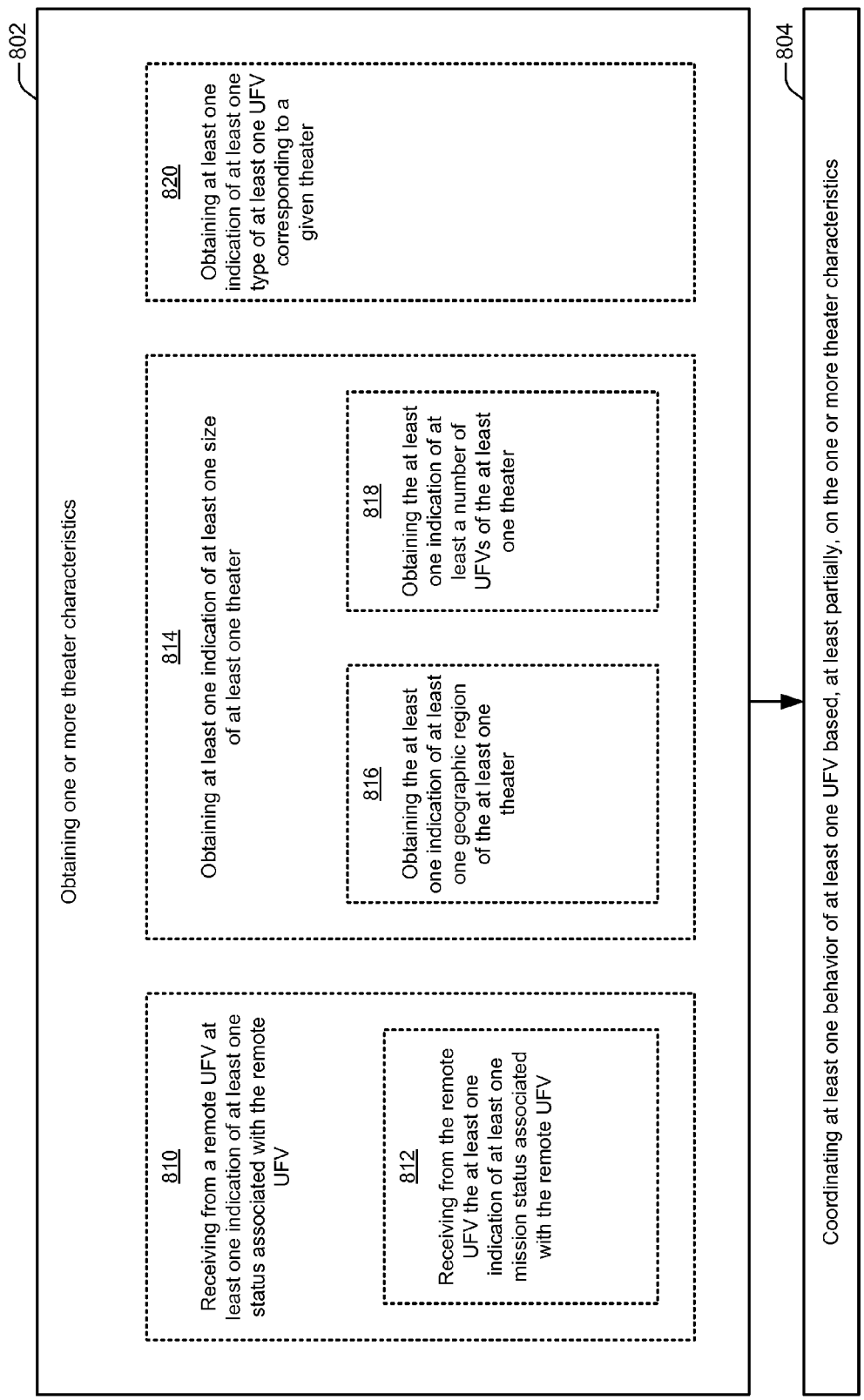

FIGS. 8B-8C depict example additions or alternatives for a flow diagram of FIG. 8A in accordance with certain example embodiments. As illustrated, flow diagrams of FIGS. 8B-8C may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations (e.g., operations that are illustrated as nested blocks are not necessarily subsidiary operations and may instead be performed independently). Also, at least some operation(s) of flow diagrams of FIGS. 8B-8C may be performed so as to be fully or partially overlapping with other operation(s). For certain example embodiments, one or more operations of flow diagrams 800B-800C (of FIGS. 8B-8C) may be performed by at least one machine (e.g., a UFV 102 or at least a portion thereof).

FIG. 8B illustrates a flow diagram 800B having example operations 810, 812, 814, 816, 818, or 820. For certain example embodiments, an operation 810 may be directed at least partially to wherein the obtaining one or more theater characteristics (of operation 802) includes receiving from a remote UFV at least one indication of at least one status associated with the remote UFV. For certain example implementations, at least one machine may receive (e.g., accept, decode, demodulate, down-convert, detect, obtain from or via a communication or transmission from another, route from an antenna or antenna element, acquire via an electromagnetic signal propagating in the air, take into possession wirelessly, or a combination thereof, etc.) from a remote UFV 102R at least one indication 720 (e.g., a sign, evidence, a showing, a description, a received communication, an informative data structure, an explanation, a hint, a code, or a combination thereof, etc.) of at least one status 722 (e.g., state, condition, position relative to an expected condition, standing, circumstance, damage/health level, mission-related situation or condition, or a combination thereof, etc.) associated with (e.g., corresponding to, derived from, pertaining to, related to, or a combination thereof, etc.) remote UFV 102R. By way of example but not limitation, at least one UFV may receive from a remote UFV at least one indication of at least one status associated with the remote UFV (e.g., a UAV may receive a wireless transmission from another UAV that indicates at least one flight-related status or at least one mission-related status with respect to the other UAV). However, claimed subject matter is not limited to any particular described embodiments, implementations, examples, etc.

For certain example embodiments, an operation 812 may be directed at least partially to wherein the receiving from a remote UFV at least one indication of at least one status associated with the remote UFV (of operation 810) includes receiving from the remote UFV the at least one indication of at least one mission status associated with the remote UFV. For certain example implementations, at least one machine may receive from a remote UFV 102R at least one indication 720 of at least one mission status 724 (e.g., state, condition, position relative to an expected condition, standing, circumstance, damage/health level, mission-related situation or condition, or a combination thereof, etc. related or pertaining to e.g., an assigned task, procedure, goal, job, delivery, sensor reading acquisition, signal ferrying, or a combination thereof, etc.) associated with (e.g., corresponding to, derived from, pertaining to, related to, assigned to, or a combination thereof, etc.) remote UFV 102R. By way of example but not limitation, at least one UFV may receive from the remote UFV the at least one indication of at least one mission status associated with the remote UFV (e.g., a UAV may receive from another UAV (i) a description of or (ii) a completion level of a state or condition of a task that is assigned to the other UAV). However, claimed subject matter is not limited to any particular described embodiments, implementations, examples, etc.

For certain example embodiments, an operation 814 may be directed at least partially to wherein the obtaining one or more theater characteristics (of operation 802) includes obtaining at least one indication of at least one size of at least one theater. For certain example implementations, at least one machine may obtain at least one indication 720 (e.g., a sign, evidence, a showing, a description, a received communication, an informative data structure, an explanation, a hint, a code, or a combination thereof, etc.) of at least one size 726 (e.g., a physical size, an altitude height, a set of UFVs, or a combination thereof, etc.) of at least one theater 728 (e.g., a defined region, a general area, a set of UFVs, a zone defined by an authoritative source, a zone outlined by ad hoc or spontaneous or organic agreement, a spatial zone defined around a given goal, or a combination thereof, etc.). By way of example but not limitation, at least one UFV may obtain at least one indication of at least one size of at least one theater (e.g., a UAV may retrieve from memory a size of an operational area that is to be coordinated by a UFV coordinator based on an assigned coordination mission or a default, FAA-instituted size for an associated environment, such as rural or urban). However, claimed subject matter is not limited to any particular described embodiments, implementations, examples, etc.

For certain example embodiments, an operation 816 may be directed at least partially to wherein the obtaining at least one indication of at least one size of at least one theater (of operation 814) includes obtaining the at least one indication of at least one geographic region of the at least one theater. For certain example implementations, at least one machine may obtain at least one indication 720 of at least one geographic region 730 (e.g., a neighborhood, a boundary, a street, one or more satellite positioning system (SPS) coordinates, a spatially-designated area, or a combination thereof, etc.) of at least one theater 728. By way of example but not limitation, at least one UFV may obtain the at least one indication of at least one geographic region of the at least one theater (e.g., a UAV may receive at least one message (e.g., from a base station, as a beacon, etc.) that provides geographic coordinates (e.g., GPS coordinates) of one or more boundaries of an operational theater or at least one distance of a geometric measurement (e.g., a length, a width, a radius, a diagonal, a side, an apothem, a height, etc.) of an operational theater). However, claimed subject matter is not limited to any particular described embodiments, implementations, examples, etc.

For certain example embodiments, an operation 818 may be directed at least partially to wherein the obtaining at least one indication of at least one size of at least one theater (of operation 814) includes obtaining the at least one indication of at least a number of UFVs of the at least one theater. For certain example implementations, at least one machine may obtain at least one indication 720 of at least a number of UFVs 732 (e.g., a group of UFVs, a set of identified UFVs, a listing of UFVs, a counting or numerical total of UFVs, or a combination thereof, etc.) of at least one theater 728. By way of example but not limitation, at least one UFV may obtain the at least one indication of at least a number of UFVs of the at least one theater (e.g., a UAV may (i) receive respective transmissions from respective UAVs that are opting into a coordination zone by designating the receiving UAV as a UAV coordinator of the coordination zone and (ii) identify or tally those UAVs from which a UAV coordinator designation has been received). However, claimed subject matter is not limited to any particular described embodiments, implementations, examples, etc.

For certain example embodiments, an operation 820 may be directed at least partially to wherein the obtaining one or more theater characteristics (of operation 802) includes obtaining at least one indication of at least one type of at least one UFV corresponding to a given theater. For certain example implementations, at least one machine may obtain at least one indication 720 (e.g., a sign, evidence, a showing, a description, a transmitted or received communication, an informative data structure, an explanation, a hint, a code, a command, an instruction, a policy, or a combination thereof, etc.) of at least one type 734 (e.g., fixed wing vs. rotary wing, privately-owned vs. government-controlled, payload carrying or not, liquid fueled vs. battery powered, speed or hovering capability, armed or unarmed, a flight capability category, a maneuverability score, or a combination thereof, etc.) of at least one UFV 102/102R corresponding to a given theater 728. By way of example but not limitation, at least one UFV may obtain at least one indication of at least one type of at least one UFV corresponding to a given theater (e.g., a UAV may ascertain via analysis or via an informative message that a particular UAV that is within a coordination zone corresponds to a lighter-than-air (LTA) UAV, a fixed wing UAV, a rotary wing UAV, a UAV with a particular maneuverability class, etc.). However, claimed subject matter is not limited to any particular described embodiments, implementations, examples, etc.

FIG. 8C illustrates a flow diagram 800C having example operations 824, 826, 828, or 830. For certain example embodiments, an operation 824 may be directed at least partially to wherein the obtaining one or more theater characteristics (of operation 802) includes obtaining at least one indication of at least one flight attribute of at least one identified UFV. For certain example implementations, at least one machine may obtain at least one indication 720 (e.g., a sign, evidence, a showing, a description, a transmitted or received communication, an informative data structure, an explanation, a hint, a code, a command, an instruction, a policy, or a combination thereof, etc.) of at least one flight attribute 736 (e.g., a flight characteristic—such as a current condition or existing value for a parameter like speed or direction of travel, a flight capability—such as a potential condition or asserted-possible value for a parameter like a maximum acceleration or maximum altitude, or a combination thereof, etc.) of at least one identified (e.g., detected, determinable, discernible vis-à-vis another, categorized, named or associated with call letters of, associated with ownership of, or a combination thereof, etc.) UFV 102 or 102R. By way of example but not limitation, at least one UFV may obtain at least one indication of at least one flight attribute of at least one identified UFV (e.g., a UAV may retrieve from a database or receive in response to a transmitted query at least one flight attribute, such as a current direction or a top-end speed, of a particular UAV that is known to correspond to a given operational theater). However, claimed subject matter is not limited to any particular described embodiments, implementations, examples, etc.

For certain example embodiments, an operation 826 may be directed at least partially to wherein the obtaining one or more theater characteristics (of operation 802) includes obtaining at least one indication of at least one intended flight path of a UFV corresponding to a given theater. For certain example implementations, at least one machine may obtain at least one indication 720 (e.g., a sign, evidence, a showing, a description, a transmitted or received communication, an informative data structure, an explanation, a hint, a code, a command, an instruction, a policy, or a combination thereof, etc.) of at least one intended (e.g., programmed, determined, planned, expected, or a combination thereof, etc.) flight path 738 (e.g., a heading, a flight trajectory, a position, an altitude, a speed, a direction, a velocity, an acceleration, a stability level, a destination, a course through air or space or a time at which the course is to be traversed or particular positions thereof that are to be occupied, or a combination thereof, etc.) of a UFV 102 or 102R corresponding to a given theater 728 (e.g., a defined region, a general area, a set of UFVs, a zone defined by an authoritative source, a zone outlined by ad hoc or spontaneous or organic agreement, a spatial zone defined around a given goal, or a combination thereof, etc.). By way of example but not limitation, at least one UFV may obtain at least one indication of at least one intended flight path of a UFV corresponding to a given theater (e.g., a UAV may receive a current location and heading or a series of positions and associated future times or a destination of a particular UAV that is vectoring toward or within a given coordination zone). However, claimed subject matter is not limited to any particular described embodiments, implementations, examples, etc.

For certain example embodiments, an operation 828 may be directed at least partially to wherein the obtaining one or more theater characteristics (of operation 802) includes obtaining at least one map of at least one theater. For certain example implementations, at least one machine may obtain at least one map 740 (e.g., a terrain description, a visual or symbolic representation of an area, a navigational aid depicting geography—such as natural attributes of land or man-made structures, an indoor or outdoor geometric depiction of points of interest or addresses, a data structure facilitating navigation to an identifiable location, or a combination thereof, etc.) of at least one theater 728 (e.g., a defined region, a general area, a set of UFVs, a zone defined by an authoritative source, a zone outlined by ad hoc or spontaneous or organic agreement, a spatial zone defined around a given goal, or a combination thereof, etc.). By way of example but not limitation, at least one UFV may obtain at least one map of at least one theater (e.g., a UAV may receive or at least partially generate a map (e.g., one or more delineated boundaries, land features, natural or man-made obstacles, addressed destinations, etc.) of at least a portion of a coordination zone for which the UAV is to serve as a UAV coordinator). However, claimed subject matter is not limited to any particular described embodiments, implementations, examples, etc.

For certain example embodiments, an operation 830 may be directed at least partially to wherein the obtaining at least one map of at least one theater (of operation 828) includes obtaining at least one three-dimensional map of the at least one theater. For certain example implementations, at least one machine may obtain at least one three-dimensional map 741 (e.g., a map 740 that includes indications or representations of depth, or height, spherical coordinates, obstacles boundaries or location along three axes, or a combination thereof, etc.) of at least one theater 728. By way of example but not limitation, at least one UFV may obtain at least one three-dimensional map of the at least one theater (a UAV may receive or at least partially generate a three-dimensional (3D) map (e.g., a map having indications of height or altitude, a map including buildings having spatial coordinates indicating a top versus a bottom floor, a map having items that are capable of being rendered from the sides thereof, a map enabling flight path adjustments through and around buildings, etc.) of at least a portion of a coordination zone for which the UAV is ordained as a UAV coordinator). However, claimed subject matter is not limited to any particular described embodiments, implementations, examples, etc.

FIGS. 9A-9F depict example additions or alternatives for a flow diagram of FIG. 8A in accordance with certain example embodiments. As illustrated, flow diagrams of FIGS. 9A-9F may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations (e.g., operations that are illustrated as nested blocks are not necessarily subsidiary operations and may instead be performed independently). Also, at least some operation(s) of flow diagrams of FIGS. 9A-9F may be performed so as to be fully or partially overlapping with other operation(s). For certain example embodiments, one or more operations of flow diagrams 900A-900F (of FIGS. 9A-9F) may be performed by at least one machine (e.g., a UFV 102 or at least a portion thereof).

Figure 9A:
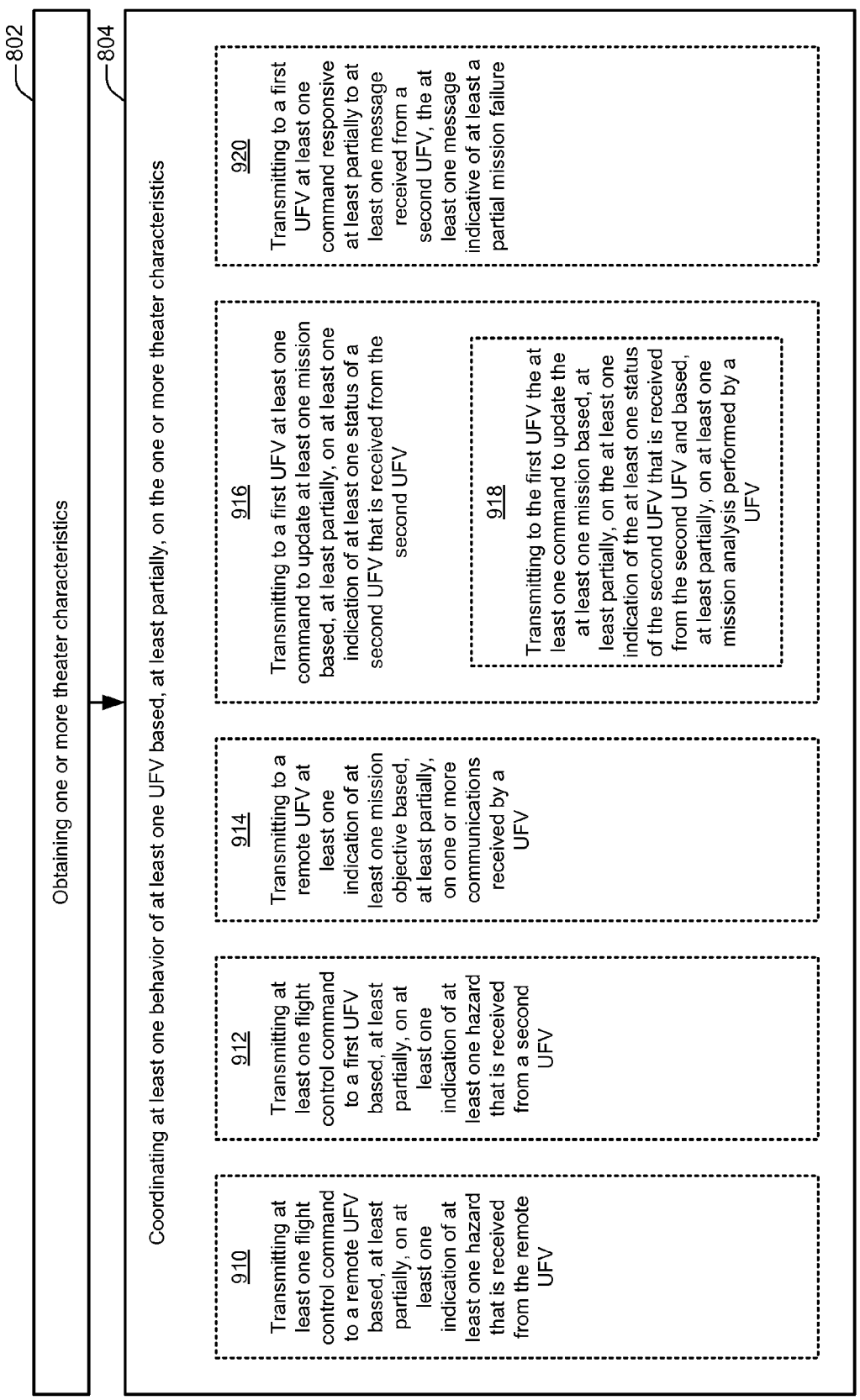

FIG. 9A illustrates a flow diagram 900A having example operations 910, 912, 914, 916, 918, or 920. For certain example embodiments, an operation 910 may be directed at least partially to wherein the coordinating at least one behavior of at least one UFV based, at least partially, on the one or more theater characteristics (of operation 804) includes transmitting at least one flight control command to a remote UFV based, at least partially, on at least one indication of at least one hazard that is received from the remote UFV. For certain example implementations, at least one machine may transmit (e.g., send, communicate wirelessly, convey, frequency up-convert, modulate, encode, propagate, dispatch, emanate from an emitter or antenna or at least one element of an antenna, forward, broadcast, disseminate, transfer, cause to travel through or over a medium, impart, or a combination thereof, etc.) at least one flight control command 744 (e.g., an instruction to adjust a flight path; an order to change a flight state, such as changing a velocity, an acceleration, or an altitude; a requested alteration to a route or course to reach a destination; a destination substitution; or a combination thereof; etc.) to a remote UFV 102R based, at least partially, on at least one indication 720 (e.g., a sign, evidence, a showing, a description, a received communication, an informative data structure, an explanation, a hint, a code, or a combination thereof, etc.) of at least one hazard 746 (e.g., a collision risk, at least one weather-related condition, a situation having an appreciable probability of craft damage, at least one obstacle to a mission objective, at least one hindrance to accomplishing a task, at least one delay to achieving a goal, a condition leading to harm of persons or property, or a combination thereof, etc.) that is received (e.g., accepted, decoded, demodulated, down-converted, detected, obtained from or via a communication or transmission from another, routed from an antenna or antenna element, acquired via an electromagnetic signal propagating in the air, taken into possession wirelessly, or a combination thereof, etc.) from remote UFV 102R. By way of example but not limitation, at least one UFV may transmit at least one flight control command to a remote UFV based, at least partially, on at least one indication of at least one hazard that is received from the remote UFV (e.g., a UAV may transmit to another UAV a command that causes the other UAV to change a speed, a direction, an altitude, or a targeted time to reach a given destination, etc. based at least partly on notice of a downed power line or an identification of an erratic drone that is provided to the UAV by the other UAV). However, claimed subject matter is not limited to any particular described embodiments, implementations, examples, etc.

For certain example embodiments, an operation 912 may be directed at least partially to wherein the coordinating at least one behavior of at least one UFV based, at least partially, on the one or more theater characteristics (of operation 804) includes transmitting at least one flight control command to a first UFV based, at least partially, on at least one indication of at least one hazard that is received from a second UFV. For certain example implementations, at least one machine may transmit (e.g., send, communicate wirelessly, convey, frequency up-convert, modulate, encode, propagate, dispatch, emanate from an emitter or antenna or at least one element of an antenna, forward, broadcast, disseminate, transfer, cause to travel through or over a medium, impart, or a combination thereof, etc.) at least one flight control command 744 (e.g., an instruction to adjust a flight path; an order to change a flight state, such as changing a velocity, an acceleration, or an altitude; a requested alteration to a route or course to reach a destination; a destination substitution; or a combination thereof; etc.) to a first UFV 102(1) based, at least partially, on at least one indication 720 (e.g., a sign, evidence, a showing, a description, a received communication, an informative data structure, an explanation, a hint, a code, or a combination thereof, etc.) of at least one hazard 746 (e.g., a collision risk, at least one weather-related condition, a situation having an appreciable probability of craft damage, at least one obstacle to a mission objective, at least one hindrance to accomplishing a task, at least one delay to achieving a goal, a condition leading to harm of persons or property, or a combination thereof, etc.) that is received (e.g., accepted, decoded, demodulated, down-converted, detected, obtained from or via a communication or transmission from another, routed from an antenna or antenna element, acquired via an electromagnetic signal propagating in the air, taken into possession wirelessly, or a combination thereof, etc.) from a second UFV 102(2). By way of example but not limitation, at least one UFV may transmit at least one flight control command to a first UFV based, at least partially, on at least one indication of at least one hazard that is received from a second UFV (e.g., a UAV may transmit to a first UAV a command to accelerate to avoid a potential collision with a current flight path of a second UAV, which current flight path may have been established at least partly by the UAV (such as in response to reception from the second UAV of an intended destination of the second UAV) or may have been received from the second UAV as a requested or planned flight path of the second UAV). However, claimed subject matter is not limited to any particular described embodiments, implementations, examples, etc.

For certain example embodiments, an operation 914 may be directed at least partially to wherein the coordinating at least one behavior of at least one UFV based, at least partially, on the one or more theater characteristics (of operation 804) includes transmitting to a remote UFV at least one indication of at least one mission objective based, at least partially, on one or more communications received by a UFV. For certain example implementations, at least one machine may transmit (e.g., send, communicate wirelessly, convey, frequency up-convert, modulate, encode, propagate, dispatch, emanate from an emitter or antenna or at least one element of an antenna, forward, broadcast, disseminate, transfer, cause to travel through or over a medium, impart, or a combination thereof, etc.) to a remote UFV 102R at least one indication 720 (e.g., a sign, evidence, a showing, a description, a received communication, an informative data structure, an explanation, a hint, a code, or a combination thereof, etc.) of at least one mission objective 748 (e.g., an assigned goal, a target to scan with one or more sensors, a payload to acquire or deliver, a tasked accomplishment, a deadline to meet, a destination to reach, an enumerated set of steps to follow, a procedure to complete, or a combination thereof, etc.) based, at least partially, on one or more communications (e.g., signals, messages, codes, mission status reports, base station updates, hazard warnings, or a combination thereof, etc.) received (e.g., accepted, decoded, demodulated, down-converted, detected, obtained from or via a communication or transmission from another, routed from an antenna or antenna element, acquired via an electromagnetic signal propagating in the air, taken into possession wirelessly, or a combination thereof, etc.) by a UFV 102. By way of example but not limitation, at least one UFV may transmit to a remote UFV at least one indication of at least one mission objective based, at least partially, on one or more communications received by a UFV (e.g., a UAV may send to a first UAV at least one signal that includes one or more codes representing one or more commands for the first UAV to follow in order to complete an assigned task based, at least partly, on a mission status received from a third UAV or a changed mission received from a base station). However, claimed subject matter is not limited to any particular described embodiments, implementations, examples, etc.

For certain example embodiments, an operation 916 may be directed at least partially to wherein the coordinating at least one behavior of at least one UFV based, at least partially, on the one or more theater characteristics (of operation 804) includes transmitting to a first UFV at least one command to update at least one mission based, at least partially, on at least one indication of at least one status of a second UFV that is received from the second UFV. For certain example implementations, at least one machine may transmit (e.g., send, communicate wirelessly, convey, frequency up-convert, modulate, encode, propagate, dispatch, emanate from an emitter or antenna or at least one element of an antenna, forward, broadcast, disseminate, transfer, cause to travel through or over a medium, impart, or a combination thereof, etc.) to a first UFV 102(1) at least one command 750 (e.g., an instruction, an order with authority, an imperative, a signal indicating to take an action, a request, a directive with specificity, a demand to act, a direction to perform a procedure, a requirement, or a combination thereof, etc.) to update (e.g., alter, change based on recently acquired data, modify responsive to new information, improve, fine tune, substitute at least a portion of, or a combination thereof, etc.) at least one mission 751 (e.g., an assigned task, procedure, goal, job, delivery, sensor reading acquisition, signal ferrying, or a combination thereof, etc.) based, at least partially, on at least one indication 720 (e.g., a sign, evidence, a showing, a description, a received communication, an informative data structure, an explanation, a hint, a code, or a combination thereof, etc.) of at least one status 722 (e.g., state, condition, position relative to an expected condition, standing, circumstance, damage/health level, mission-related situation or condition, or a combination thereof, etc.) of a second UFV 102(2) that is received (e.g., accepted, decoded, demodulated, down-converted, detected, obtained from or via a communication or transmission from another, routed from an antenna or antenna element, acquired via an electromagnetic signal propagating in the air, taken into possession wirelessly, or a combination thereof, etc.) from second UFV 102(2). By way of example but not limitation, at least one UFV may transmit to a first UFV at least one command to update at least one mission based, at least partially, on at least one indication of at least one status of a second UFV that is received from the second UFV (e.g., a UAV may transmit to a first UAV an order to alter or replace an existing task that is assigned to the first UAV to thereby create a new or modified task that the first UAV is to accomplish based at least partly on an indication received from a second UAV that the second UAV is unable to accomplish its assigned task). However, claimed subject matter is not limited to any particular described embodiments, implementations, examples, etc.

For certain example embodiments, an operation 918 may be directed at least partially to wherein the transmitting to a first UFV at least one command to update at least one mission based, at least partially, on at least one indication of at least one status of a second UFV that is received from the second UFV (of operation 916) includes transmitting to the first UFV the at least one command to update the at least one mission based, at least partially, on the at least one indication of the at least one status of the second UFV that is received from the second UFV and based, at least partially, on at least one mission analysis performed by a UFV. For certain example implementations, at least one machine may transmit to a first UFV 102(31) at least one command 750 to update at least one mission 751 based, at least partially, on at least one indication 720 of at least one status 722 of a second UFV 102(2) that is received from second UFV 102(2) and based, at least partially, on at least one mission analysis 752 (e.g., a decision or determination that is made by processing data, such as a mission status, a hazard, a flight attribute, a mission objective, or a combination thereof, etc.) performed by a UFV 102. By way of example but not limitation, at least one UFV may transmit to the first UFV the at least one command to update the at least one mission based, at least partially, on the at least one indication of the at least one status of the second UFV that is received from the second UFV and based, at least partially, on at least one mission analysis performed by a UFV (e.g., a UAV may conduct an analysis responsive to a status of a second UAV to determine that the second UAV is unable to make a timely delivery, and the UAV may formulate and transmit a command to cause a first UAV to make the timely delivery, such as by changing course of acquiring at least part of a load from the second UAV). However, claimed subject matter is not limited to any particular described embodiments, implementations, examples, etc.

For certain example embodiments, an operation 920 may be directed at least partially to wherein the coordinating at least one behavior of at least one UFV based, at least partially, on the one or more theater characteristics (of operation 804) includes transmitting to a first UFV at least one command responsive at least partially to at least one message received from a second UFV, the at least one message indicative of at least a partial mission failure. For certain example implementations, at least one machine may transmit (e.g., send, communicate wirelessly, convey, frequency up-convert, modulate, encode, propagate, dispatch, emanate from an emitter or antenna or at least one element of an antenna, forward, broadcast, disseminate, transfer, cause to travel through or over a medium, impart, or a combination thereof, etc.) to a first UFV 102(1) at least one command 750 (e.g., an instruction, an order with authority, an imperative, a signal indicating to take an action, a request, a directive with specificity, a demand to act, a direction to perform a procedure, a requirement, or a combination thereof, etc.) responsive at least partially to at least one message 753 (e.g., a signal, a packet, a field, a code, a description, an explanation, or a combination thereof, etc.) received (e.g., accepted, decoded, demodulated, down-converted, detected, obtained from or via a communication or transmission from another, routed from an antenna or antenna element, acquired via an electromagnetic signal propagating in the air, taken into possession wirelessly, or a combination thereof, etc.) from a second UFV 102(2), with at least one message 753 indicative of (e.g., representative of, descriptive of, identifying, or a combination thereof, etc.) at least a partial mission failure 754 (e.g., an inability to achieve at least part of a goal, non-completion of at least part of an assigned task, accomplishing at least one defined stage of a procedure but after an associated deadline for such accomplishment, realizing a given destination is out-of-reach absent assistance, at least an apparent inability to acquire a targeted item, delivering a particular article to an incorrect location, running out of fuel prior to or too low on fuel to achieve mission completion, or a combination thereof, etc.). By way of example but not limitation, at least one UFV may transmit to a first UFV at least one command responsive at least partially to at least one message received from a second UFV, the at least one message indicative of at least a partial mission failure (e.g., a UAV may transmit to a first UAV a command—such as to help with a current mission of a second UAV or to initiate a different mission that was next on an agenda of the second UAV—at least partly in response to a message from the second UAV that indicates that at least a portion of a current mission is in a failing condition—such as the second UAV cannot complete the mission, an intermediate stage has not been completed by a targeted deadline, a designated location cannot be reached, a specified payload cannot be carried or delivered, interference is hampering sensor readings, fuel supplies are dangerously dwindling, completion of a final mission objective is in jeopardy absent aide, or so forth). However, claimed subject matter is not limited to any particular described embodiments, implementations, examples, etc.

Figure 9B:
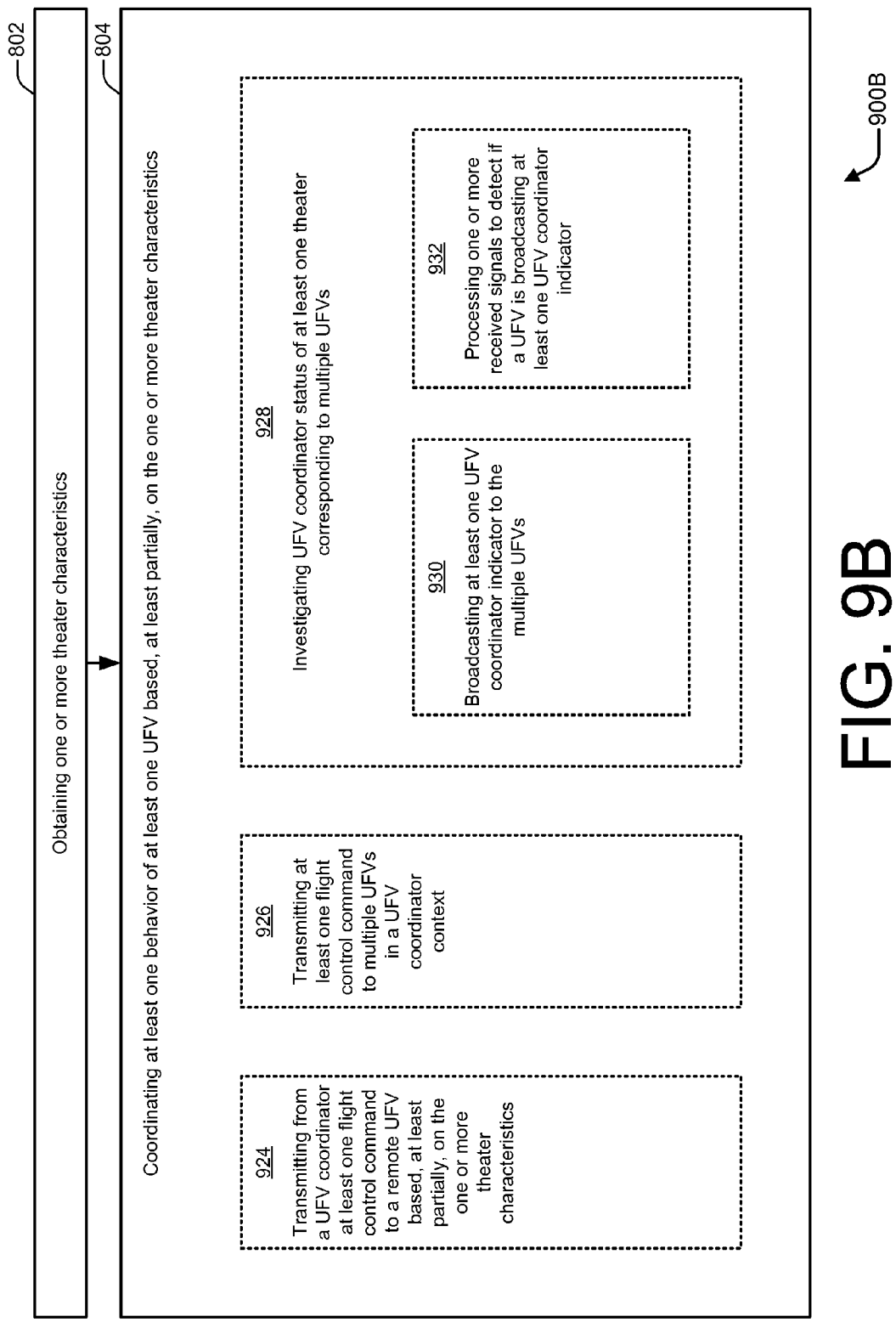

FIG. 9B illustrates a flow diagram 900B having example operations 924, 926, 928, 930, or 932. For certain example embodiments, an operation 924 may be directed at least partially to wherein the coordinating at least one behavior of at least one UFV based, at least partially, on the one or more theater characteristics (of operation 804) includes transmitting from a UFV coordinator at least one flight control command to a remote UFV based, at least partially, on the one or more theater characteristics. For certain example implementations, at least one machine may transmit (e.g., send, communicate wirelessly, convey, frequency up-convert, modulate, encode, propagate, dispatch, emanate from an emitter or antenna or at least one element of an antenna, forward, broadcast, disseminate, transfer, cause to travel through or over a medium, impart, or a combination thereof, etc.) from a UFV coordinator 756 (e.g., a UFV having coordinator status, a UFV that has been ordained a UFV coordinator for a given theater, a UFV that other UFV(s) have agreed is to facilitate a sharing of airspace, a UFV that is to organize or control one or more other UFVs, or a combination thereof, etc.) at least one flight control command 744 (e.g., an instruction to adjust a flight path; an order to change a flight state, such as changing a velocity, an acceleration, or an altitude; a requested alteration to a route or course to reach a destination; a destination substitution; or a combination thereof; etc.) to a remote UFV 102R based, at least partially, on one or more theater characteristics 710. By way of example but not limitation, at least one UFV may transmit from a UFV coordinator at least one flight control command to a remote UFV based, at least partially, on the one or more theater characteristics (e.g., a UAV, which has been ordained a UAV coordinator for a given theater, may send a message to a remote UAV ordering the remote UAV to take at least one flight control action from between or among two or more flight path adjustment options, such as accelerate a speed, change a direction, alter an altitude, delay an approach, etc.). However, claimed subject matter is not limited to any particular described embodiments, implementations, examples, etc.

For certain example embodiments, an operation 926 may be directed at least partially to wherein the coordinating at least one behavior of at least one UFV based, at least partially, on the one or more theater characteristics (of operation 804) includes transmitting at least one flight control command to multiple UFVs in a UFV coordinator context. For certain example implementations, at least one machine may transmit (e.g., send, communicate wirelessly, convey, frequency up-convert, modulate, encode, propagate, dispatch, emanate from an emitter or antenna or at least one element of an antenna, forward, broadcast, disseminate, transfer, cause to travel through or over a medium, impart, or a combination thereof, etc.) at least one flight control command 744 (e.g., an instruction to adjust a flight path; an order to change a flight state, such as changing a velocity, an acceleration, or an altitude; a requested alteration to a route or course to reach a destination; a destination substitution; or a combination thereof; etc.) to multiple UFVs 102/102R in a UFV coordinator context (e.g., a situation, environment, theater, or a combination thereof, etc. in which at least one UFV is coordinating one or more other UFVs by virtue of their voluntary acquiescence or their receiving an authoritative command). By way of example but not limitation, at least one UFV may transmit at least one flight control command to multiple UFVs in a UFV coordinator context (e.g., a UAV may send a single flight control command or separate flight control commands to a first remote UAV and a second remote UAV to order them to make an indicated adjustment to a flight path, such as requiring the first remote UAV to increase altitude and requiring the second remote UAV to decrease altitude, in a situation in which the first and second remote UAVs understand that the sending UAV is an ordained UAV coordinator). However, claimed subject matter is not limited to any particular described embodiments, implementations, examples, etc.

For certain example embodiments, an operation 928 may be directed at least partially to wherein the coordinating at least one behavior of at least one UFV based, at least partially, on the one or more theater characteristics (of operation 804) includes investigating UFV coordinator status of at least one theater corresponding to multiple UFVs. For certain example implementations, at least one machine may investigate (e.g., look into, study, inquire into systematically, search for, examine particulars of, attempt to discover one or more facts about, or a combination thereof, etc.) UFV coordinator status 758 (e.g., existence of a UFV coordinator, identity of a UFV coordinator, whether a UFV coordinator is currently issuing orders, whether a UFV may become a UFV coordinator, credentials to become a UFV coordinator, capabilities of a UFV coordinator, need for a UFV coordinator, authority of a UFV coordinator, location of a UFV coordinator, or a combination thereof, etc.) of at least one theater 728 (e.g., a defined region, a general area, a set of UFVs, a zone defined by an authoritative source, a zone outlined by ad hoc or spontaneous or organic agreement, a spatial zone defined around a given goal, or a combination thereof, etc.) corresponding to multiple UFVs 102/102R. By way of example but not limitation, at least one UFV may investigate UFV coordinator status of at least one theater corresponding to multiple UFVs (e.g., a UAV may attempt to establish UAV coordinator status or ascertain a current UFV coordinator for a given area or particular set of UAVs via one or more receptions or transmissions). However, claimed subject matter is not limited to any particular described embodiments, implementations, examples, etc.

For certain example embodiments, an operation 930 may be directed at least partially to wherein the investigating UFV coordinator status of at least one theater corresponding to multiple UFVs (of operation 928) includes broadcasting at least one UFV coordinator indicator to the multiple UFVs. For certain example implementations, at least one machine may broadcast (e.g., transmit to multiple UFVs, emanate to multiple potential targets, send in multiple directions, make available for reception or processing generally, or a combination thereof, etc.) at least one UFV coordinator indicator 742 (e.g., a sign, evidence, a showing, a description, a transmitted communication, an informative data structure, an explanation, a hint, a code, a command, an instruction, a policy, or a combination thereof, etc. that a UFV holds coordinator status) to multiple UFVs 102/102R. By way of example but not limitation, at least one UFV may broadcast at least one UFV coordinator indicator to the multiple UFVs (e.g., a UAV may transmit to multiple proximate UAVs or to multiple UAVs corresponding or assigned to a given area an indicator that it possesses coordinator status, which empowers it to command or negotiate with other UAVs to facilitate sharing of airspace or completing one or more missions). However, claimed subject matter is not limited to any particular described embodiments, implementations, examples, etc.

For certain example embodiments, an operation 932 may be directed at least partially to wherein the investigating UFV coordinator status of at least one theater corresponding to multiple UFVs (of operation 928) includes processing one or more received signals to detect if a UFV is broadcasting at least one UFV coordinator indicator. For certain example implementations, at least one machine may process one or more received signals to detect if a UFV is broadcasting at least one UFV coordinator indicator. By way of example but not limitation, at least one UFV may processing one or more received signals 759 (e.g., an electromagnetic or RF reception, a message, a code, a field, or a combination thereof, etc.) to detect if a UFV is broadcasting (e.g., transmitting to multiple UFVs, emanating to multiple potential targets, sending in multiple directions, making available for reception or processing generally, or a combination thereof, etc.) at least one UFV coordinator indicator 742 (e.g., a sign, evidence, a showing, a description, a transmitted communication, an informative data structure, an explanation, a hint, a code, a command, an instruction, a policy, or a combination thereof, etc. that a UFV holds coordinator status) (e.g., a UAV may demodulate an electromagnetic signal or analyze a control channel to determine if an indicator of UFV coordinator status, such as a particular populated field or a standardized code, has been received from another UAV that has been ordained as UAV coordinator for a given area or set of UAVs). However, claimed subject matter is not limited to any particular described embodiments, implementations, examples, etc.

Figure 9C:
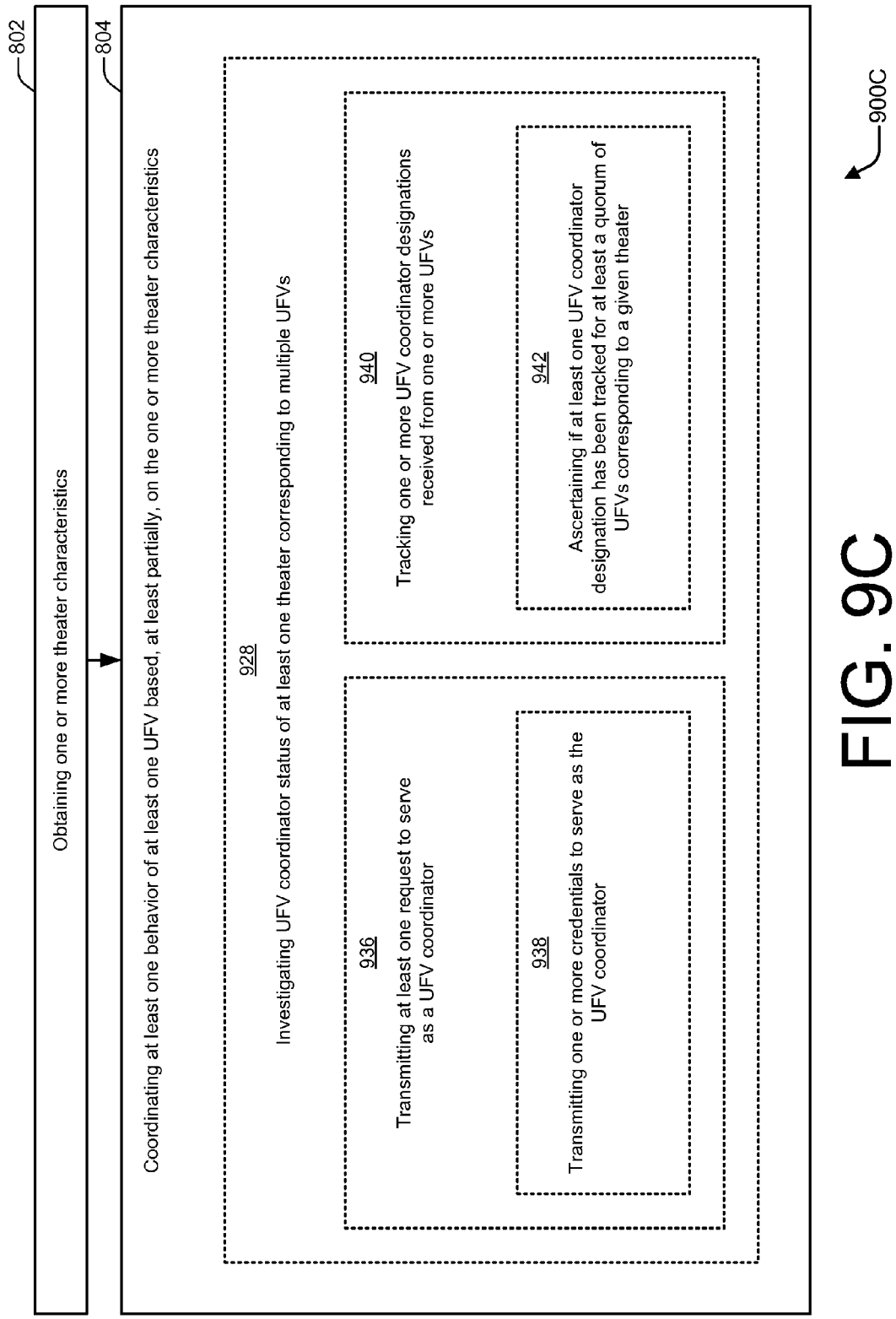

FIG. 9C illustrates a flow diagram 900C having example operations 936, 938, 940, or 942. For certain example embodiments, an operation 936 may be directed at least partially to wherein the investigating UFV coordinator status of at least one theater corresponding to multiple UFVs (of operation 928) includes transmitting at least one request to serve as a UFV coordinator. For certain example implementations, at least one machine may transmit (e.g., send, communicate wirelessly, convey, frequency up-convert, modulate, encode, propagate, dispatch, emanate from an emitter or antenna or at least one element of an antenna, forward, broadcast, disseminate, transfer, cause to travel through or over a medium, impart, or a combination thereof, etc.) at least one request 759 (e.g., an asking, a petition, a demand, a message, a broadcast, or a combination thereof, etc.) to serve as a UFV coordinator 756 (e.g., a UFV having coordinator status, a UFV that has been ordained a UFV coordinator for a given theater, a UFV that other UFV(s) have agreed is to facilitate a sharing of airspace, a UFV that is to organize or control one or more other UFVs, or a combination thereof, etc.). By way of example but not limitation, at least one UFV may transmit at least one request to serve as a UFV coordinator (e.g., a UAV may send a message to one or more other UAVs asking to be ordained as a UAV coordinator, with empowerment to at least suggest, if not order, changes to flight paths or flight plans to the one or more other UAVs or UAVs corresponding to a given area). However, claimed subject matter is not limited to any particular described embodiments, implementations, examples, etc.

For certain example embodiments, an operation 938 may be directed at least partially to wherein the transmitting at least one request to serve as a UFV coordinator (of operation 936) includes transmitting one or more credentials to serve as the UFV coordinator. For certain example implementations, at least one machine may transmit one or more credentials 760 (e.g., justification, qualification, authorization, certificate, or a combination thereof, etc.) to serve as a UFV coordinator 756. By way of example but not limitation, at least one UFV may transmit one or more credentials to serve as the UFV coordinator (e.g., a UAV may, on its own accord or in response to an inquiry, send to at least one other UAV at least one reason why it is qualified to be ordained as a UFV coordinator for a given area, such as processing capability, a link to a base station, a plan to remain at an area for an extended period of time, radio capability, stored authorization code, remaining power reserves, serial number of UAV, governmental association, some combination thereof, or so forth). However, claimed subject matter is not limited to any particular described embodiments, implementations, examples, etc.

For certain example embodiments, an operation 940 may be directed at least partially to wherein the investigating UFV coordinator status of at least one theater corresponding to multiple UFVs (of operation 928) includes tracking one or more UFV coordinator designations received from one or more UFVs. For certain example implementations, at least one machine may track (e.g., order, tally, categorize, catalog, count, organize, total, or a combination thereof, etc.) one or more UFV coordinator designations 762 (e.g., affirmations, votes, nominations, authorizations, expressions of approval, connotations of support, selections, or a combination thereof, etc.) received (e.g., accepted, decoded, demodulated, down-converted, detected, obtained from or via a communication or transmission from another, routed from an antenna or antenna element, acquired via an electromagnetic signal propagating in the air, taken into possession wirelessly, or a combination thereof, etc.) from one or more UFVs 102/102R. By way of example but not limitation, at least one UFV may track one or more UFV coordinator designations received from one or more UFVs (e.g., a UAV may catalog or count nominations or votes received from one or more UAVs corresponding to a given area, with the nominations or votes indicating affirmative support for the UAV to be ordained as having UAV coordinator status). However, claimed subject matter is not limited to any particular described embodiments, implementations, examples, etc.

For certain example embodiments, an operation 942 may be directed at least partially to wherein the tracking one or more UFV coordinator designations received from one or more UFVs (of operation 940) includes ascertaining if at least one UFV coordinator designation has been tracked for at least a quorum of UFVs corresponding to a given theater. For certain example implementations, at least one machine may ascertain (e.g., determine, analyze to conclusion, figure out, learn, or a combination thereof, etc.) if at least one UFV coordinator designation 762 has been tracked for at least a quorum (e.g., a plurality, a majority, a percentage established by authority, a percentage established by local UFVs, or a combination thereof, etc.) of UFVs 102/102R corresponding to a given theater 728. By way of example but not limitation, at least one UFV may ascertain if at least one UFV coordinator designation has been tracked for at least a quorum of UFVs corresponding to a given theater (e.g., a UAV (i) may determine if a majority of UAVs corresponding to a given established zone or within current radio range have returned an affirmative UAV coordinator nomination or vote or (ii) may determine if more affirmative UAV coordinator nominations or votes have been received as compared to negative UAV coordinator nominations or votes). However, claimed subject matter is not limited to any particular described embodiments, implementations, examples, etc.

Figure 9D:
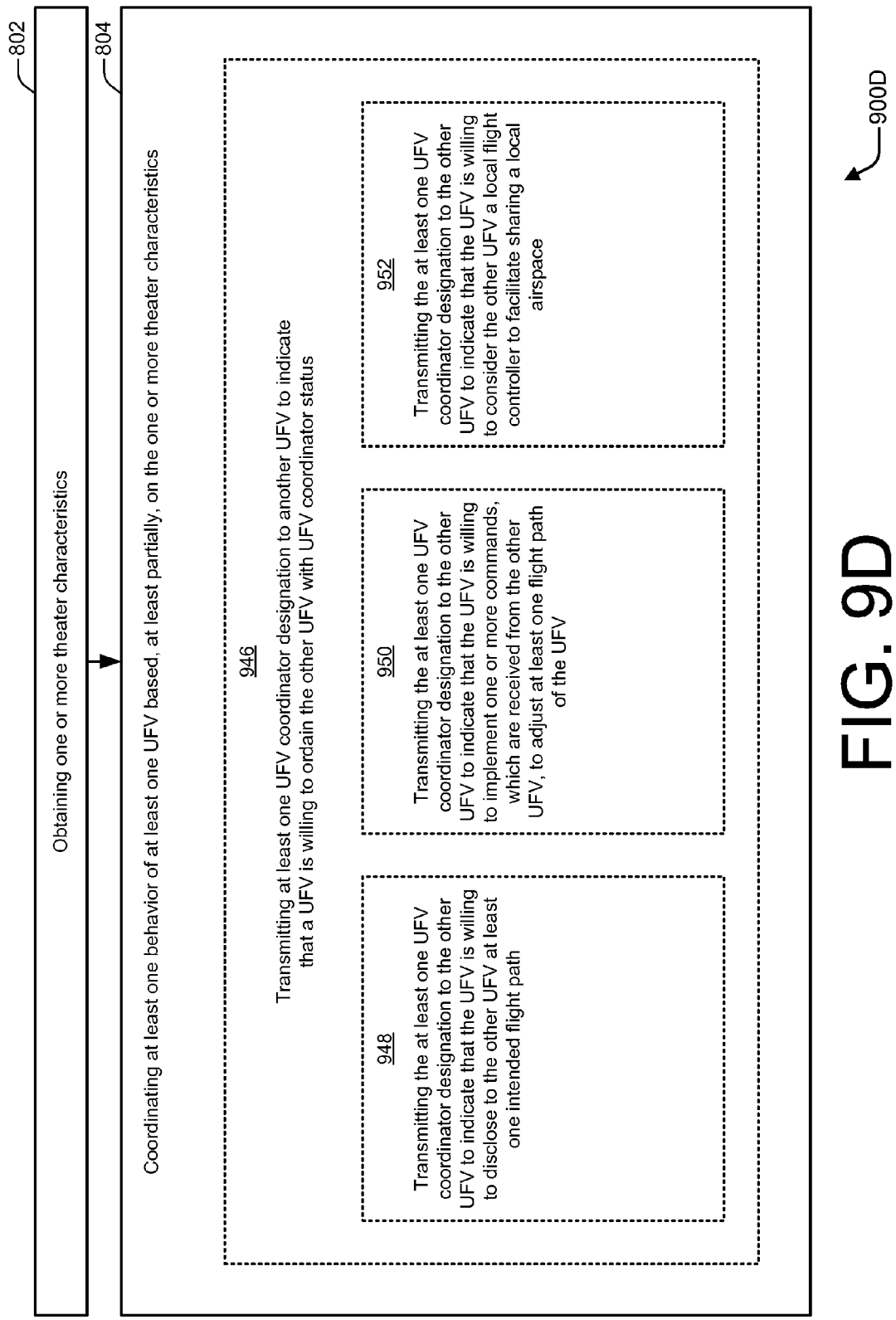

FIG. 9D illustrates a flow diagram 900D having example operations 946, 948, 950, or 952. For certain example embodiments, an operation 946 may be directed at least partially to wherein the coordinating at least one behavior of at least one UFV based, at least partially, on the one or more theater characteristics (of operation 804) includes transmitting at least one UFV coordinator designation to another UFV to indicate that a UFV is willing to ordain the other UFV with UFV coordinator status. For certain example implementations, at least one machine may transmit (e.g., send, communicate wirelessly, convey, frequency up-convert, modulate, encode, propagate, dispatch, emanate from an emitter or antenna or at least one element of an antenna, forward, broadcast, disseminate, transfer, cause to travel through or over a medium, impart, or a combination thereof, etc.) at least one UFV coordinator designation 762 (e.g., affirmation, vote, nomination, authorization, expression of approval, connotation of support, selection, or a combination thereof, etc.) to another UFV 102/102R to indicate that a UFV 102 is willing to ordain other UFV 102/102R with UFV coordinator status 758 (e.g., identified as a UFV coordinator, a UFV empowered to issue orders to other UFVs, a UFV given one or more capabilities to control other UFVs, a UFV being invested with coordinator authority, a UFV that may make flight control requests or commands to other UFVs to facilitate sharing of airspace or completion of mission objectives, or a combination thereof, etc.). By way of example but not limitation, at least one UFV may transmit at least one UFV coordinator designation to another UFV to indicate that a UFV is willing to ordain the other UFV with UFV coordinator status (e.g., a UAV may send an indication to another UAV that the UAV is willing to consider the other UAV a UAV coordinator for a given area). However, claimed subject matter is not limited to any particular described embodiments, implementations, examples, etc.

For certain example embodiments, an operation 948 may be directed at least partially to wherein the transmitting at least one UFV coordinator designation to another UFV to indicate that a UFV is willing to ordain the other UFV with UFV coordinator status (of operation 946) includes transmitting the at least one UFV coordinator designation to the other UFV to indicate that the UFV is willing to disclose to the other UFV at least one intended flight path. For certain example implementations, at least one machine may transmit at least one UFV coordinator designation 762 to another UFV 102/102R to indicate that a UFV 102 is willing to disclose to other UFV 102/102R at least one intended (e.g., programmed, determined, planned, expected, or a combination thereof, etc.) flight path 738 (e.g., a heading, a flight trajectory, a position, an altitude, a speed, a direction, a velocity, an acceleration, a stability level, a destination, a course through air or space or a time at which the course is to be traversed or particular positions thereof that are to be occupied, or a combination thereof, etc.). By way of example but not limitation, at least one UFV may transmit the at least one UFV coordinator designation to the other UFV to indicate that the UFV is willing to disclose to the other UFV at least one intended flight path (e.g., a UAV may send a signal informing another UAV that the UAV is offering to reveal a programmed flight path, such as a course in space associated with elapsed time(s), to the other UAV). However, claimed subject matter is not limited to any particular described embodiments, implementations, examples, etc.

For certain example embodiments, an operation 950 may be directed at least partially to wherein the transmitting at least one UFV coordinator designation to another UFV to indicate that a UFV is willing to ordain the other UFV with UFV coordinator status (of operation 946) includes transmitting the at least one UFV coordinator designation to the other UFV to indicate that the UFV is willing to implement one or more commands, which are received from the other UFV, to adjust at least one flight path of the UFV. For certain example implementations, at least one machine may transmit at least one UFV coordinator designation 762 to another UFV 102/102R to indicate that a UFV 102 is willing to implement one or more commands 750 (e.g., an instruction, an order with authority, an imperative, a signal indicating to take an action, a request, a directive with specificity, a demand to act, a direction to perform a procedure, a requirement, or a combination thereof, etc.), which are received from other UFV 102/102R, to adjust (e.g., change speed or altitude or direction of, replace at least a portion of, cause a deviation in, adapt, modify, alter, deviate from, add something to, take something away from, decrease, increase, augment, or a combination thereof, etc.) at least one flight path 738 (e.g., a heading, a flight trajectory, a position, an altitude, a speed, a direction, a velocity, an acceleration, a stability level, a destination, a course through air or space or a time at which the course is to be traversed or particular positions thereof that are to be occupied, or a combination thereof, etc.) of UFV 102. By way of example but not limitation, at least one UFV may transmit the at least one UFV coordinator designation to the other UFV to indicate that the UFV is willing to implement one or more commands, which are received from the other UFV, to adjust at least one flight path of the UFV (e.g., a UAV may send a message to another UAV agreeing to follow at least one command from the other UAV that instructs the UAV to change a speed or direction). However, claimed subject matter is not limited to any particular described embodiments, implementations, examples, etc.

For certain example embodiments, an operation 952 may be directed at least partially to wherein the transmitting at least one UFV coordinator designation to another UFV to indicate that a UFV is willing to ordain the other UFV with UFV coordinator status (of operation 946) includes transmitting the at least one UFV coordinator designation to the other UFV to indicate that the UFV is willing to consider the other UFV a local flight controller to facilitate sharing a local airspace. For certain example implementations, at least one machine may transmit at least one UFV coordinator designation 762 to another UFV 102/102R to indicate that a UFV 102 is willing to consider other UFV 102/102R a local flight controller 764 (e.g., an entity that serves to at least partially control or direct or change flight paths 738 for UFVs in or around or proximate to a given theater 728) to facilitate sharing (e.g., to enable or improve a likelihood of simultaneous use of) a local airspace (e.g., an airspace in or around or proximate to a given theater 728). By way of example but not limitation, at least one UFV may transmit the at least one UFV coordinator designation to the other UFV to indicate that the UFV is willing to consider the other UFV a local flight controller to facilitate sharing a local airspace (e.g., a UAV may send a code to another UAV to signify a willingness to permit the other UAV to act as local flight controller to reduce a likelihood that one or more UAVs may collide or otherwise interfere with one another, such as if a local flight controller attempts to assign different UAVs that are flying within a given area to different altitude strata). However, claimed subject matter is not limited to any particular described embodiments, implementations, examples, etc.

FIG. 9E illustrates a flow diagram 900E having example operations 956, 958, 960, 962, 964, 966, 968, 970, or 972. For certain example embodiments, an operation 956 may be directed at least partially to wherein the coordinating at least one behavior of at least one UFV based, at least partially, on the one or more theater characteristics (of operation 804) includes detecting that at least one remote UFV is flying erratically. For certain example implementations, at least one machine may detect (e.g., via at least one detection 766, such as from at least one report, at least one observation, or a combination thereof, etc.) that at least one remote UFV 102R is flying erratically (e.g., unsafely, dangerously, in manners violating rules of flight, in contravention to a command by an ordained UFV coordinator, or a combination thereof, etc.). By way of example but not limitation, at least one UFV may detect that at least one remote UFV is flying erratically (e.g., a UAV may detect (e.g., using one or more location updates received from a UAV; using flight path information received from a UAV; using one or more onboard sensors, such as optical or radar sensors; using at least one report from another UAV or from a base station; or some combination thereof; etc.) that another UAV is occupying airspace, such as being in motion or hovering in one place, in a manner that deviates from a proper or expected course of action or conduct). However, claimed subject matter is not limited to any particular described embodiments, implementations, examples, etc.

For certain example embodiments, an operation 958 may be directed at least partially to wherein the detecting that at least one remote UFV is flying erratically (of operation 956) includes detecting that the at least one remote UFV is failing to fly in accordance with at least one mission objective. For certain example implementations, at least one machine may detect that at least one remote UFV 102R is failing to fly in accordance with (e.g., in a manner towards accomplishing at least one goal of, in a direction to complete at least one phase of, by adhering to one or more operational parameters of, or a combination thereof, etc.) at least one mission objective 748 (e.g., an assigned goal, a target to scan with one or more sensors, a payload to acquire or deliver, a tasked accomplishment, a deadline to meet, a destination to reach, an enumerated set of steps to follow, a procedure to complete, or a combination thereof, etc.). By way of example but not limitation, at least one UFV may detect that the at least one remote UFV is failing to fly in accordance with at least one mission objective (e.g., a UAV may determine that another UAV is flying south while a destination for a known mission objective is located north). However, claimed subject matter is not limited to any particular described embodiments, implementations, examples, etc.

For certain example embodiments, an operation 960 may be directed at least partially to wherein the detecting that at least one remote UFV is flying erratically (of operation 956) includes detecting that the at least one remote UFV is not flying in accordance with at least one flight control command instituted by a UFV flight coordinator. For certain example implementations, at least one machine may detect that at least one remote UFV 102R is not flying in accordance with (e.g., in a manner towards accomplishing at least one goal of, in a direction to complete at least one phase of, by adhering to one or more operational parameters of, or a combination thereof, etc.) at least one flight control command 744 (e.g., an instruction to adjust a flight path; an order to change a flight state, such as changing a velocity, an acceleration, or an altitude; a requested alteration to a route or course to reach a destination; a destination substitution; or a combination thereof; etc.) instituted (e.g., enacted, set forth, ordered, announced, or a combination thereof, etc.) by a UFV flight coordinator 767 (e.g., a UFV having coordinator status, a UFV that has been ordained a UFV coordinator for a given theater, a UFV that other UFV(s) have agreed is to facilitate a sharing of airspace, a UFV that is to organize or control one or more other UFVs, or a combination thereof, etc. with respect to at least one or more flight operations). By way of example but not limitation, at least one UFV may detect that the at least one remote UFV is not flying in accordance with at least one flight control command instituted by a UFV flight coordinator (e.g., a UAV may realize that another UAV is continuing to fly at 10 m/s after a given UAV that has been ordained a UAV flight coordinator for an area that encompasses a location of the other UAV has commanded the other UAV to slow to 5 m/s, which ordained UAV flight coordinator may be the detecting UAV). However, claimed subject matter is not limited to any particular described embodiments, implementations, examples, etc.

For certain example embodiments, an operation 962 may be directed at least partially to wherein the detecting that at least one remote UFV is flying erratically (of operation 956) includes detecting that the at least one remote UFV is not comporting with one or more promulgated flight rules. For certain example implementations, at least one machine may detect that at least one remote UFV 102R is not comporting with (e.g., not following, not abiding by, failing to adhere to, violating, ignoring, or a combination thereof, etc.) one or more promulgated (e.g., established, enacted, set forth, agreed-upon, passed, approved, or a combination thereof, etc.) flight rules 768 (e.g., laws, regulations, industry guidelines, commonly-accepted flight manners or rights-of-way, or a combination thereof, etc. pertaining or relating to flying). By way of example but not limitation, at least one UFV may detect that the at least one remote UFV is not comporting with one or more promulgated flight rules (e.g., a UAV may detect that another UAV is flying in contravention of FAA regulations for a given class of UAVs, such as if a UAV with limited deceleration capability is exceeding a corresponding speed limit). However, claimed subject matter is not limited to any particular described embodiments, implementations, examples, etc.

For certain example embodiments, an operation 964 may be directed at least partially to wherein the detecting that at least one remote UFV is flying erratically (of operation 956) includes detecting that the at least one remote UFV is flying dangerously. For certain example implementations, at least one machine may detect that at least one remote UFV 102R is flying dangerously (e.g., recklessly, in a manner likely to cause harm to humans or animals, in a manner likely to cause damage to objects or property, in a manner causing other UFVs to take evasive action, along a flight path that violates safety protocols, or a combination thereof, etc.). By way of example but not limitation, at least one UFV may detect that the at least one remote UFV is flying dangerously (e.g., a UAV may detect that another UAV is flying within a minimum safety distance to one or more persons or too close to the ground or too fast in a residential neighborhood or bumping into other UAVs). However, claimed subject matter is not limited to any particular described embodiments, implementations, examples, etc.

For certain example embodiments, an operation 966 may be directed at least partially to wherein the detecting that at least one remote UFV is flying erratically (of operation 956) includes notifying at least one base station that the at least one remote UFV is flying erratically. For certain example implementations, at least one machine may notify (e.g., send a message, report, describe flight of a UFV, identify a UFV, indicate a rule a UFV is violating, or a combination thereof, etc. to) at least one base station 306 that at least one remote UFV 102R is flying erratically. By way of example but not limitation, at least one UFV may notify at least one base station that the at least one remote UFV is flying erratically (e.g., a UAV may send a notice of erratic flight that identifies a detected UAV to a base station that is associated with the detected UAV or to a base station that is associated with the UAV). However, claimed subject matter is not limited to any particular described embodiments, implementations, examples, etc.

For certain example embodiments, an operation 968 may be directed at least partially to wherein the detecting that at least one remote UFV is flying erratically (of operation 956) includes notifying at least one authority that the at least one remote UFV has been detected as flying erratically. For certain example implementations, at least one machine may notify (e.g., send a message, report, describe flight of a UFV, identify a UFV, indicate a rule a UFV is violating, or a combination thereof, etc. to) at least one authority (e.g., a governmental entity, a regulatory body, a law enforcement branch, an industry group, a UFV coordinator, the Federal Aviation Administration (FAA), or a combination thereof, etc.) that at least one remote UFV 102R has been detected as flying erratically. By way of example but not limitation, at least one UFV may notify at least one authority that the at least one remote UFV has been detected as flying erratically (e.g., a UAV may send an erratic flight notice, which may identify a detected UAV (i) by transponder or serial number or (ii) by UAV location and time or (iii) by UAV description, to at least one authority, such as a local law enforcement branch, the FAA, or an industry regulatory body, wherein a notice may provide a code or a description explaining an erratic flight determination decision). However, claimed subject matter is not limited to any particular described embodiments, implementations, examples, etc.

For certain example embodiments, an operation 970 may be directed at least partially to wherein the detecting that at least one remote UFV is flying erratically (of operation 956) includes notifying the at least one remote UFV that its flying appears to be erratic. For certain example implementations, at least one machine may notify (e.g., send a message, report, describe flight of a UFV, identify a UFV, indicate a rule a UFV is violating, or a combination thereof, etc. to) at least one remote UFV 102R that its flying appears (e.g., reports identify it, messages explain or describe violating actions that can be characterized, observations indicate it, or a combination thereof, etc.) to be erratic. By way of example but not limitation, at least one UFV may notify the at least one remote UFV that its flying appears to be erratic (e.g., a UAV may send a warning to a detected UAV that its flying appears to deviate from accepted flight norms, which warning may provide a code or a description explaining a decision as to why its flight has been labeled erratic).

However, claimed subject matter is not limited to any particular described embodiments, implementations, examples, etc.

For certain example embodiments, an operation 972 may be directed at least partially to wherein the detecting that at least one remote UFV is flying erratically (of operation 956) includes broadcasting at least one announcement indicative that the at least one remote UFV has been categorized as flying erratically. For certain example implementations, at least one machine may broadcast at least one announcement (e.g., send a message, report, describe flight of a UFV, identify a UFV, indicate a rule a UFV is violating, or a combination thereof, etc. by transmitting in a manner enabling reception, decoding, understanding, or a combination thereof, etc. to multiple UFVs) indicative (e.g., representative, descriptive, identifying, or a combination thereof, etc.) that at least one remote UFV 102R has been categorized as flying erratically. By way of example but not limitation, at least one UFV may broadcast at least one announcement indicative that the at least one remote UFV has been categorized as flying erratically (e.g., a UAV may send a warning to multiple other UAVs indicating that at least one UAV of a given operational theater has been detected as engaging in erratic flight, which broadcast warning may identify the detected at least one UAV (i) by transponder or serial number or (ii) by UAV location with or without a corresponding time (iii) by UAV description, or (iv) by flight path). However, claimed subject matter is not limited to any particular described embodiments, implementations, examples, etc.

Figure 9F:
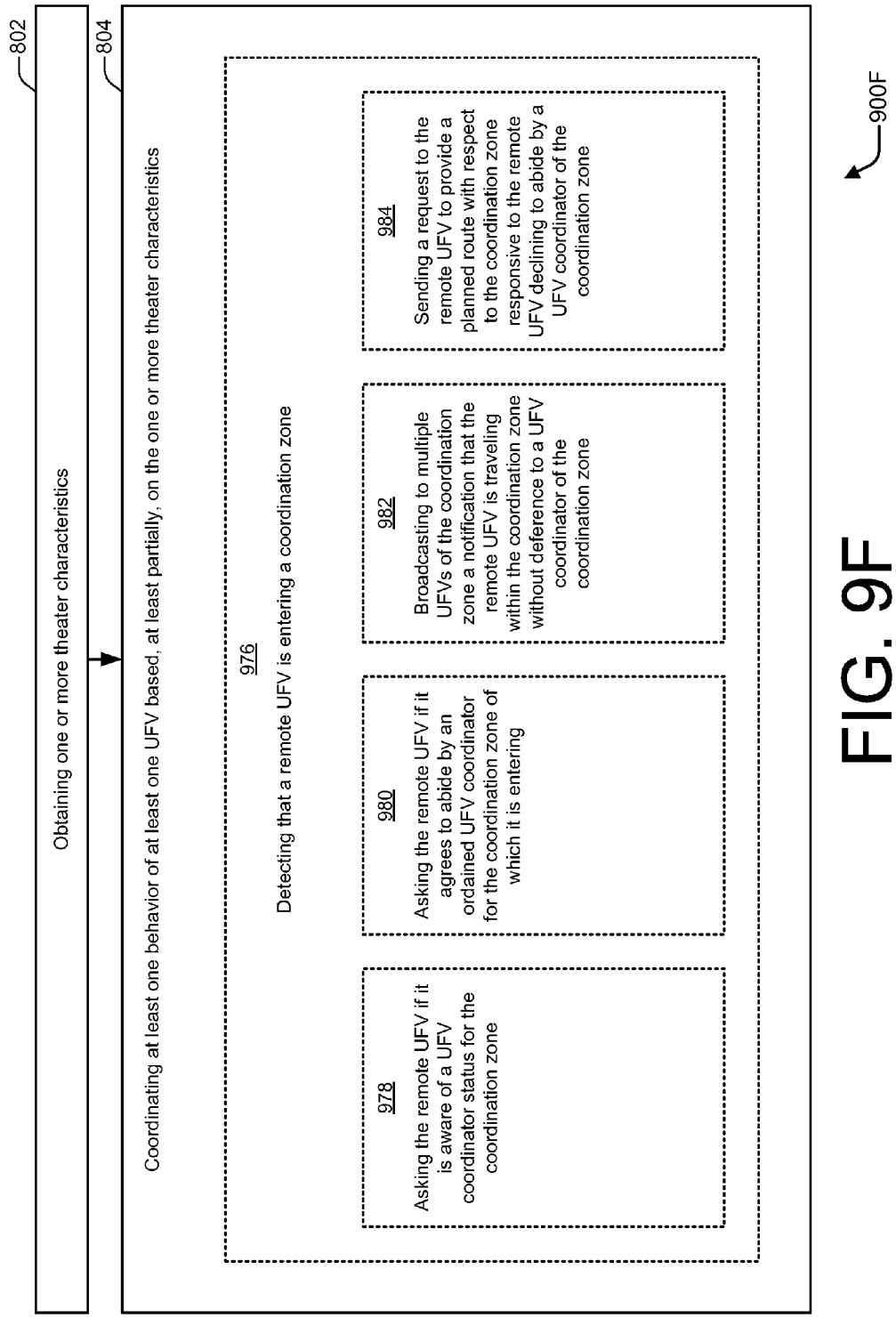

FIG. 9F illustrates a flow diagram 900F having example operations 976, 978, 980, 982, or 984. For certain example embodiments, an operation 976 may be directed at least partially to wherein the coordinating at least one behavior of at least one UFV based, at least partially, on the one or more theater characteristics (of operation 804) includes detecting that a remote UFV is entering a coordination zone. For certain example implementations, at least one machine may detect (e.g., via at least one detection 766, such as from at least one report, at least one observation, or a combination thereof, etc.) that a remote UFV 102R is entering (e.g., vectoring towards, proximate to, crossed into, or a combination thereof, etc.) a coordination zone 770 (e.g., an area, a region, a theater 728, or a combination thereof, etc. for which a UFV coordinator 756 or a UFV flight coordinator 767 is responsible for coordinating). By way of example but not limitation, at least one UFV may detect that a remote UFV is entering a coordination zone (e.g., a UAV may detect (e.g., using one or more location updates received from a UAV; using flight path information received from a UAV; using one or more onboard sensors, such as optical or radar sensors; using at least one report from another UAV or from a base station; or some combination thereof; etc.) that a particular UAV is entering an area that is being coordinated by the UAV). However, claimed subject matter is not limited to any particular described embodiments, implementations, examples, etc.

For certain example embodiments, an operation 978 may be directed at least partially to wherein the detecting that a remote UFV is entering a coordination zone (of operation 976) includes asking the remote UFV if it is aware of a UFV coordinator status for the coordination zone. For certain example implementations, at least one machine may ask (e.g., inquire, request an answer from, interrogate, or a combination thereof, etc.) a remote UFV 102R if it is aware of (e.g., has detected, is receiving a UFV coordinator beacon regarding, knows of, or a combination thereof, etc.) a UFV coordinator status 758 (e.g., an identified UFV coordinator, a UFV empowered to issue orders to other UFVs, a UFV given one or more capabilities to control other UFVs, a UFV being invested with coordinator authority, a UFV that may make flight control requests or commands to other UFVs to facilitate sharing of airspace or completion of mission objectives, or a combination thereof, etc.) for coordination zone 770. By way of example but not limitation, at least one UFV may ask the remote UFV if it is aware of a UFV coordinator status for the coordination zone (e.g., a UAV may send a communication to a particular UFV that is entering its coordination zone inquiring as to whether the particular UFV is aware of its status as UFV coordinator). However, claimed subject matter is not limited to any particular described embodiments, implementations, examples, etc.

For certain example embodiments, an operation 980 may be directed at least partially to wherein the detecting that a remote UFV is entering a coordination zone (of operation 976) includes asking the remote UFV if it agrees to abide by an ordained UFV coordinator for the coordination zone of which it is entering. For certain example implementations, at least one machine may ask (e.g., inquire, request an answer from, interrogate, or a combination thereof, etc.) a remote UFV 102R if it agrees to abide by (e.g., is willing to interact with, acknowledges authority of, offers to attempt to follow commands of, assents to consider instructions given by, or a combination thereof, etc.) an ordained (e.g., established, nominated, designated, announced, appointed, or a combination thereof, etc.) UFV coordinator 756 (e.g., a UFV having coordinator status, a UFV that has been ordained a UFV coordinator for a given theater, a UFV that other UFV(s) have agreed is to facilitate a sharing of airspace, a UFV that is to organize or control one or more other UFVs, or a combination thereof, etc.) for a coordination zone 770 of which it is entering. By way of example but not limitation, at least one UFV may ask the remote UFV if it agrees to abide by an ordained UFV coordinator for the coordination zone of which it is entering (e.g., a UAV may send a message to a particular UAV asking for confirmation of acceptance or for designation of UFV coordinator status for an existing UFV coordinator for a theater that the particular UAV has entered). However, claimed subject matter is not limited to any particular described embodiments, implementations, examples, etc.

For certain example embodiments, an operation 982 may be directed at least partially to wherein the detecting that a remote UFV is entering a coordination zone (of operation 976) includes broadcasting to multiple UFVs of the coordination zone a notification that the remote UFV is traveling within the coordination zone without deference to a UFV coordinator of the coordination zone. For certain example implementations, at least one machine may broadcast (e.g., transmit to multiple UFVs, emanate to multiple potential targets, send in multiple directions, make available for reception or processing generally, or a combination thereof, etc.) to multiple UFVs 102/102R of a coordination zone 770 a notification (e.g., a message, a signal, an announcement, a field code, or a combination thereof, etc.) that a remote UFV 102R is traveling within (e.g., flying in, operating within, entering, accelerating within, or a combination thereof, etc.) coordination zone 770 without deference to (e.g., without agreeing to abide by, without yielding to instructions of, without participating in a coordination strategy of, or a combination thereof, etc.) a UFV coordinator 756 (e.g., a UFV having coordinator status, a UFV that has been ordained a UFV coordinator for a given theater, a UFV that other UFV(s) have agreed is to facilitate a sharing of airspace, a UFV that is to organize or control one or more other UFVs, or a combination thereof, etc.) of coordination zone 770. By way of example but not limitation, at least one UFV may broadcast to multiple UFVs of the coordination zone a notification that the remote UFV is traveling within the coordination zone without deference to a UFV coordinator of the coordination zone (e.g., a UAV may send a notification to UAVs corresponding to a given coordination area with the notification warning the UAVs that there is at least one UAV flying in the coordination area that has not agreed to abide by coordination-related actions or instructions of a UAV that has been ordained a UAV coordinator for the coordination area, wherein the notification may include at least one identifying characteristic of the at least one UAV, such as a description or an aircraft registration call sign). However, claimed subject matter is not limited to any particular described embodiments, implementations, examples, etc.

For certain example embodiments, an operation 984 may be directed at least partially to wherein the detecting that a remote UFV is entering a coordination zone (of operation 976) includes sending a request to the remote UFV to provide a planned route with respect to the coordination zone responsive to the remote UFV declining to abide by a UFV coordinator of the coordination zone. For certain example implementations, at least one machine may send a request (e.g., a message asking for something, a petition, a demand, or a combination thereof, etc.) to a remote UFV 102R to provide a planned route (e.g., an intended flight path, a programmed course, a current destination, an assigned mission objective, or a combination thereof, etc.) with respect to a coordination zone 770 responsive to remote UFV 102R declining to abide by (e.g., refusing to defer to, not acknowledging authority of, rejecting designation of, or a combination thereof, etc.) a UFV coordinator 756 (e.g., a UFV having coordinator status, a UFV that has been ordained a UFV coordinator for a given theater, a UFV that other UFV(s) have agreed is to facilitate a sharing of airspace, a UFV that is to organize or control one or more other UFVs, or a combination thereof, etc.) of coordination zone 770. By way of example but not limitation, at least one UFV may send a request to the remote UFV to provide a planned route with respect to the coordination zone responsive to the remote UFV declining to abide by a UFV coordinator of the coordination zone (e.g., a UAV may send a wireless communication to a particular UAV that asks the particular UAV to provide an intended flight path that will run at least partially within an area corresponding to an ordained UAV coordinator so that the ordained UAV coordinator is empowered to route other UAVs so as to safely avoid the intended flight path of the particular UAV). However, claimed subject matter is not limited to any particular described embodiments, implementations, examples, etc.

Figure 10A:
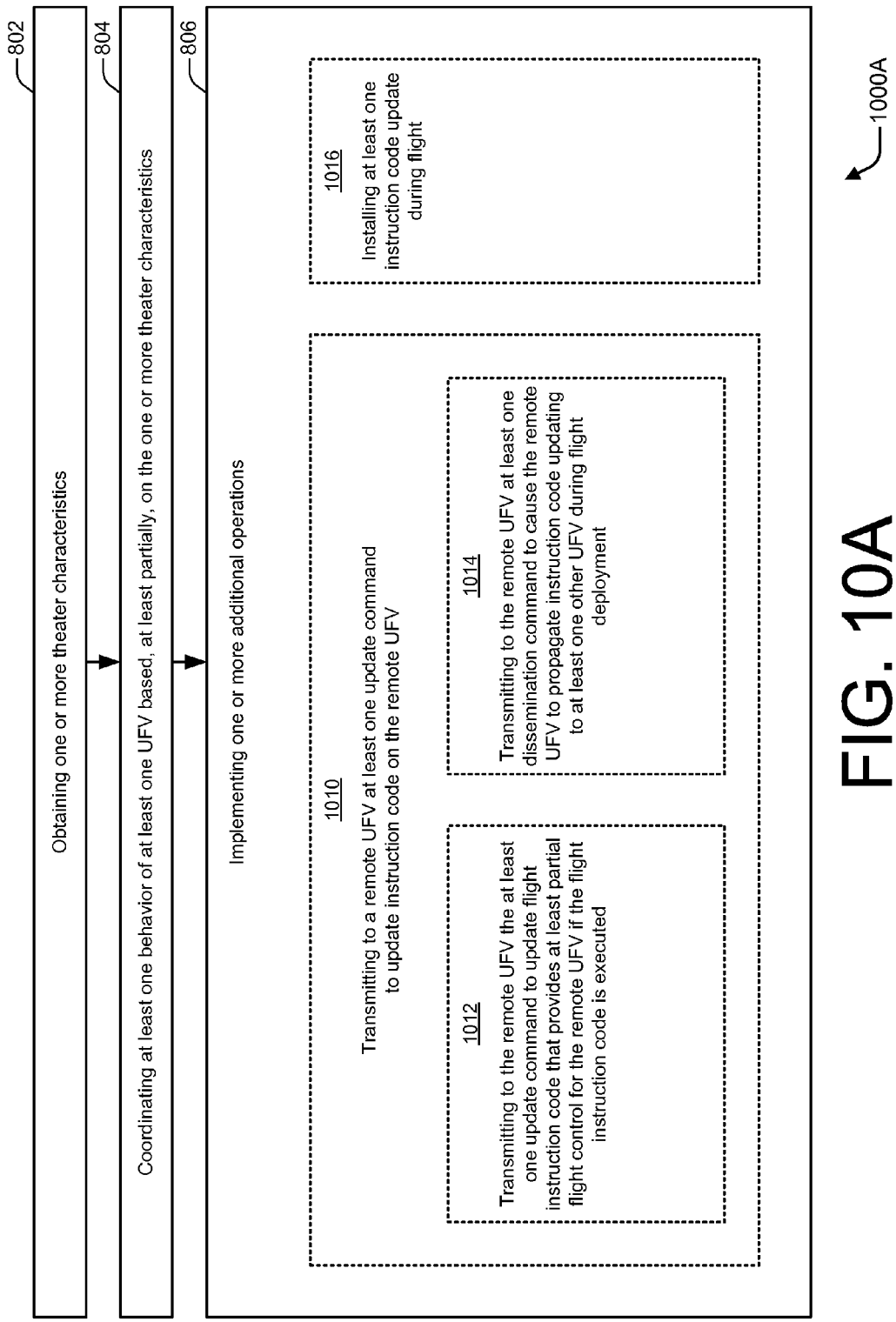
FIGS. 10A-10B depict example additions or alternatives for a flow diagram of FIG. 8A in accordance with certain example embodiments.
Figure 10B:
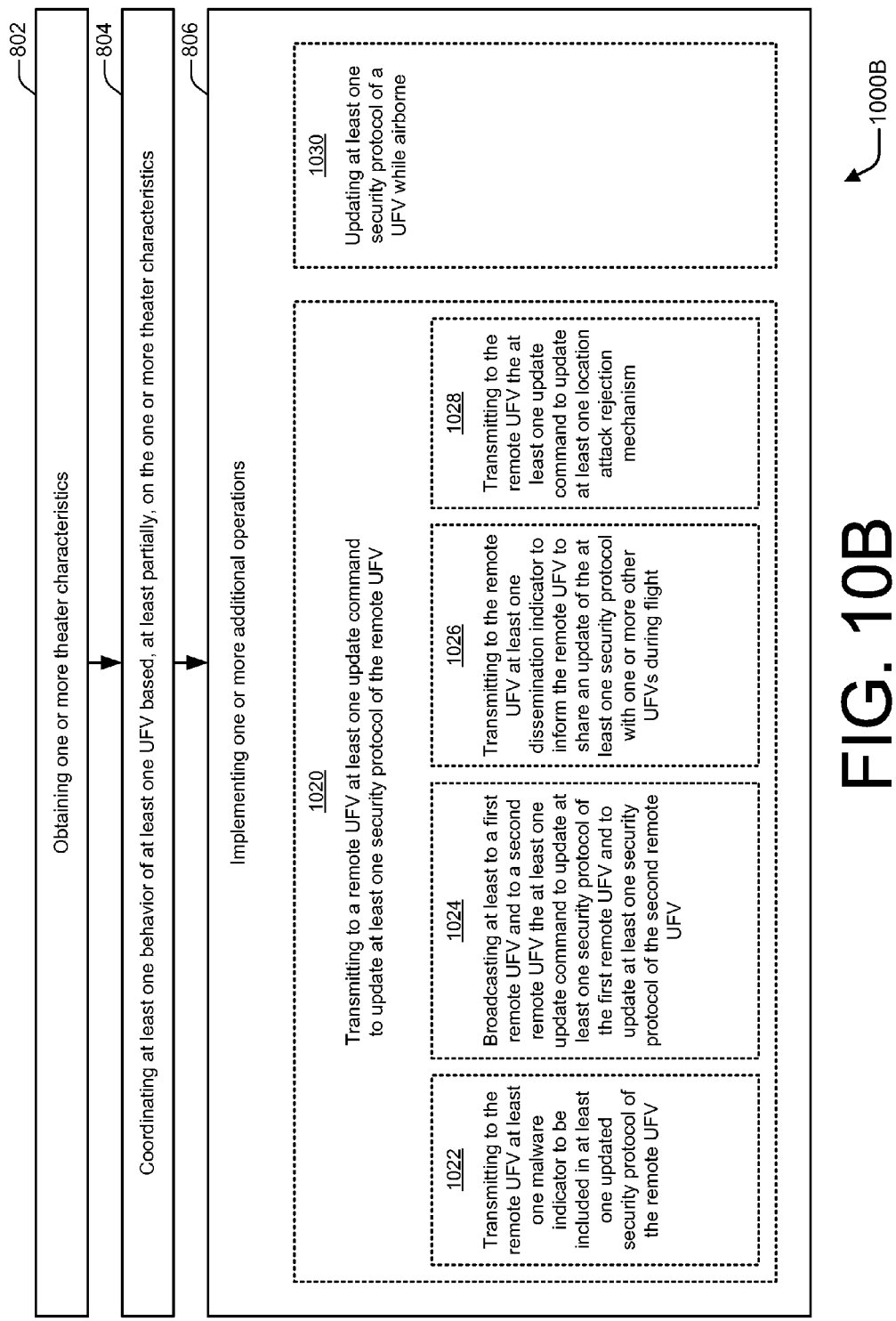

FIGS. 10A-10B depict example additions or alternatives for a flow diagram of FIG. 8A in accordance with certain example embodiments. As illustrated, flow diagrams of FIGS. 10A-10B may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations (e.g., operations that are illustrated as nested blocks are not necessarily subsidiary operations and may instead be performed independently). Also, at least some operation(s) of flow diagrams of FIGS. 10A-10B may be performed so as to be fully or partially overlapping with other operation(s). For certain example embodiments, one or more operations of flow diagrams 1000A-1000B (of FIGS. 10A-10B) may be performed by at least one machine (e.g., a UFV 102 or at least a portion thereof).

FIGS. 10A-10B each illustrates a flow diagram 1000A-1000B, respectively, having an example operation 806. For certain example embodiments, an operation 806 may be directed at least partially to wherein a method further includes implementing one or more additional operations. For certain example implementations, at least one machine may implement one or more operations in addition to obtaining (of operation 802) or coordinating (of operation 804). Example additional operations may include, by way of example but not limitation, any one or more of operations 1010, 1012, 1014, 1016, 1020, 1022, 1024, 1026, 1028, or 1030 (of FIGS. 10A-10B).

FIG. 10A illustrates a flow diagram 1000A having example operations 1010, 1012, 1014, or 1016. For certain example embodiments, an operation 1010 may be directed at least partially to wherein a method of obtaining (of operation 802) or coordinating (of operation 804) further includes (at additional operation 806) transmitting to a remote UFV at least one update command to update instruction code on the remote UFV. For certain example implementations, at least one machine may transmit (e.g., send, communicate wirelessly, convey, frequency up-convert, modulate, encode, propagate, dispatch, emanate from an emitter or antenna or at least one element of an antenna, forward, broadcast, disseminate, transfer, cause to travel through or over a medium, impart, or a combination thereof, etc.) to a remote UFV 102R at least one update command 772 (e.g., a directive to change, an order to substitute, a demand to alter or replace, or a combination thereof, etc.) to update (e.g., alter, change based on recently acquired data, modify responsive to new information, improve, fine tune, substitute at least a portion of, augment, or a combination thereof, etc.) instruction code 774 (e.g., code that instructs a UFV how to operate, logic that enables a UFV to perform missions, directions to implement procedures, descriptions of tasks, instructions that guide a UFV's behavior, steps to achieve a goal, or a combination thereof, etc.) on remote UFV 102R. By way of example but not limitation, at least one UFV may transmit to a remote UFV at least one update command to update instruction code on the remote UFV (e.g., a UAV may send to a remote UAV a command causing the remote UAV to install an update to program coding—such as navigational or communication software—resident on the remote UAV, wherein the command may include or reference updated program coding—which updated program coding may be transmitted to the remote UAV by the UAV). However, claimed subject matter is not limited to any particular described embodiments, implementations, examples, etc.

For certain example embodiments, an operation 1012 may be directed at least partially to wherein the transmitting to a remote UFV at least one update command to update instruction code on the remote UFV (of operation 1010) includes transmitting to the remote UFV the at least one update command to update flight instruction code that provides at least partial flight control for the remote UFV if the flight instruction code is executed. For certain example implementations, at least one machine may transmit to a remote UFV 102R at least one update command 772 to update flight instruction code 776 (e.g., instruction code 774 that includes at least processor-executable instructions and that is adapted to affect a flight path (e.g., a heading, a flight trajectory, a position, an altitude, a speed, a direction, a velocity, an acceleration, a stability level, a destination, a course through air or space or a time at which the course is to be traversed or particular positions thereof that are to be occupied, or a combination thereof, etc.) of a UFV) that provides at least partial flight control (e.g., control over a flight path, a capability to affect a flight path, an ability to change speed/direction/elevation, a mechanism to adhere to a course that comports with a mission, or a combination thereof, etc.) for remote UFV 102R if flight instruction code 776 is executed. By way of example but not limitation, at least one UFV may transmit to the remote UFV the at least one update command to update flight instruction code that provides at least partial flight control for the remote UFV if the flight instruction code is executed (e.g., a UAV may send to a remote UAV a command to update some flight control code, which flight control code may be capable of making navigational decisions for or adjusting a flight path of the remote UAV during or after or as a result of execution of the flight control code by the remote UAV). However, claimed subject matter is not limited to any particular described embodiments, implementations, examples, etc.

For certain example embodiments, an operation 1014 may be directed at least partially to wherein the transmitting to a remote UFV at least one update command to update instruction code on the remote UFV (of operation 1010) includes transmitting to the remote UFV at least one dissemination command to cause the remote UFV to propagate instruction code updating to at least one other UFV during flight deployment. For certain example implementations, at least one machine may transmit to a remote UFV 102R at least one dissemination command 778 (e.g., a command to share, forward, distribute, broadcast, spread, or a combination thereof, etc. that is) to cause remote UFV 102R to propagate (e.g., transmit, provide, communicate, or a combination thereof, etc.) instruction code 774 updating (e.g., altering, changing based on recently acquired data, modifying responsive to new information, improving, fine tuning, substituting at least a portion of, augmenting, or a combination thereof, etc.) to at least one other UFV during flight deployment (e.g., while airborne, between a takeoff and landing, while flying during a mission, or a combination thereof, etc.). By way of example but not limitation, at least one UFV may transmit to the remote UFV at least one dissemination command to cause the remote UFV to propagate instruction code updating to at least one other UFV during flight deployment (e.g., a UAV may send to a first UAV a command causing the first UAV to disseminate updated instruction code—such as by transmitting some updated instruction code or at least one update command—to one or more other UAVs, such as a second UAV, while the first UAV is airborne or while the one or more other UAVs are airborne). However, claimed subject matter is not limited to any particular described embodiments, implementations, examples, etc.

For certain example embodiments, an operation 1016 may be directed at least partially to wherein a method of obtaining (of operation 802) or coordinating (of operation 804) further includes (at additional operation 806) installing at least one instruction code update during flight. For certain example implementations, at least one machine may install (e.g., load, replace previous code, make executable, or a combination thereof, etc.) at least one instruction code update (e.g., a change, a replacement, a newer version, or a combination thereof, etc. of instruction code 774) during flight (e.g., while flying, while airborne, between takeoff and landing, or a combination thereof, etc.). By way of example but not limitation, at least one UFV may install at least one instruction code update during flight (e.g., a UAV may install an update to program coding—such as navigational or communication software—resident on the UAV while the UAV is airborne, such as if the UAV receives an update from another UAV or from a base station while flying). However, claimed subject matter is not limited to any particular described embodiments, implementations, examples, etc.

FIG. 10B illustrates a flow diagram 1000B having example operations 1020, 1022, 1024, 1026, 1028, or 1030. For certain example embodiments, an operation 1020 may be directed at least partially to wherein a method of obtaining (of operation 802) or coordinating (of operation 804) further includes (at additional operation 806) transmitting to a remote UFV at least one update command to update at least one security protocol of the remote UFV. For certain example implementations, at least one machine may transmit (e.g., send, communicate wirelessly, convey, frequency up-convert, modulate, encode, propagate, dispatch, emanate from an emitter or antenna or at least one element of an antenna, forward, broadcast, disseminate, transfer, cause to travel through or over a medium, impart, or a combination thereof, etc.) to a remote UFV 102R at least one update command 780 (e.g., a directive to change, an order to substitute, a demand to alter or replace, or a combination thereof, etc.) to update (e.g., alter, change based on recently acquired data, modify responsive to new information, improve, fine tune, substitute at least a portion of, augment, or a combination thereof, etc.) at least one security protocol 782 (e.g., a security procedure, a security program, a security policy, an approach to prevent unauthorized tampering, a mechanism to fend off attacks, code to thwart foreign control, techniques to reject location or hijacking attacks, or a combination thereof, etc.) of remote UFV 102R. By way of example but not limitation, at least one UFV may transmit to a remote UFV at least one update command to update at least one security protocol of the remote UFV (e.g., a UAV may send a wireless transmission to a remote UAV that includes a command ordering the remote UAV to change or add or replace a security protocol—such as an anti-malware program, at least one anti-malware signature for a code segment fingerprint or code behavior, at least one anti-malware heuristic, at least one rootkit defense, an anti-hijacking module, or an anti-spoofing routine, etc.—that the remote UAV is employing or capable of activating). However, claimed subject matter is not limited to any particular described embodiments, implementations, examples, etc.

For certain example embodiments, an operation 1022 may be directed at least partially to wherein the transmitting to a remote UFV at least one update command to update at least one security protocol of the remote UFV (of operation 1020) includes transmitting to the remote UFV at least one malware indicator to be included in at least one updated security protocol of the remote UFV. For certain example implementations, at least one machine may transmit to a remote UFV 102R at least one malware indicator 784 (e.g., a static or dynamic image or pattern of known or predicted malware data/code or behavior, a malware signature, a malware heuristic, or a combination thereof, etc.) to be included in at least one updated (e.g., altered, changed based on recently acquired data, modified responsive to new information, improved, fine-tuned, substituted at least a portion of, augmented, or a combination thereof, etc.) security protocol 782 of remote UFV 102R. By way of example but not limitation, at least one UFV may transmit to the remote UFV at least one malware indicator to be included in at least one updated security protocol of the remote UFV (e.g., a UAV may send to a remote UAV at least one anti-malware signature for a code segment fingerprint, at least one anti-malware signature for code behavior, or at least one anti-malware heuristic, etc., such as a virus signature having a known data pattern). However, claimed subject matter is not limited to any particular described embodiments, implementations, examples, etc.

For certain example embodiments, an operation 1024 may be directed at least partially to wherein the transmitting to a remote UFV at least one update command to update at least one security protocol of the remote UFV (of operation 1020) includes broadcasting at least to a first remote UFV and to a second remote UFV the at least one update command to update at least one security protocol of the first remote UFV and to update at least one security protocol of the second remote UFV. For certain example implementations, at least one machine may broadcast (e.g., transmit to multiple UFVs, emanate to multiple potential targets, send in multiple directions, make available for reception or processing generally, or a combination thereof, etc.) at least to a first remote UFV 102R(1) and to a second remote UFV 102R(2) at least one update command 780 to update (e.g., alter, change based on recently acquired data, modify responsive to new information, improve, fine tune, substitute at least a portion of, augment, or a combination thereof, etc.) at least one security protocol 782(1) of first remote UFV 102R(1) and to update at least one security protocol 782(2) of second remote UFV 102R(2). By way of example but not limitation, at least one UFV may broadcast at least to a first remote UFV and to a second remote UFV the at least one update command to update at least one security protocol of the first remote UFV and to update at least one security protocol of the second remote UFV (e.g., a UAV may wirelessly transmit to multiple UAVs, such as a first remote UAV and a second remote UAV, a command ordering the multiple UAVs to update at least one security protocol to enable them to overcome an information-technology-based or signal-jamming attack). However, claimed subject matter is not limited to any particular described embodiments, implementations, examples, etc.

For certain example embodiments, an operation 1026 may be directed at least partially to wherein the transmitting to a remote UFV at least one update command to update at least one security protocol of the remote UFV (of operation 1020) includes transmitting to the remote UFV at least one dissemination indicator to inform the remote UFV to share an update of the at least one security protocol with one or more other UFVs during flight. For certain example implementations, at least one machine may transmit to a remote UFV 102R at least one dissemination indicator 786 (e.g., code, signal, message, field value, instruction, or a combination thereof, etc. to share, forward, distribute, broadcast, spread, or a combination thereof, etc. something, such as) to inform (e.g., notify, alert, instruct, advise, make known to, or a combination thereof, etc.) remote UFV 102R to share (e.g., provide to others, broadcast, transmit, communicate, distribute, send a copy, or a combination thereof, etc.) an update (e.g., a change, a replacement, a newer version, a substitution, an amendment, or a combination thereof, etc.) of at least one security protocol 782 with one or more other UFVs 102/102R during flight (e.g., while in the air, above ground, flying, floating, hovering, or a combination thereof, etc.). By way of example but not limitation, at least one UFV may transmit to the remote UFV at least one dissemination indicator to inform the remote UFV to share an update of the at least one security protocol with one or more other UFVs during flight (e.g., a UAV may include as part of, in conjunction with, etc. a security protocol update command that is communicated to a remote UAV a signal or a flag that informs the remote UAV that it is to propagate the security protocol update to other UAVs with which it enters wireless communication range). However, claimed subject matter is not limited to any particular described embodiments, implementations, examples, etc.

For certain example embodiments, an operation 1028 may be directed at least partially to wherein the transmitting to a remote UFV at least one update command to update at least one security protocol of the remote UFV (of operation 1020) includes transmitting to the remote UFV the at least one update command to update at least one location attack rejection mechanism. For certain example implementations, at least one machine may transmit to a remote UFV 102R at least one update command 780 to update (e.g., change, replace, substitute a newer version, amend, or a combination thereof, etc.) at least one location attack rejection mechanism 788 (e.g., an approach to avoid being fooled by attacks on a UFV's ability to ascertain its location, a routine to counteract GPS spoofing, a technique to deny GPS hijacking, a code or key to facilitate using secure location-providing sources—such as a known base station or a friendly UFV, or a combination thereof, etc.). By way of example but not limitation, at least one UFV may transmit to the remote UFV the at least one update command to update at least one location attack rejection mechanism (e.g., a UAV may send to a remote UAV code embodying an updated technique to thwart a location-based attack on the remote UAV, with the updated technique including an approach to counteract GPS spoofing or deny GPS hijacking using other, non-GPS on-board sensors—such as an inertial measurement unit (IMU)—or one or more proximate friendly UAVs—which may provide an alternative source for trilateration data or data to correlate and ascertain spoofed GPS data). However, claimed subject matter is not limited to any particular described embodiments, implementations, examples, etc.

For certain example embodiments, an operation 1030 may be directed at least partially to wherein a method of obtaining (of operation 802) or coordinating (of operation 804) further includes (at additional operation 806) updating at least one security protocol of a UFV while airborne. For certain example implementations, at least one machine may update (e.g., change, replace, substitute a newer version, amend, or a combination thereof, etc.) at least one security protocol 782 (e.g., a security procedure, a security program, a security policy, an approach to prevent unauthorized tampering, a mechanism to fend off attacks, code to thwart foreign control, techniques to reject location or hijacking attacks, or a combination thereof, etc.) of a UFV 102 while airborne (e.g., while flying, during flight, between takeoff and landing, or a combination thereof, etc.). By way of example but not limitation, at least one UFV may update at least one security protocol of a UFV while airborne (e.g., a UAV may install an update (e.g., a change or an addition or a replacement to or for) a security protocol—such as an anti-malware program, at least one anti-malware signature for a code segment fingerprint or code behavior, at least one anti-malware heuristic, at least one rootkit defense, an anti-hijacking module, or an anti-spoofing routine, etc.— that the UAV is employing or capable of activating). However, claimed subject matter is not limited to any particular described embodiments, implementations, examples, etc.

Those skilled in the art will appreciate that the foregoing specific exemplary processes and/or machines and/or technologies are representative of more general processes and/or machines and/or technologies taught elsewhere herein, such as in the claims filed herewith and/or elsewhere in the present application.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Modules, logic, circuitry, hardware and software combinations, firmware, or so forth may be realized or implemented as one or more general-purpose processors, one or more processing cores, one or more special-purpose processors, one or more microprocessors, at least one Application-Specific Integrated Circuit (ASIC), at least one Field Programmable Gate Array (FPGA), at least one digital signal processor (DSP), some combination thereof, or so forth that is executing or is configured to execute instructions, a special-purpose program, an application, software, code, some combination thereof, or so forth as at least one special-purpose computing apparatus or specific computing component. One or more modules, logic, or circuitry, etc. may, by way of example but not limitation, be implemented using one processor or multiple processors that are configured to execute instructions (e.g., sequentially, in parallel, at least partially overlapping in a time-multiplexed fashion, at least partially overlapping across multiple cores, or a combination thereof, etc.) to perform a method or realize a particular computing machine. For example, a first module may be embodied by a given processor executing a first set of instructions at or during a first time, and a second module may be embodied by the same given processor executing a second set of instructions at or during a second time. Moreover, the first and second times may be at least partially interleaved or overlapping, such as in a multi-threading, pipelined, or predictive processing environment. As an alternative example, a first module may be embodied by a first processor executing a first set of instructions, and a second module may be embodied by a second processor executing a second set of instructions. As another alternative example, a particular module may be embodied partially by a first processor executing at least a portion of a particular set of instructions and embodied partially by a second processor executing at least a portion of the particular set of instructions. Other combinations of instructions, a program, an application, software, or code, etc. in conjunction with at least one processor or other execution machinery may be utilized to realize one or more modules, logic, or circuitry, etc. to implement any of the processing algorithms described herein.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory). A sale of a system or method may likewise occur in a territory even if components of the system or method are located and/or used outside the territory. Further, implementation of at least part of a system for performing a method in one territory does not preclude use of the system in another territory.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

This application may make reference to one or more trademarks, e.g., a word, letter, symbol, or device adopted by one manufacturer or merchant and used to identify and distinguish his or her product from those of others. Trademark names used herein are set forth in such language that makes clear their identity, that distinguishes them from common descriptive nouns, that have fixed and definite meanings, and, in many if not all cases, are accompanied by other specific identification using terms not covered by trademark. In addition, trademark names used herein have meanings that are well-known and defined in the literature, and do not refer to products or compounds protected by trade secrets in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or [trade], even when such trademark symbol does not explicitly appear next to the trademark. To the extent a trademark is used in a descriptive manner to refer to a product or process, that trademark should be interpreted to represent the corresponding product or process as of the date of the filing of this patent application.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A process comprising:
    autonomously operating a coordinating unoccupied flying vehicle (UFV) including at least:
        obtaining information specifying one or more theaters of operation;
        obtaining one or more theater characteristics corresponding to the one or more theaters of operation based at least partially on the transmitted one or more of commands or requests to the at least one remote UFV;
        analyzing the specified one or more theaters of operation and the one or more theater characteristics;
        formulating one or more commands or requests for coordinating at least one behavior of at least one remote UFV based at least partially on the analysis of the one or more theaters of operation and the one or more theater characteristics; and
        wirelessly transmitting the formulated one or more of commands or requests to at least one remote UFV, wherein at least one of the wirelessly transmitting one or more commands or requests, obtaining information specifying one or more theaters of operation, obtaining one or more theater characteristics, analyzing the specified one or more theaters of operation and the one or more theater characteristics, or the coordinating at least one behavior is at least partially implemented using one or more processing devices of the coordinating UFV.

2. An unoccupied flying vehicle (UFV) comprising:
    one or more electronic devices configured for autonomously operating an unoccupied flying vehicle (UFV) including at least:
        circuitry configured for obtaining information specifying one or more theaters of operation;
        circuitry configured for obtaining one or more theater characteristics corresponding to the one or more theaters of operation based at least partially on the transmitted one or more of commands or requests to the at least one remote UFV;
        circuitry configured for analyzing the specified one or more theaters of operation and the one or more theater characteristics;
        circuitry configured for formulating one or more commands or requests for coordinating at least one behavior of at least one remote UFV based at least partially on the analysis of the one or more theaters of operation and the one or more theater characteristics; and
        circuitry configured for wirelessly transmitting the formulated one or more of commands or requests to at least one remote UFV.

3. The unoccupied flying vehicle (UFV) of claim 2, wherein the circuitry configured for obtaining one or more theater characteristics corresponding to the one or more theaters of operation comprises:
    circuitry configured for receiving from the at least one remote UFV at least one indication of at least one status associated with the at least one remote UFV at least partially in response to the transmitted one or more of commands or requests to the at least one remote UFV.

4. The unoccupied flying vehicle (UFV) of claim 2, wherein the circuitry configured for obtaining information specifying one or more theaters of operation comprises:
    circuitry configured for obtaining at least one indication of at least one size of at least one theater of the one or more theaters of operation.

5. The unoccupied flying vehicle (UFV) of claim 2, wherein the circuitry configured for obtaining information specifying one or more theaters of operation comprises:

circuitry configured for receiving a message specifying at least one type of at least one UFV corresponding to a given theater of the one or more theaters of operation.

6. The unoccupied flying vehicle (UFV) of claim 2, wherein the circuitry configured for obtaining information specifying one or more theaters of operation comprises:
circuitry configured for obtaining at least one map of at least one theater of the one or more theaters of operation.

7. The unoccupied flying vehicle (UFV) of claim 2, wherein the circuitry configured for formulating one or more commands or requests for coordinating at least one behavior of at least one remote UFV based at least partially on the analysis of the one or more theaters of operation and the one or more theater characteristics comprises:
circuitry configured for formulating at least one flight control command for transmission to a first remote UFV based at least partially on analysis of at least one indication of at least one hazard that is received from a second remote UFV.

8. The unoccupied flying vehicle (UFV) of claim 2, wherein the circuitry configured for formulating one or more commands or requests for coordinating at least one behavior of at least one remote UFV based at least partially on the analysis of the one or more theaters of operation and the one or more theater characteristics comprises:
circuitry configured for formulating at least one command to update at least one mission for transmission to a first remote UFV based at least partially on analysis of at least one indication of at least one status of a second remote UFV that is received from the second remote UFV.

9. The unoccupied flying vehicle (UFV) of claim 8, wherein the circuitry configured for formulating at least one command to update at least one mission for transmission to a first remote UFV based at least partially on analysis of at least one indication of at least one status of a second remote UFV that is received from the second remote UFV comprises:
circuitry configured for formulating at least one command to update the at least one mission for transmission to a first remote UFV based at least partially on analysis of the at least one indication of the at least one status of the second remote UFV that is received from the second remote UFV and based at least partially on at least one mission analysis performed by the UFV.

10. The unoccupied flying vehicle (UFV) of claim 2, wherein the circuitry configured for analyzing the specified one or more theaters of operation and the one or more theater characteristics comprises:
circuitry configured for investigating UFV coordinator status of at least one theater corresponding to multiple remote UFVs.

11. The unoccupied flying vehicle (UFV) of claim 10, wherein the circuitry configured for investigating UFV coordinator status of at least one theater corresponding to multiple remote UFVs comprises:
circuitry configured for tracking one or more UFV coordinator designations received from one or more remote UFVs.

12. The unoccupied flying vehicle (UFV) of claim 2, wherein the circuitry configured for formulating one or more commands or requests for coordinating at least one behavior of the at least one remote UFV based at least partially on the analysis of the one or more theaters of operation and the one or more theater characteristics comprises:

circuitry configured for formulating at least one UFV coordinator designation for transmission to a first remote UFV to indicate that the UFV is willing to ordain the first remote UFV with UFV coordinator status.

13. The unoccupied flying vehicle (UFV) of claim 12, wherein the circuitry configured for formulating at least one UFV coordinator designation for transmission to a first remote UFV to indicate that the UFV is willing to ordain the first remote UFV with UFV coordinator status comprises:
circuitry configured for formulating the at least one UFV coordinator designation for transmission to the first remote UFV to indicate that the UFV is willing to implement one or more commands, which are received from the first remote UFV, to adjust at least one flight path of the UFV.

14. The unoccupied flying vehicle (UFV) of claim 2, wherein the circuitry configured for analyzing the specified one or more theaters of operation and the one or more theater characteristics comprises:
circuitry configured for analyzing the specified one or more theaters of operation and the one or more theater characteristics for detecting whether at least one remote UFV is flying erratically.

15. The unoccupied flying vehicle (UFV) of claim 14, wherein the circuitry configured for analyzing the specified one or more theaters of operation and the one or more theater characteristics for detecting whether at least one remote UFV is flying erratically comprises:
circuitry configured for analyzing the specified one or more theaters of operation and the one or more theater characteristics for detecting whether the at least one remote UFV is not flying in accordance with at least one flight control command instituted by a UFV flight coordinator.

16. The unoccupied flying vehicle (UFV) of claim 14, wherein the circuitry configured for analyzing the specified one or more theaters of operation and the one or more theater characteristics for detecting whether at least one remote UFV is flying erratically comprises:
circuitry configured for analyzing the specified one or more theaters of operation and the one or more theater characteristics for detecting whether the at least one remote UFV is not comporting with one or more promulgated flight rules.

17. The unoccupied flying vehicle (UFV) of claim 14, wherein the circuitry configured for formulating one or more commands or requests for coordinating at least one behavior of at least one remote UFV based at least partially on the analysis of the one or more theaters of operation and the one or more theater characteristics comprises:
circuitry configured for formulating at least one announcement indicative that the at least one remote UFV has been categorized as flying erratically for broadcasting to multiple remote UFVs.

18. The unoccupied flying vehicle (UFV) of claim 2, wherein the circuitry configured for analyzing the specified one or more theaters of operation and the one or more theater characteristics comprises:
circuitry configured for analyzing the specified one or more theaters of operation and the one or more theater characteristics for detecting whether a remote UFV is entering a coordination zone.

19. The unoccupied flying vehicle (UFV) of claim 18, wherein the circuitry configured for formulating one or more commands or requests for coordinating at least one behavior of at least one remote UFV based at least partially on the analysis of the one or more theaters of operation and the one or more theater characteristics comprises:

circuitry configured for formulating a request for transmission to the remote UFV to confirm compliance with an ordained UFV coordinator for the entered coordination zone.

20. The unoccupied flying vehicle (UFV) of claim 18, wherein the circuitry configured for formulating one or more commands or requests for coordinating at least one behavior of at least one remote UFV based at least partially on the analysis of the one or more theaters of operation and the one or more theater characteristics comprises:

circuitry configured for formulating a notification that the remote UFV is traveling within the coordination zone without deference to a UFV coordinator of the coordination zone for broadcasting to multiple remote UFVs of the coordination zone.

21. The unoccupied flying vehicle (UFV) of claim 2, wherein the circuitry configured for formulating one or more commands or requests for coordinating at least one behavior of at least one remote UFV based at least partially on the analysis of the one or more theaters of operation and the one or more theater characteristics comprises:

circuitry configured for formulating at least one update command to update at least one instruction code on the at least one remote UFV for transmission to the at least one remote UFV.

22. The unoccupied flying vehicle (UFV) of claim 21, wherein the circuitry configured for formulating at least one update command to update at least one instruction code on the at least one remote UFV for transmission to the at least one remote UFV comprises:

circuitry configured for formulating at least one update command to update at least one flight instruction code that provides at least partial flight control for the at least one remote UFV if the flight instruction code is executed for transmission to the at least one remote UFV.

23. The unoccupied flying vehicle (UFV) of claim 2, wherein the circuitry configured for formulating one or more commands or requests for coordinating at least one behavior of at least one remote UFV based at least partially on the analysis of the one or more theaters of operation and the one or more theater characteristics comprises:

circuitry configured for formulating at least one instruction code update for installation during flight.

24. The unoccupied flying vehicle (UFV) of claim 2, wherein the circuitry configured for formulating one or more commands or requests for coordinating at least one behavior of at least one remote UFV based at least partially on the analysis of the one or more theaters of operation and the one or more theater characteristics comprises:

circuitry configured for formulating at least one update command to update at least one security protocol of the at least one remote UFV.

25. The unoccupied flying vehicle (UFV) of claim 24, wherein the circuitry configured for formulating at least one update command to update at least one security protocol of the at least one remote UFV comprises:

circuitry configured for formulating at least one malware indicator to be included in at least one updated security protocol of the at least one remote UFV.

26. The unoccupied flying vehicle (UFV) of claim 24, wherein the circuitry configured for formulating at least one update command to update at least one security protocol of the at least one remote UFV comprises:

circuitry configured for formulating at least one update command to update at least one location attack rejection mechanism.

27. The unoccupied flying vehicle (UFV) of claim 2, wherein the circuitry configured for formulating one or more commands or requests for coordinating at least one behavior of at least one remote UFV based at least partially on the analysis of the one or more theaters of operation and the one or more theater characteristics comprises:

circuitry configured for formulating one or more commands or requests for updating at least one security protocol of the at least one remote UFV while airborne.

28. The unoccupied flying vehicle (UFV) of claim 2, wherein the circuitry configured for obtaining information specifying one or more theaters of operation comprises:

circuitry configured for retrieving from memory a size of an operational area that is to be coordinated by the UFV.

29. The unoccupied flying vehicle (UFV) of claim 2, wherein the circuitry configured for obtaining information specifying one or more theaters of operation comprises:

circuitry configured for receiving from at least one base station at least one indication of at least one geographic region of at least one theater of the one or more theaters of operation.

30. The unoccupied flying vehicle (UFV) of claim 2, wherein the circuitry configured for obtaining information specifying one or more theaters of operation comprises:

circuitry configured for receiving at least one message that provides geographic coordinates of one or more boundaries of an operational theater.

31. The unoccupied flying vehicle (UFV) of claim 2, wherein the circuitry configured for obtaining information specifying one or more theaters of operation comprises:

circuitry configured for receiving at least one indication of at least a number of UFVs corresponding to at least one theater of operation.

32. The unoccupied flying vehicle (UFV) of claim 2, wherein the circuitry configured for obtaining information specifying one or more theaters of operation comprises:

circuitry configured for receiving respective transmissions from respective remote UAVs that are opting into at least one of the one or more theaters of operation.

33. The unoccupied flying vehicle (UFV) of claim 2, wherein the circuitry configured for obtaining information specifying one or more theaters of operation comprises:

circuitry configured for receiving at least one map of at least a portion of at least one of the one or more theaters of operation.

34. The unoccupied flying vehicle (UFV) of claim 2, wherein the circuitry configured for obtaining information specifying one or more theaters of operation comprises:

circuitry configured for receiving at least one of a defined region, a general area, a set of UFVs, a zone defined by an authoritative source, a zone outlined by ad hoc or spontaneous or organic agreement of multiple UFVs, a spatial zone defined around at least one mission, or a combination thereof defining one or more theaters of operation.

35. The unoccupied flying vehicle (UFV) of claim 2, wherein the circuitry configured for formulating one or more commands or requests for coordinating at least one behavior of at least one remote UFV based at least partially on the analysis of the one or more theaters of operation and the one or more theater characteristics comprises:

circuitry configured for formulating one or more flight control requests or commands that facilitate sharing of airspace or completion of mission objectives for transmission to the at least one remote UFV.

36. The unoccupied flying vehicle (UFV) of claim 2, wherein the circuitry configured for analyzing the specified one or more theaters of operation and the one or more theater characteristics comprises:
   circuitry configured for analyzing at least one of a mission status, a hazard, a flight attribute, or a mission objective for automated formulating of at least one command directing one or more flight control decisions of at least one remote UFV.

37. An unoccupied flying vehicle (UFV) comprising:
   means for autonomously operating a coordinating unoccupied flying vehicle (UFV) including at least:
      means for obtaining information specifying one or more theaters of operation;
      means for obtaining one or more theater characteristics corresponding to the one or more theaters of operation based at least partially on the transmitted one or more of commands or requests to the at least one remote UFV;
      means for analyzing the specified one or more theaters of operation and the one or more theater characteristics;
      means for formulating one or more commands or requests for coordinating at least one behavior of the at least one remote UFV based at least partially on the analysis of the one or more theaters of operation and the one or more theater characteristics; and
      means for wirelessly transmitting the formulated one or more of commands or requests to at least one remote UFV, wherein at least one of the means for wirelessly transmitting, the means for obtaining, the means for analyzing, or the means for coordinating is at least partially implemented using one or more processing devices.

* * * * *

UNITED STATES PATENT AND TRADEMARK OFFICE
CERTIFICATE OF CORRECTION

PATENT NO. : 9,527,587 B2  Page 1 of 1
APPLICATION NO. : 13/866743
DATED : December 27, 2016
INVENTOR(S) : Levien et al.

It is certified that error appears in the above-identified patent and that said Letters Patent is hereby corrected as shown below:

In the Claims

In Column 55, Line 65, Claim 12 "of the at least one remote UFV based at least partially on the" should be --of at least one remote UFV based at least partially on the--

Signed and Sealed this
Ninth Day of May, 2017

Michelle K. Lee
*Director of the United States Patent and Trademark Office*